US006184982B1

(12) United States Patent
Karanassios

(10) Patent No.: US 6,184,982 B1
(45) Date of Patent: Feb. 6, 2001

(54) SAMPLE INTRODUCTION SYSTEM

(75) Inventor: Vassili Karanassios, Waterloo (CA)

(73) Assignee: The University Of Waterloo, Waterloo (CA)

( * ) Notice: Under 35 U.S.C. 154(b), the term of this patent shall be extended for 0 days.

(21) Appl. No.: 08/853,481

(22) Filed: May 9, 1997

Related U.S. Application Data

(62) Division of application No. 08/289,640, filed on Aug. 12, 1994, now Pat. No. 5,705,787.

(30) Foreign Application Priority Data

Aug. 12, 1993 (GB) ........................................ 9316742

(51) Int. Cl.[7] .............................................. G01J 3/30

(52) U.S. Cl. .................................................. 356/311

(58) Field of Search ......................... 356/311, 300, 356/302, 318, 326, 417, 317, 315, 316, 312; 250/458.1, 459.1, 461.1, 461.2

(56) References Cited

U.S. PATENT DOCUMENTS

| | | | | |
|---|---|---|---|---|
| 3,737,239 | * | 6/1973 | Adams et al. | 356/177 |
| 4,824,249 | * | 4/1989 | Lucas et al. | 356/311 |
| 4,885,709 | * | 12/1989 | Edgar et al. | 356/432 |
| 4,971,437 | * | 11/1990 | Van Gijzel | 356/73 |
| 5,570,179 | * | 10/1996 | Wockstrom | 356/311 |
| 5,705,787 | * | 1/1998 | Karanassios | 356/316 X |

* cited by examiner

*Primary Examiner*—Frank G. Font
*Assistant Examiner*—Tu T. Nguyen
(74) *Attorney, Agent, or Firm*—Sim & McBurney

(57) ABSTRACT

An in-torch vaporization sample introduction system for introducing a sample to be analyzed into a spectrometer, comprising sample holder means for carrying the sample to be analyzed, a modified Fassel-type torch having a plasma fed by inert gas through outer and intermediate feed channels in an enlarged gas tube, an inner axial tube having one end open adjacent the plasma and an opposite end open for receiving the sample holder means for feeding the sample to the plasma, the inner axial tube tapering to a reduced diameter adjacent the one end to form a well defined channel for feeding the sample to the plasma means for positioning the sample holder means in the inner axial tube a predetermined distance below the plasma, and means for sealing the opposite end of the inner axial tube and means for vaporizing the sample.

12 Claims, 42 Drawing Sheets

SAMPLE INTRODUCTION SYSTEM

This application is a division of application Ser. No. 08/289,640 filed Aug. 12, 1994 which application is now U.S. Pat. No. 5,705,787 issued on Jan. 6, 1998.

FIELD OF INVENTION

The present invention is concerned with the field of spectrometry, such spectrometry involving the use of inductively-coupled plasma (ICP), in particular, to a sample introduction system for introducing samples for routine analysis by such spectrometry.

BACKGROUND TO THE INVENTION

The inductively coupled plasma is the most widely used plasma source in atomic spectrometry and pneumatic nebulization is the sample introduction system of choice for routine analysis. Despite their wide acceptance and applicability, pneumatic sample introduction systems drift, may block at high salt concentrations and require sample volumes larger than 1 mL. Perhaps the most important drawback of pneumatic nebulization is low sample introduction efficiency (typically 5% or less). Of the various alternative sample introduction systems that address the limitations of pneumatic nebulization, provide the capability for the analysis of μL volumes of samples and offer increased sample introduction efficiency, direct sample insertion (DSI), (ref. 1, a list of references appears at the end of the specification) and electrothermal vaporization (ETV) sample introduction (ref. 2) will be considered.

In a typical DSI-device, a sample is deposited into or onto a probe, for example, a graphite cup or wire-loop, with subsequent introduction of the sample carrying probe into the plasma (see FIGS. 1*a* and 1*b*). Using DSI-devices, μL volumes of liquids and mg quantities of solids can be introduced into the plasma with 100% sample introduction efficiency. Despite their advantages, DSIs are not without shortcomings. For example, refractory carbide formation is a key chemical limitation of graphite-cup DSIs. Further, since the plasma is used for vaporization, atomization and excitation, ICP and DSI-device operating conditions cannot be optimized independently.

A way to separate vaporization from atomization and ionization/excitation and to facilitate independent optimization is by using an ETV-device (see FIG. 1*c*). In a typical ETV sample introduction system, a sample is deposited or placed into or onto an electrically heated graphite or metal sample holder. The sample holder is heated using an expensive (approximately $20,000), microwave oven-size power supply and sample holders used with ICP-AES (ICP-atomic emission spectrometry) are furnaces, rods, cups, micro-boats and cuvettes in a graphite furnace, Ta filaments and Pt and W coils, W boats and W coils. The sample holder is placed into a volatilization chamber where the sample is heated to temperature between about 2700° C. and 3000° C. by passing electrical current through the sample holder and analyte vapor so generated is carried into the plasma by means of tubing and a carrier gas, typically Ar. The separation of vaporization (ETV-device) from atomization, excitation and ionization (ICP) facilitates independent optimization.

The advantages offered by ETV-ICP include increased sample introduction efficiency (resulting in improvements in detection limits when compared to pneumatic nebulization) and an inherent ability to handle small sample volumes (approximately 10 μL). In addition to these advantages, a number of benefits accrue by coupling a ETV (or DSI) sample introduction to ICP-MS (ICP-mass spectrometry). In particular, spectral interferences, such as overlaps arising from polyatomic, oxide and hydroxide species resulting from continuous introduction of solvent are minimized because the solvent is vaporized prior to analyte vaporization. In addition, some non-spectroscopic interferences are minimized when analytes volatilize at different temperatures than the matrix.

Similar to DSIs, carbide formation is a key chemical limitation of graphite furnace ETV-devices. One way to eliminate carbide formation is by electrically heating metal rather than graphite. For instance, Ta filament and Pt and W coil, W boat and W coil ETV-devices have been coupled to ICP-AES and W ribbon, W filament, Re filament, Ta strip and Ta tube and W wire in graphite furnace ETV-devices have been coupled to ICP-MS.

In terms of non-chemical limitations, atomic vapor transfer problems, such as vapor-dilution and vapor-condensation onto the walls of the ETV chamber and the inner walls of the tube connecting the ETV-device to the ICP and transport effects, have been reported in the literature. Vapor transfer problems have been reduced by developing an ETV-device with a small-volume volatilization chamber, by minimizing the length of the tube connecting the ETV device to an ICP and by using an optimized chamber design. In addition, the relatively large mass of a typical graphite furnace ETV-device, for example, about 0.6 g for a graphite tube in graphite furnace atomic absorption spectrometry, causes rapid heating of the carrier gas which induces gas expansion and creates a transient increase in the carrier-gas flow-rate. This "pressure pulse" or "piston effect" causes a momentary decrease in plasma continuum emission and complicates background correction. The use of a lower temperature, e.g. below about 1400° C. versus a typical greater than about 2700° C., smaller surface area ETV-device, an increase in the length of tubing connecting the ETV-device to the ICP, an increase in the observation height and in the carrier gas flow rate, a reduction in the volume of the volatilization chamber and the use of an optimally designed chamber and a double wall chamber, have been reported to reduce the adverse effects of the pressure pulse.

Partially due to the relatively large mass and the low electrical resistance (ca. 15 mΩ) of graphite furnaces, the electrical power requirement is about 2 kW, thus necessitating the use of a bulky and relatively expensive power supply that has special power requirements. Despite the improvements in detection limits and the benefits of coupling ETV to ICP-MS, these shortcomings limit wide acceptance and applicability of ETV-ICP.

SUMMARY OF THE INVENTION

The present invention provides a novel sample introduction system which facilitates independent optimization of the steps of vaporization, on the one hand, and atomization, excitation and ionization, on the other hand, and addresses DSI- and ETV-device shortcomings by combing DSI- and ETV-device concepts. The present invention employs an electrically-heated small-mass wire-loop that can be inserted into a modified ICP torch (see FIG. 1*d*). The sample introduction system of the present invention has been termed In Torch Vaporization (ITV) sample introduction.

Accordingly, in one aspect of the present invention, there is provided an in-torch vaporization sample introduction system for introducing a sample to be analyzed into a spectrometer, comprising:

a) sample holder means for carrying said sample to be analyzed;

b) a modified Fassel-type torch having a plasma fed by inert gas through outer and intermediate feed channels in an enlarged gas tube, an inner axial tube having one end open adjacent said plasma and an opposite end open for receiving said sample holder means for feeding the sample to the plasma, said inner axial tube tapering to a reduced diameter adjacent said one end to form a well defined channel for feeding said sample to said plasma, means for positioning said sample holder means in said inner axial tube a predetermined distance below said plasma, and means for sealing said opposite end of said inner axial tube; and c) means for vaporizing said sample.

According to another aspect of the invention, there is provided an automated in-torch sample introduction system for introducing a sample to be analyzed into a spectrometer, comprising:

a) sample holder means for carrying said sample to be analyzed;

b) a modified Fassel-type torch having a plasma fed by inert gas through outer and intermediate feed channels in an enlarged gas tube, an inner axial tube having one end open adjacent said plasma and an opposite end open for receiving said sample holder means for feeding the sample to the plasma, said inner axial tube tapering to a reduced diameter adjacent said one end to form a well defined channel for feeding said sample to said plasma, means for positioning said sample holder means in said inner axial tube a predetermined distance below said plasma, and means for sealing said opposite end of said inner axial tube;

c) means for vaporizing said sample;

d) said inner axial tube having an enlarged diameter volatization chamber in which said material is volatized by said means for vaporizing, said volatization chamber communicating with an inert gas inlet for transport of said material to the plasma;

e) means for inserting and retracting said sample holder means into and out of, respectively, said opposite end of said inner axial tube;

f) said inner axial tube having an enlarged diameter drying chamber in which said material is dried, said drying chamber being located adjacent and below said volatization chamber, and communicating with a drying gas inlet for drying said material before volatization;

g) a rotatable autosampler for carrying said sample and plurality of further samples;

h) a swing arm for transporting said sample from among said plurality of samples on said rotatable autosampler; and i) means for controlling said rotatable autosampler and said swing arm.

According to a further aspect of the invention, there is provided an atomic absorption and atomic fluorescence sample analysis system, comprising:

a) sample holder means for carrying said sample to be analyzed, said sample holder means being in the form of a miniaturized wafer;

b) lamp means on one side of said wafer for exposing said wafer and the sample carried therein to radiation;

c) a monochromator on an opposite side of said wafer for receiving and filtering said radiation after transmission through said wafer;

d) a photomultiplier connected to said monochromator for generating a current proportional to light intensity of said radiation filtered by said monochromator;

e) means for converting said current into voltage; and f) means for converting said voltage to a digital signal representative of said atomic fluorescence of said sample, and displaying said signal.

According to yet another aspect of the invention there is provided a screening system for detecting the presence or absence of predetermined elements from a sample, comprising:

a) spectrometer means for analyzing a plurality of known single elements and said sample, and in response generating a plurality of reference spectral patterns and a raw spectral pattern, respectively;

b) correlation means for performing a cross-correlation between respective ones of said plurality of reference spectral patterns and said raw spectral pattern and in the event of a correlation therebetween providing an indication of presence of a predetermined one of said known single elements in said sample; and c) display means responsive to said indication of presence of said predetermined one of said known single elements in said sample for generating a graphical display thereof.

The vapor transfer problems of the prior art devices are overcome by the sample introduction device of the invention by minimizing the distance the atomic vapor must travel to reach the ICP and by using a small-volume volatilization chamber. The carbide formation problem of prior art devices is overcome by electrically-heating metal rather than graphite as the sample holder. The pressure pulse is decreased or eliminated and an inexpensive power supply may be employed as a result of using a small mass sample holder.

Figure 1A:
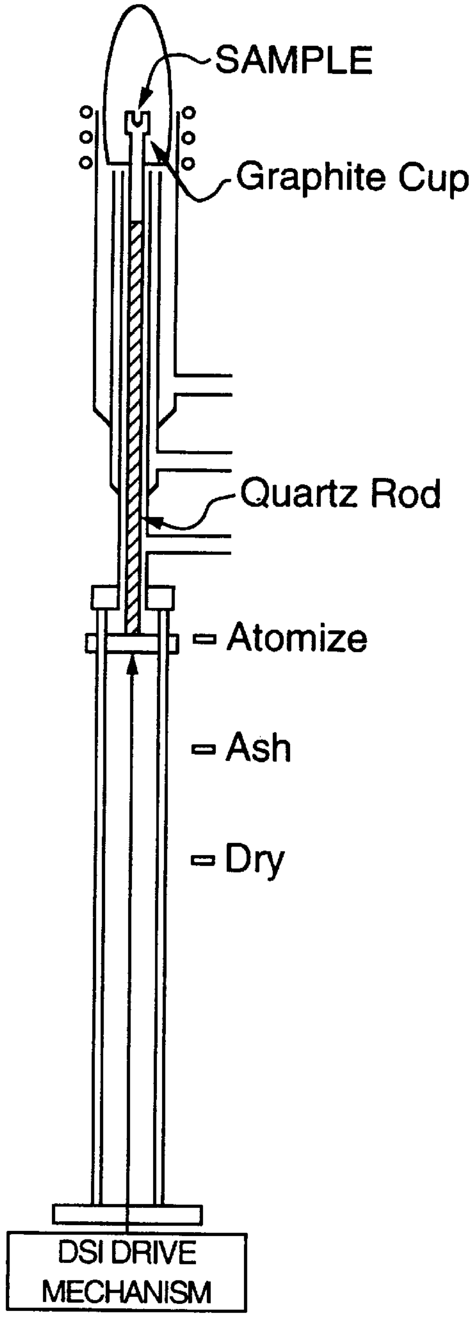
FIG. 1A (PRIOR ART)
FIG. 1 comprises parts (*a*), (*b*), (*c*) and (*d*) and shows a schematic illustration of: (*a*) a typical, prior art automated, graphite-cup direct sample insertion (DSI); (*b*) a typical, prior art automated, wire-loop direct sample insertion (DSI); (*c*) a typical, prior art ETV-ICP system; and (*d*) a manually-operated ITV sample introduction device according to one embodiment of the invention.
Figure 6A:
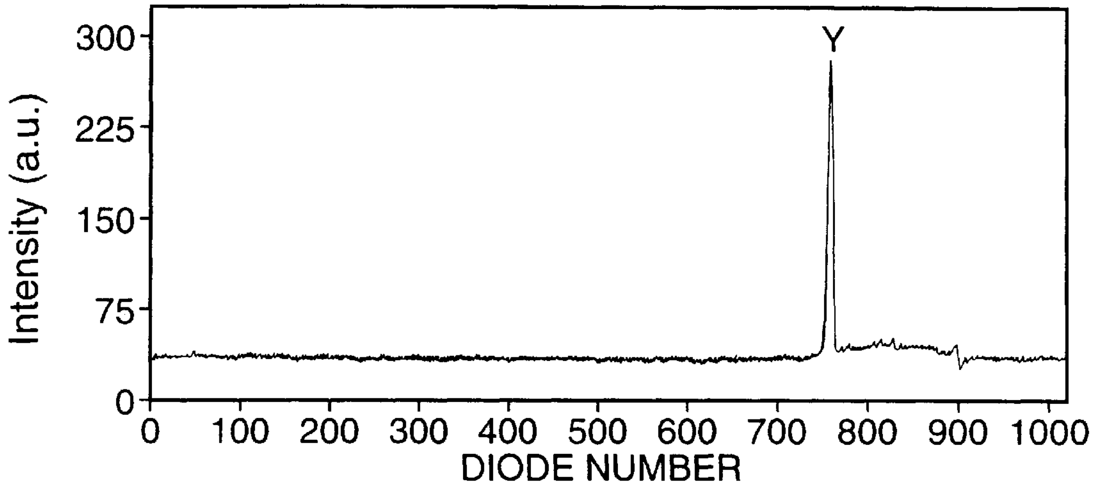
Figure 6B:
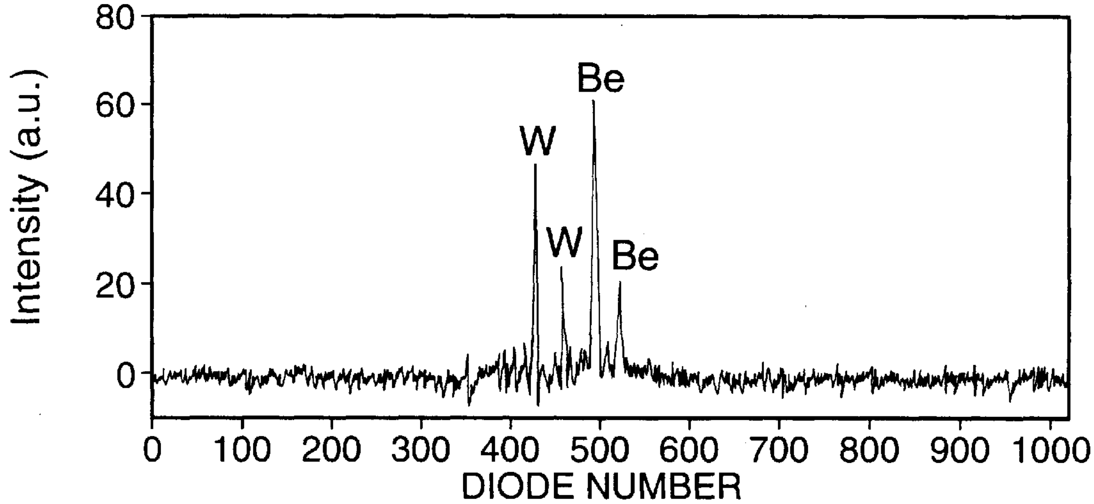
Figure 6C:
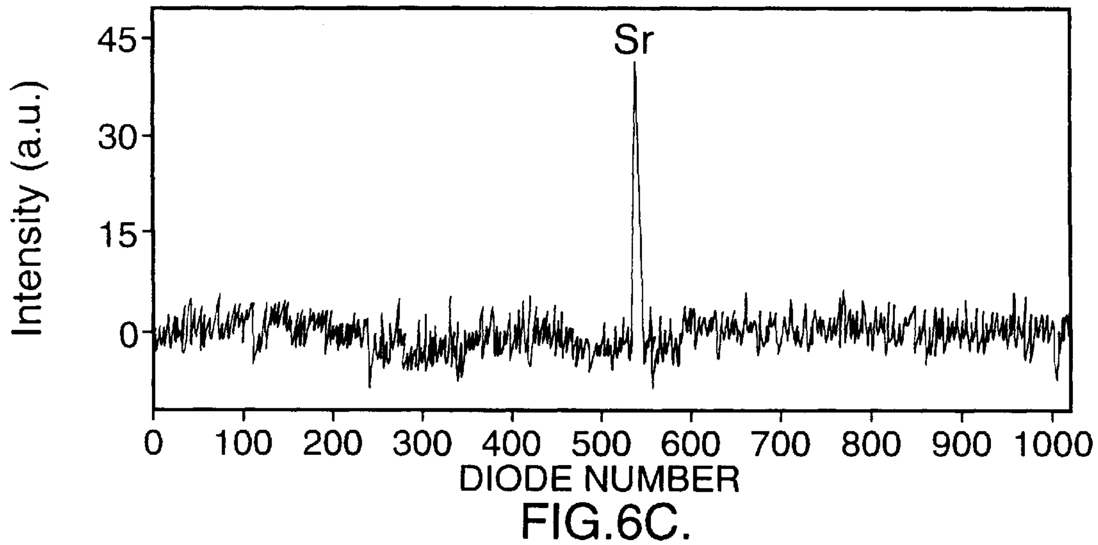
Figure 7A:
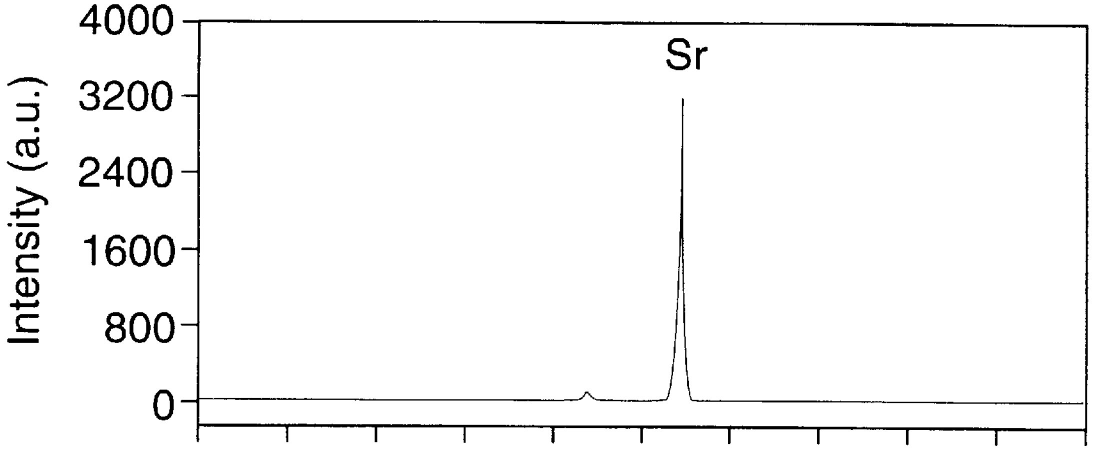
Figure 7B:
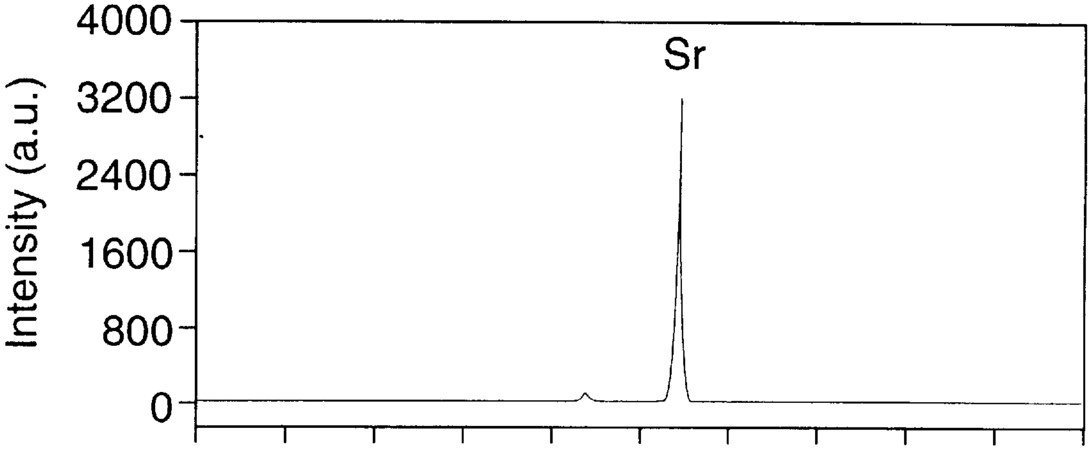
Figure 7C:
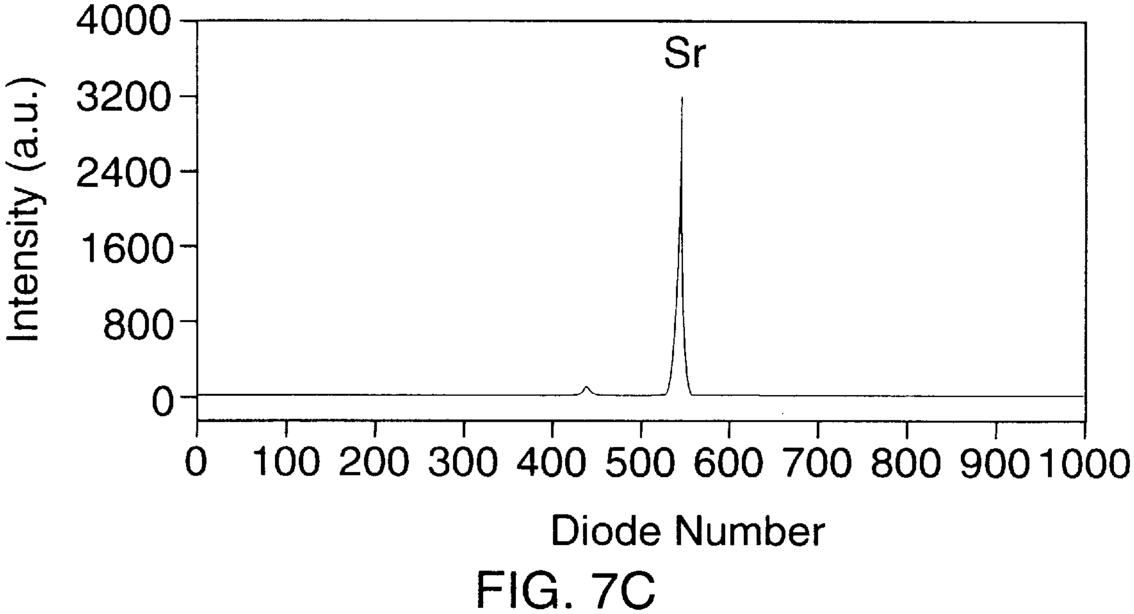
Figure 8:
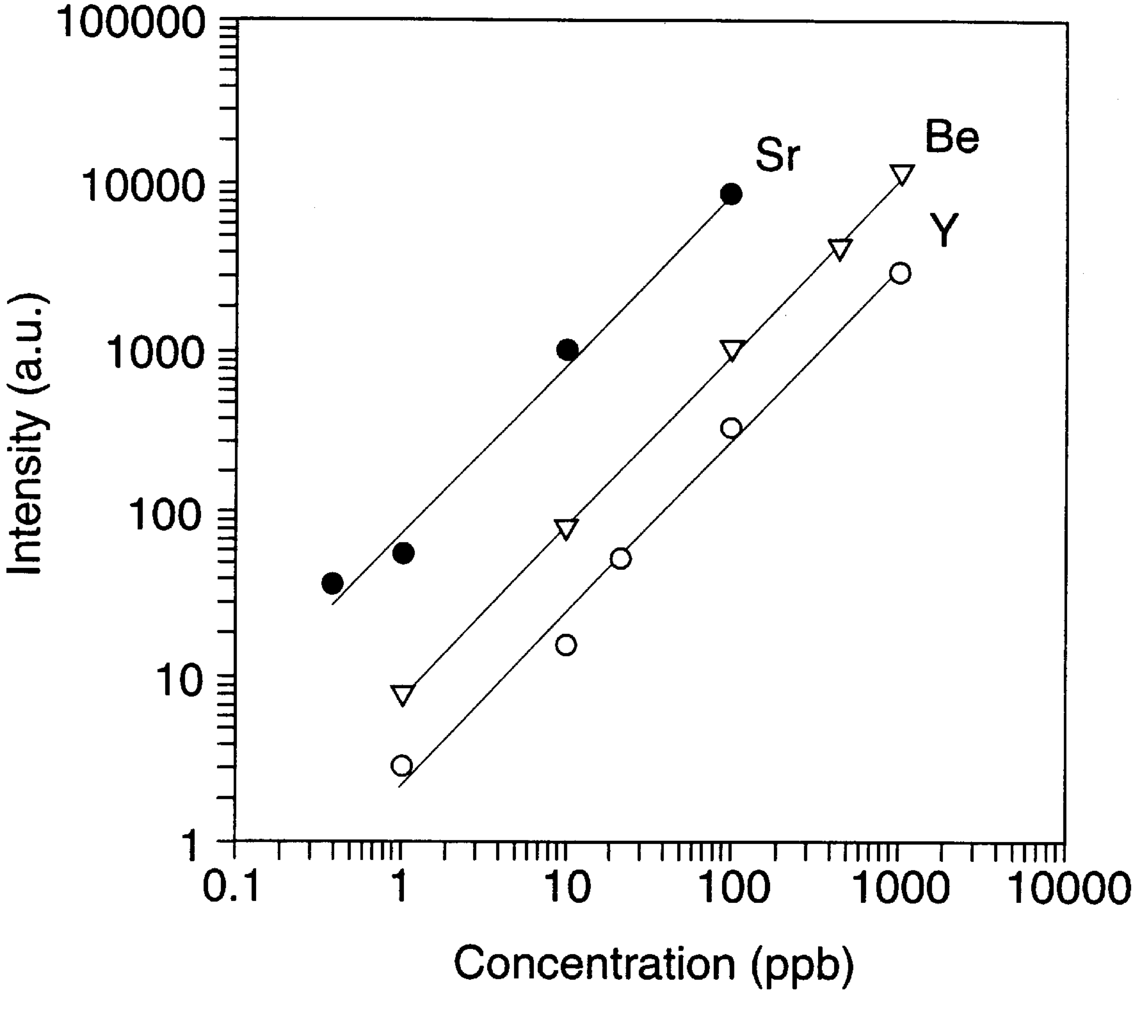
Figure 10A:
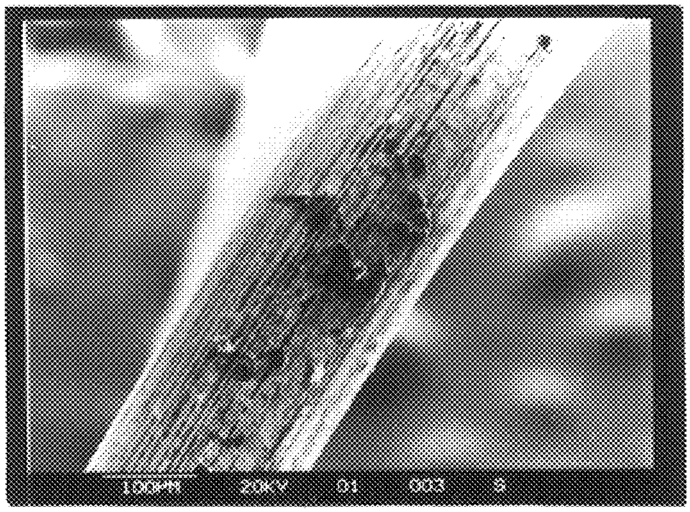
Figure 10B:
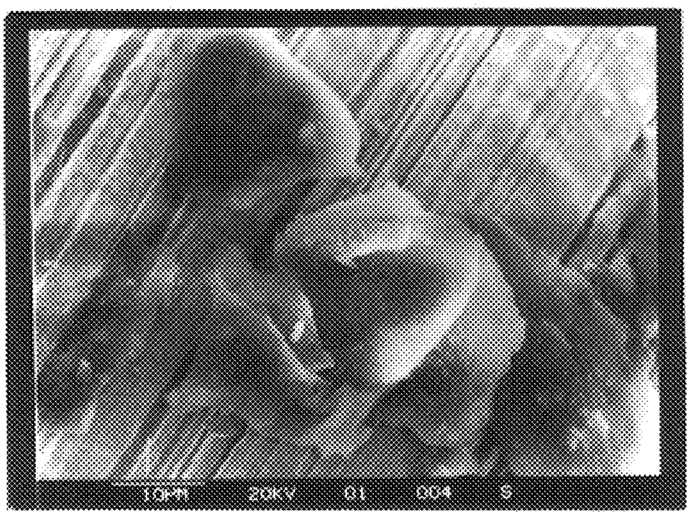
Figure 11:
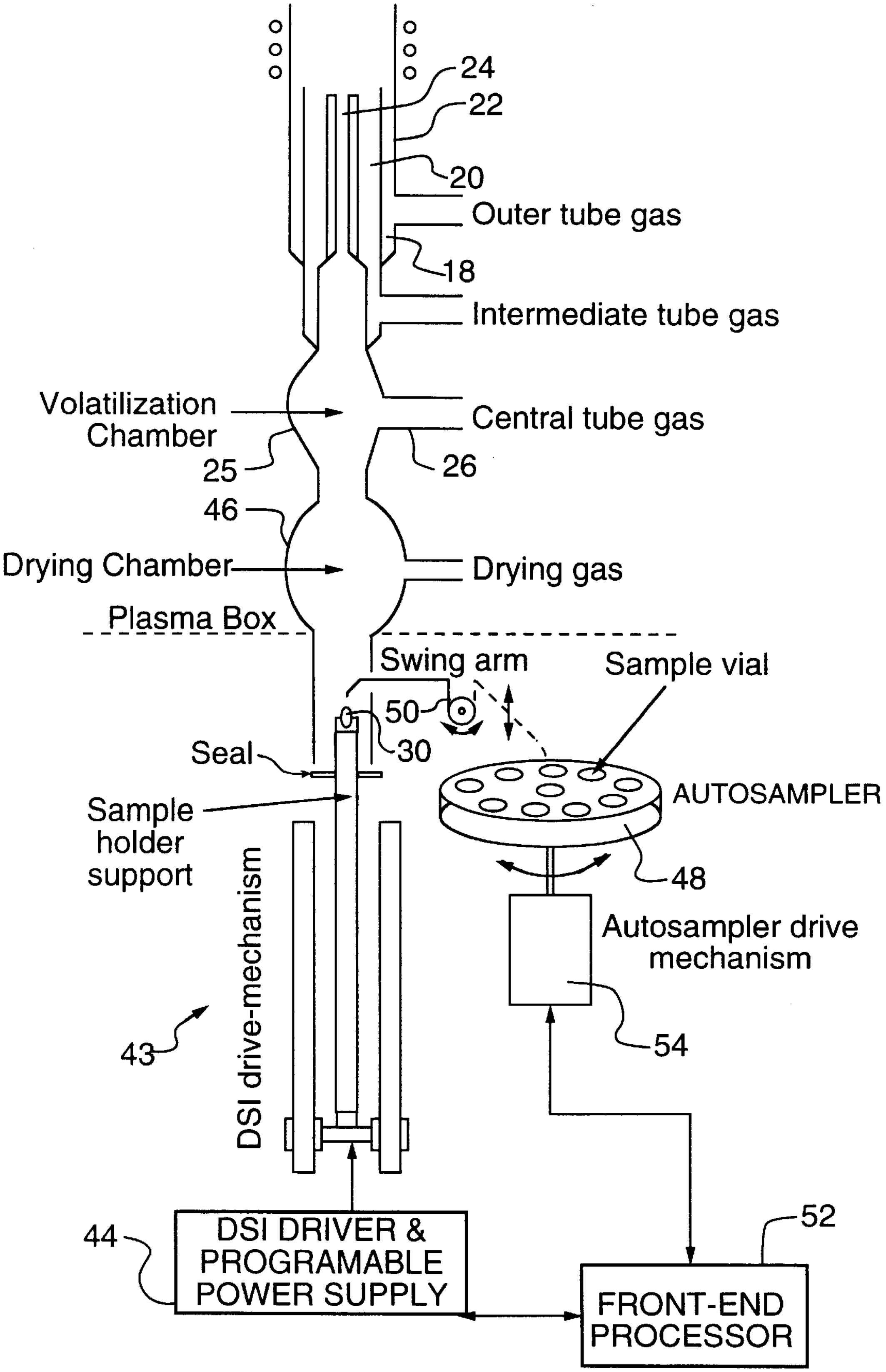
Figure 12A:
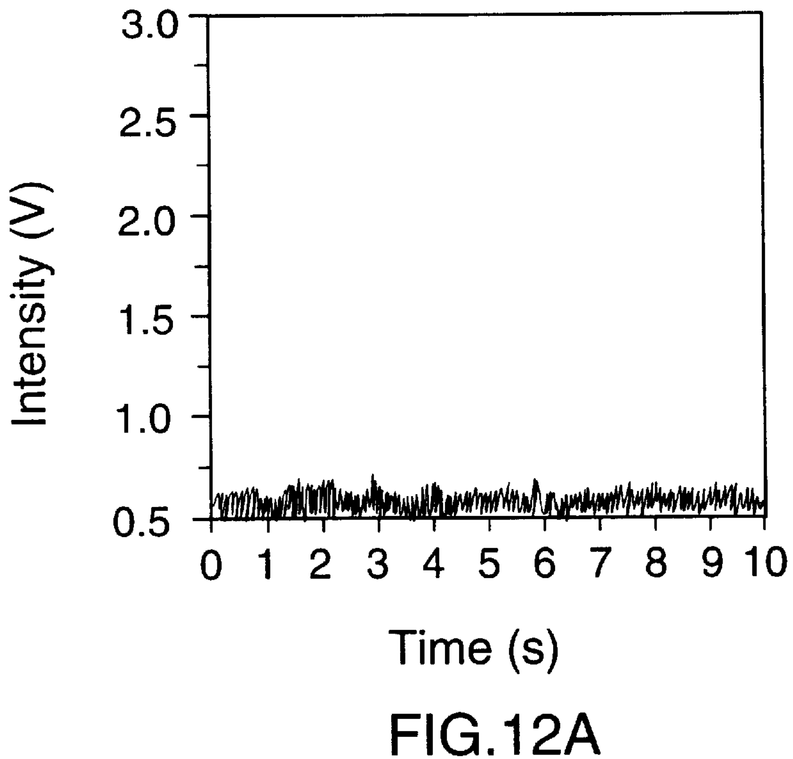
Figure 12B:
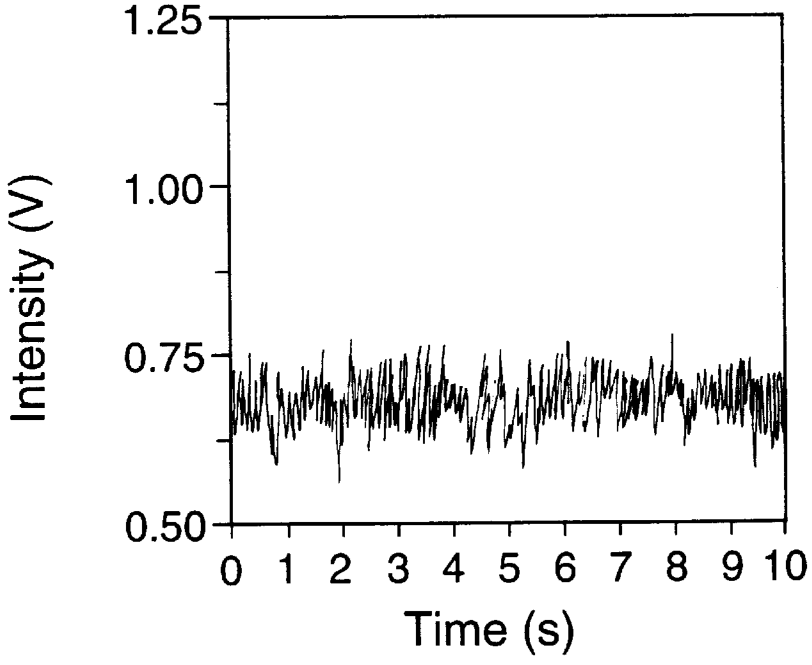
Figure 12C:
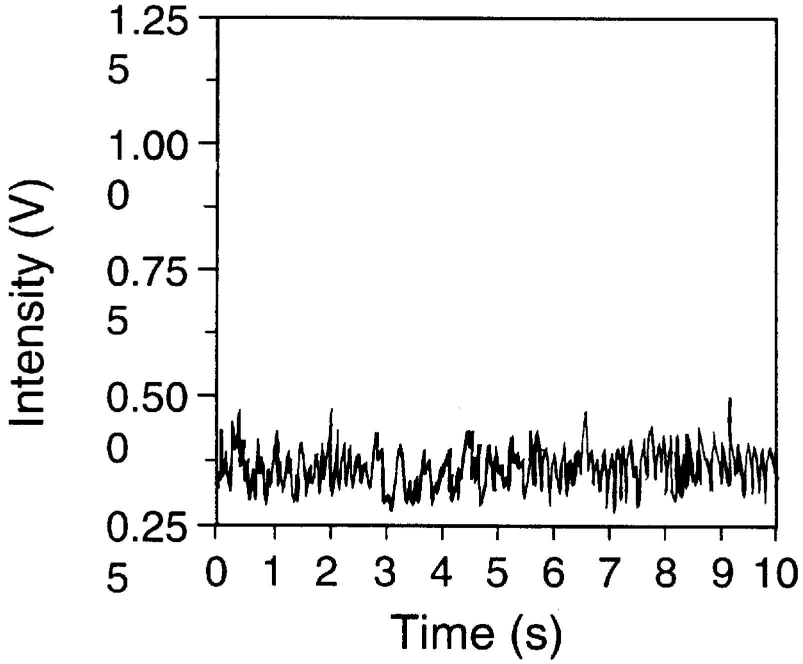
Figure 12D:
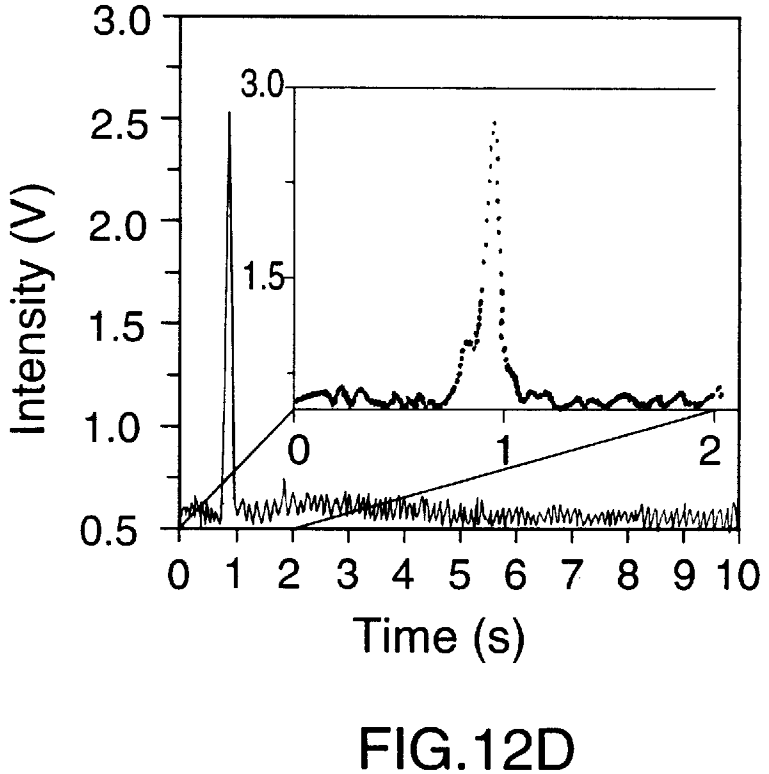
Figure 12E:
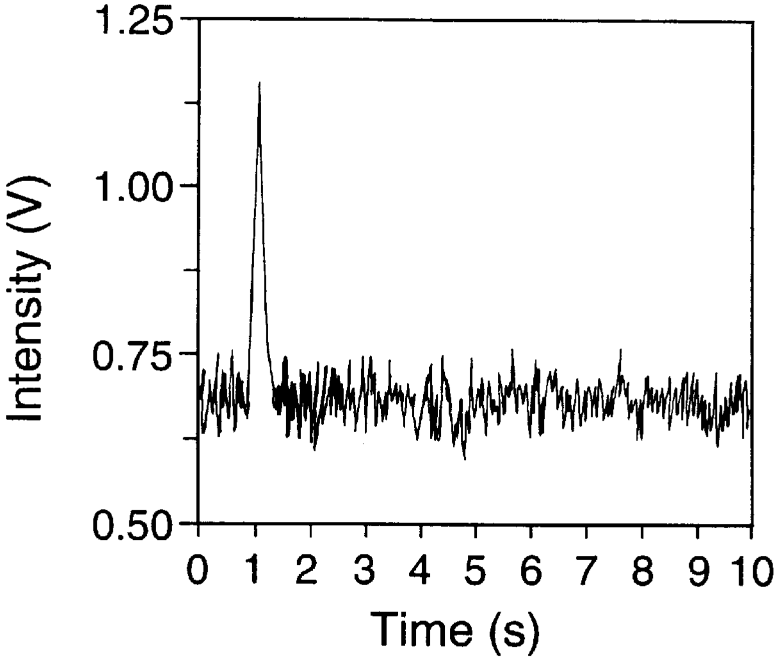
Figure 12F:
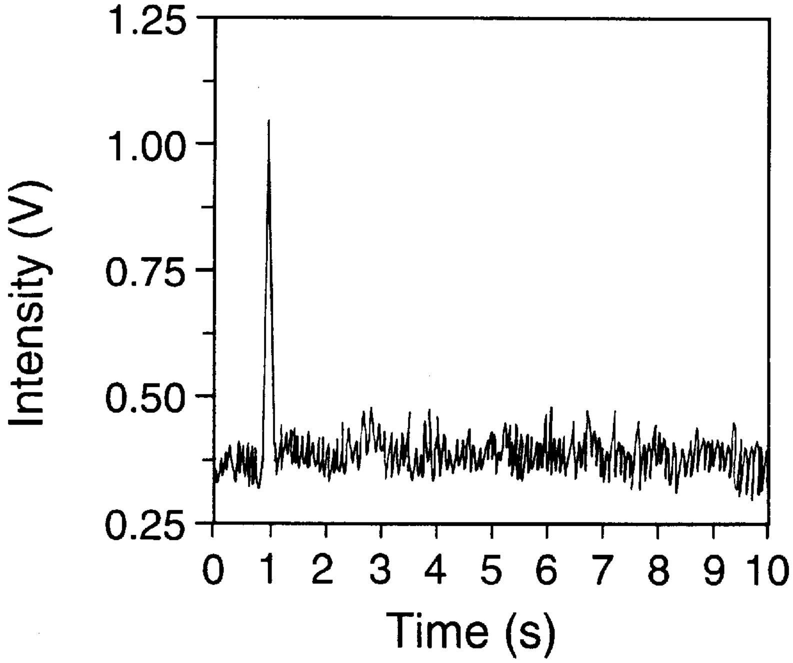
Figure 15A:
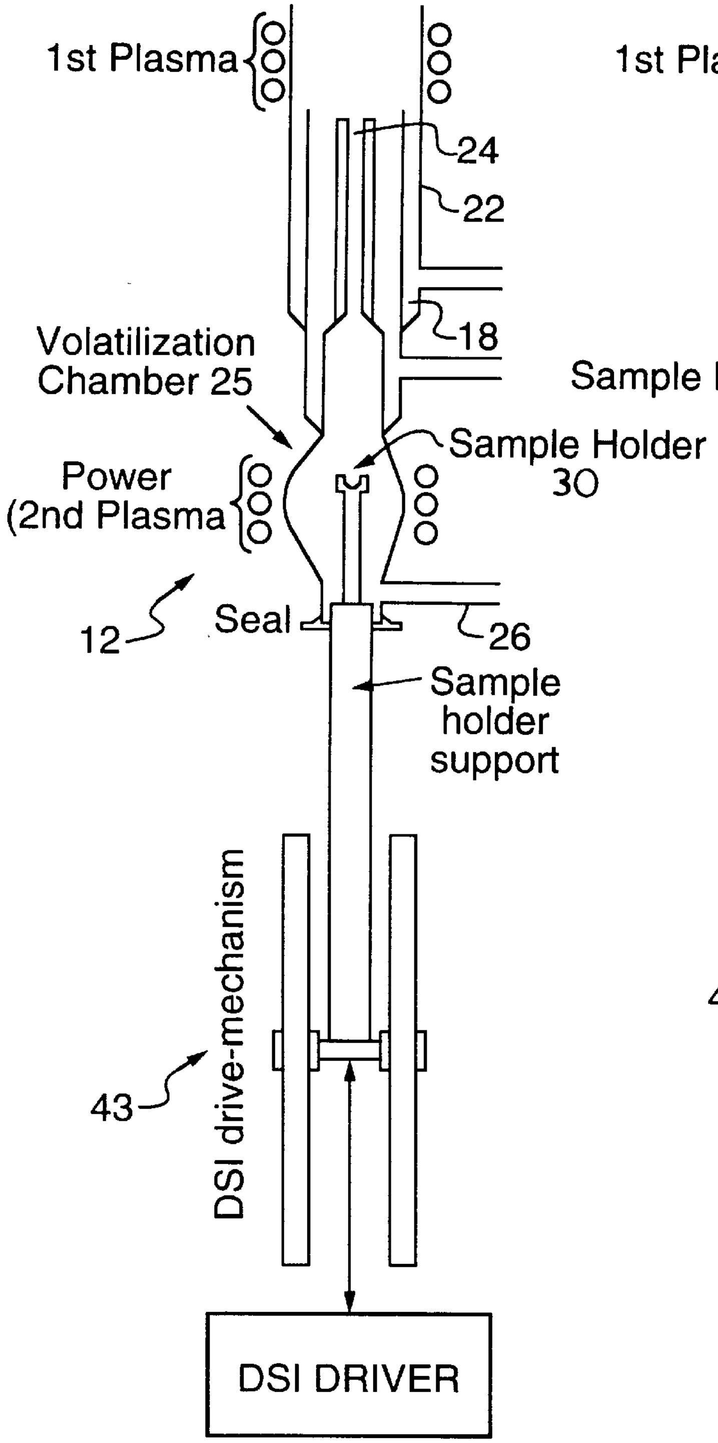
Figure 15B:
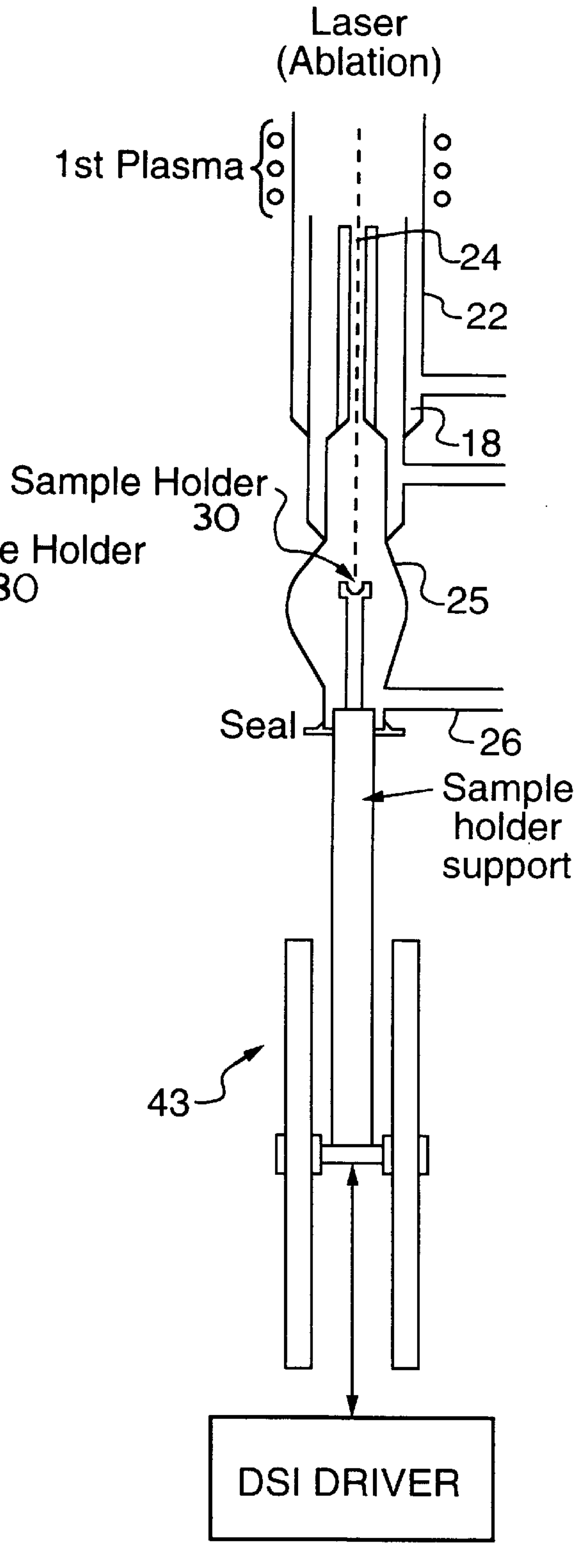
Figure 16:
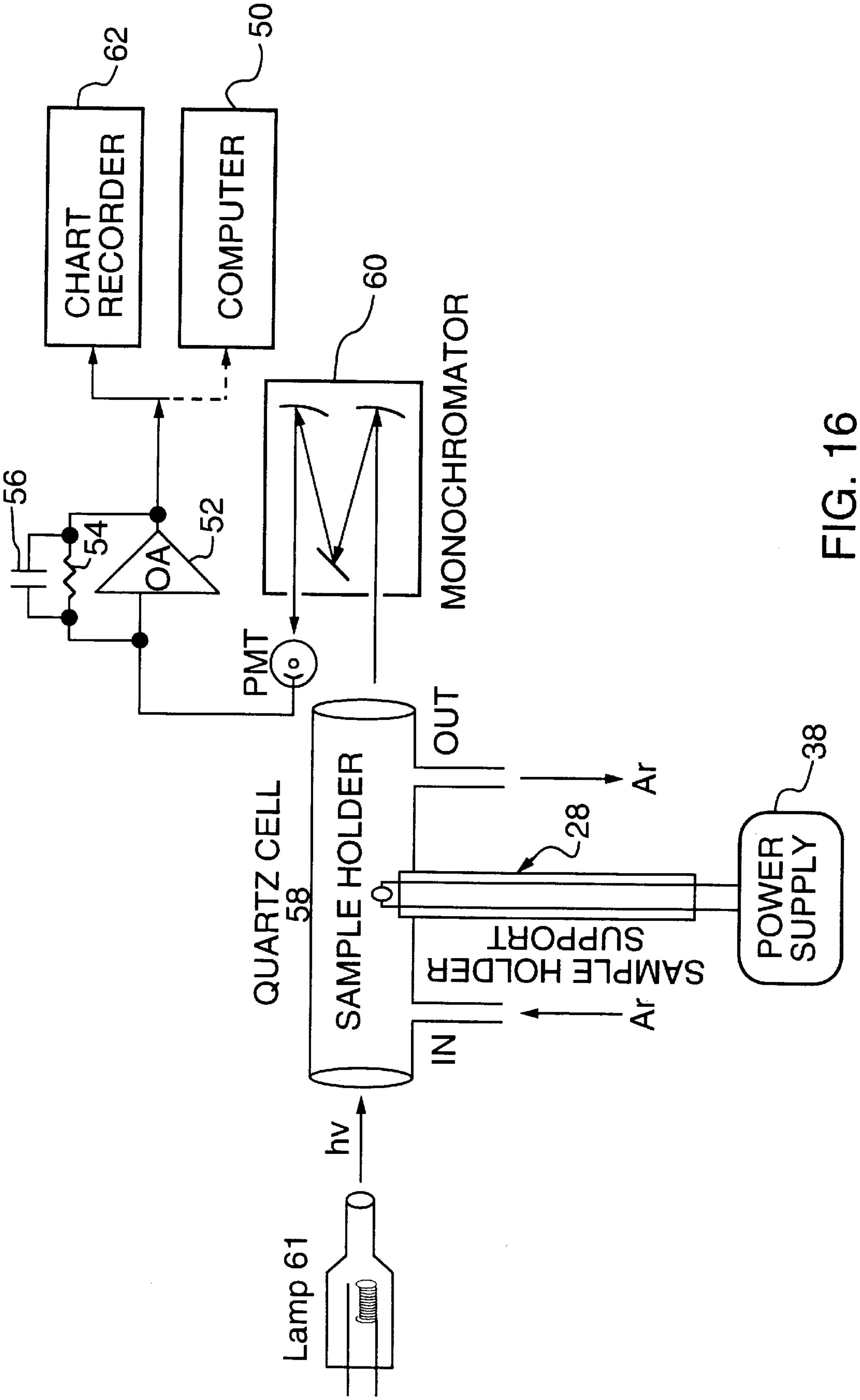
Figure 17:
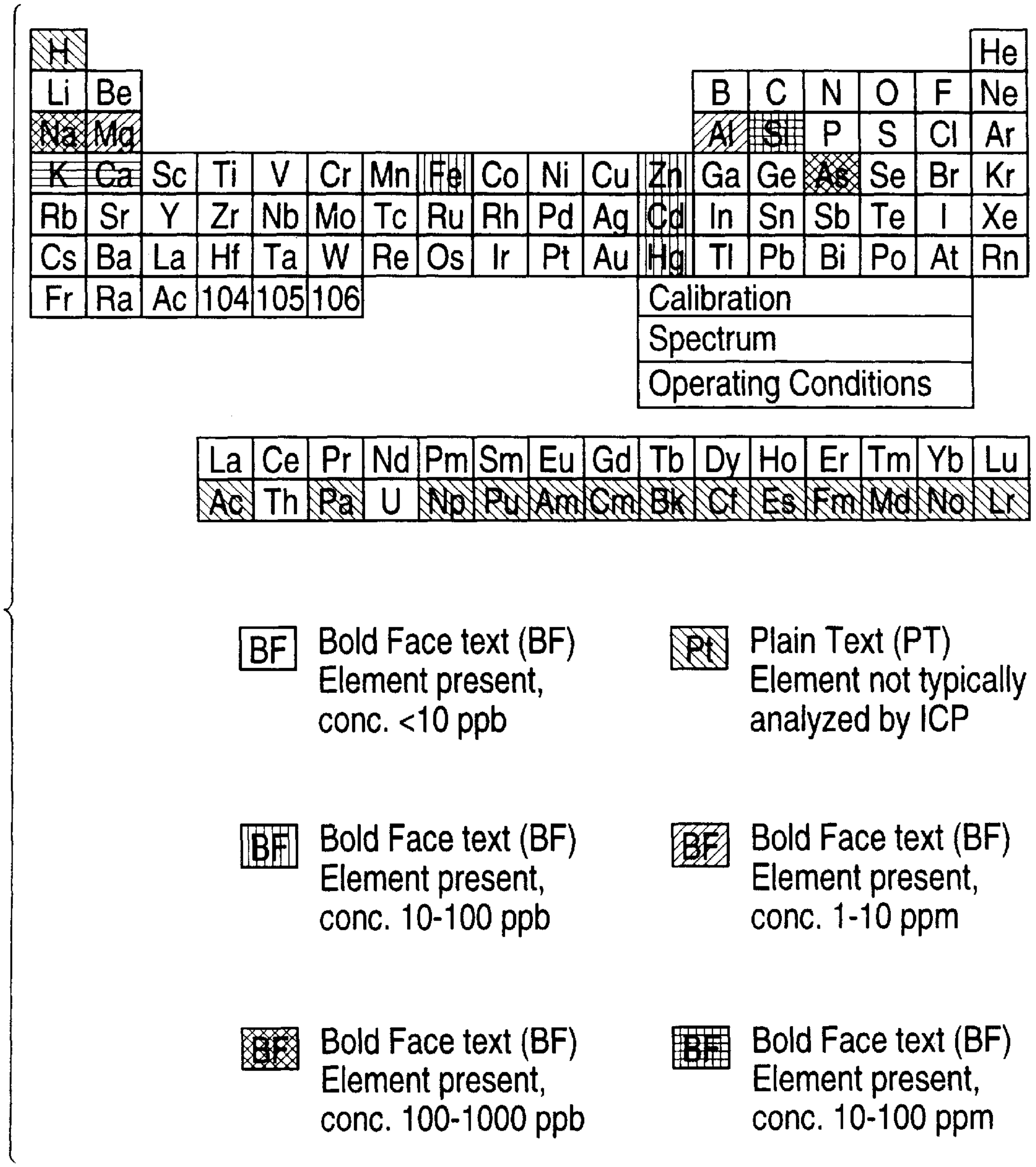
Figure 18:
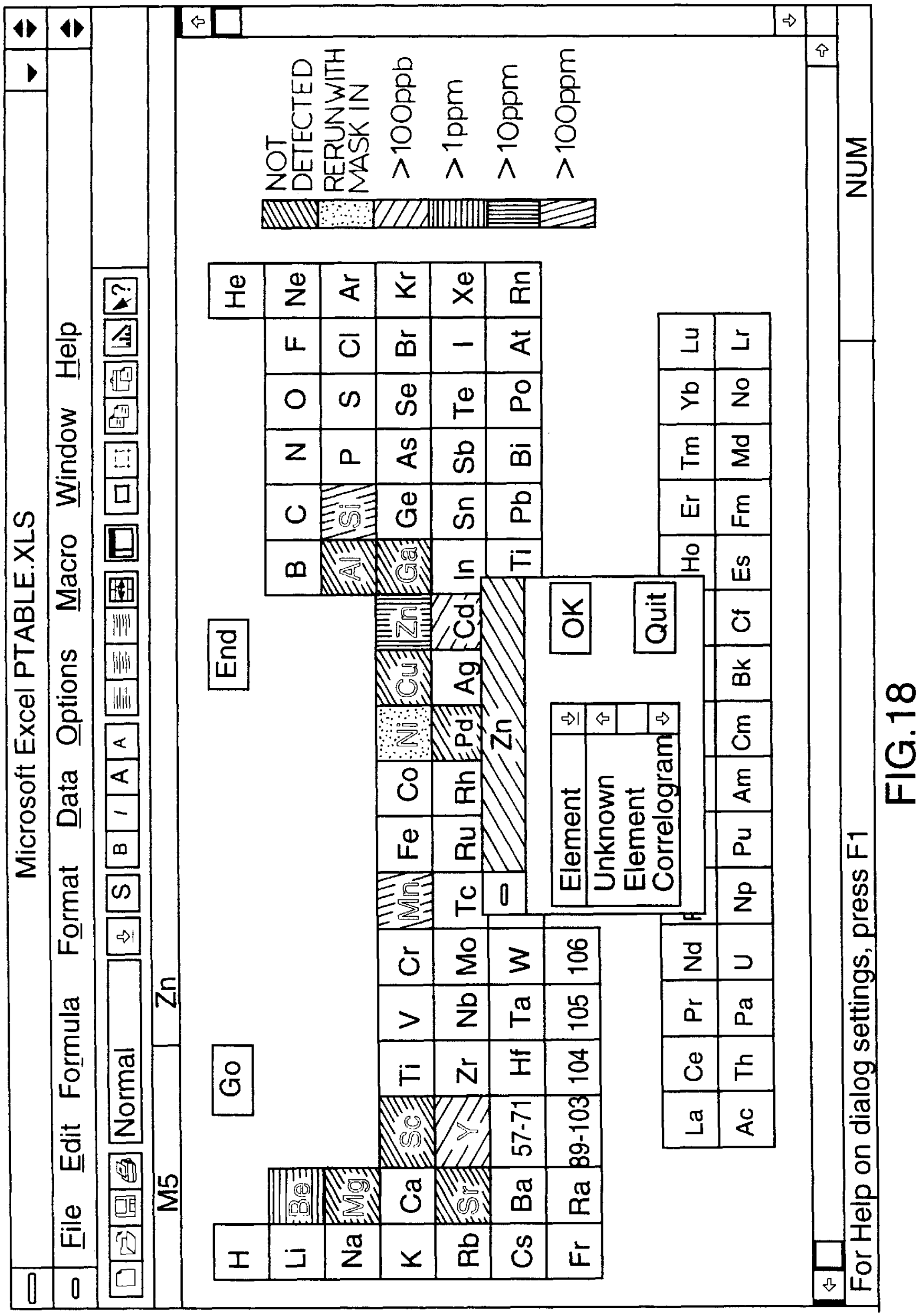
Figure 19A:
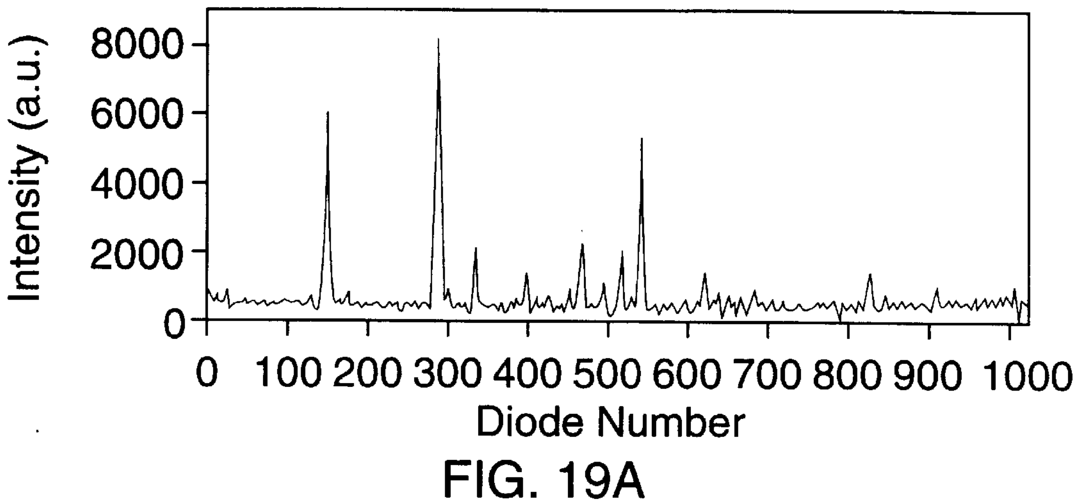
Figure 19B:
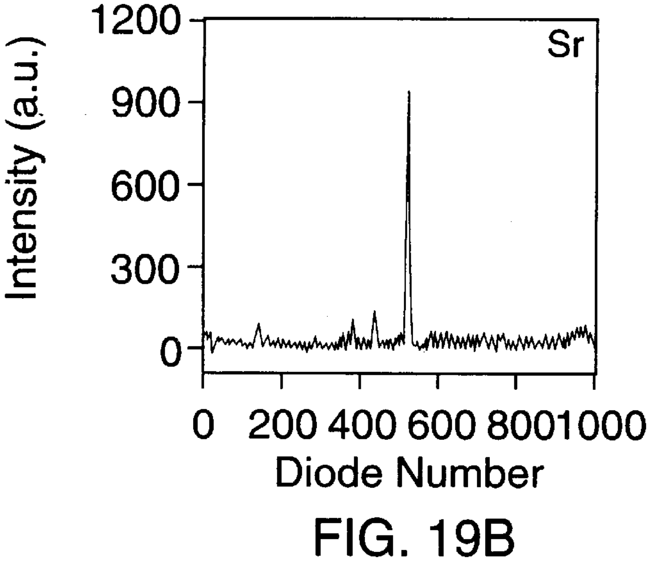
Figure 19C:
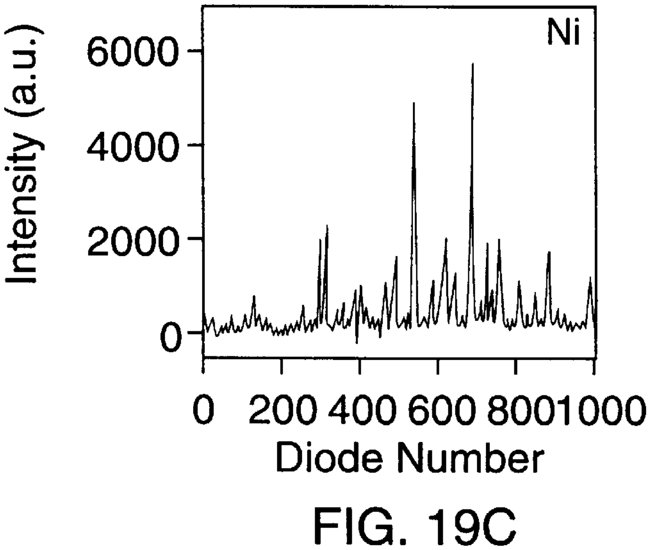
Figure 19D:
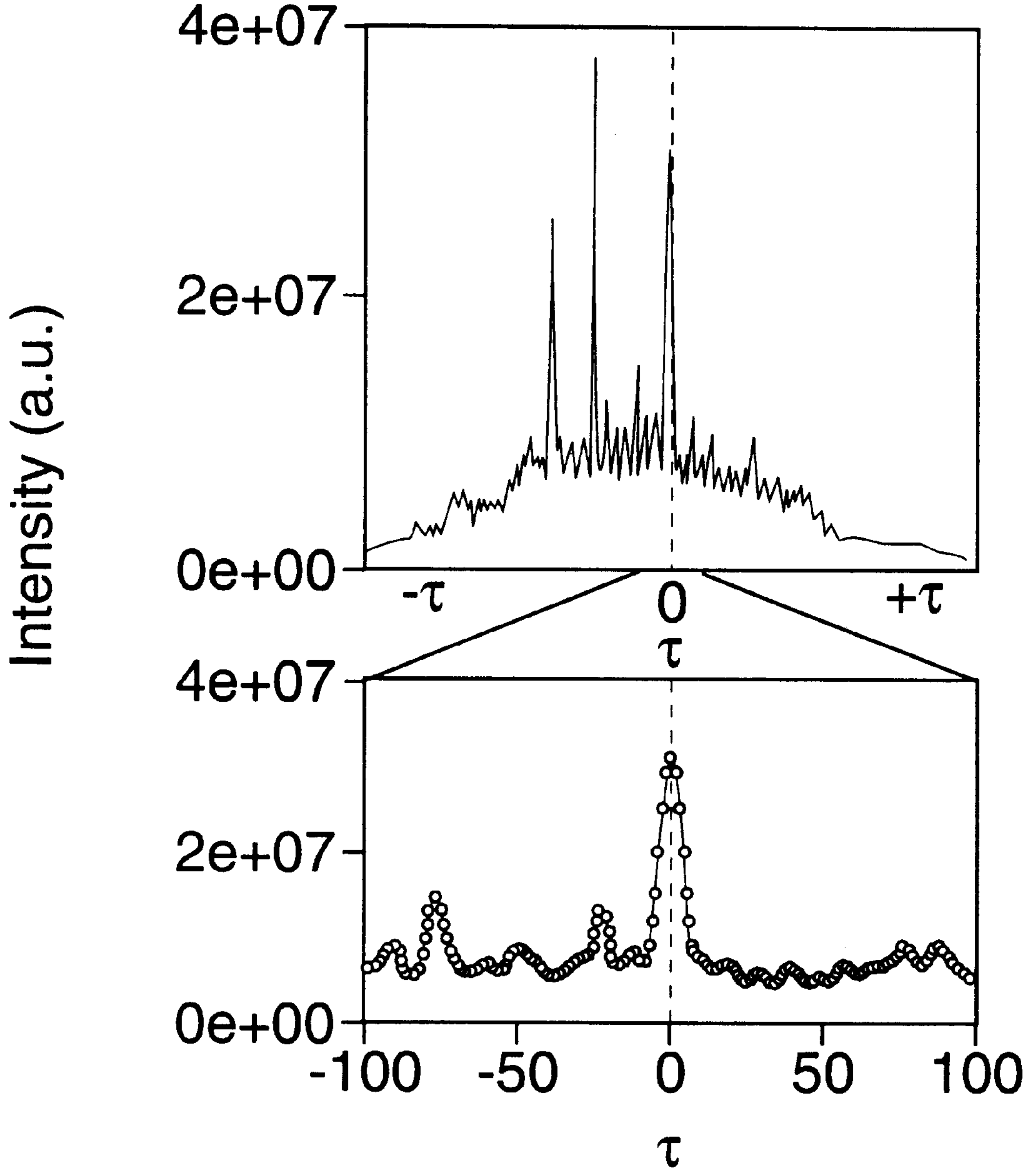
Figure 19E:
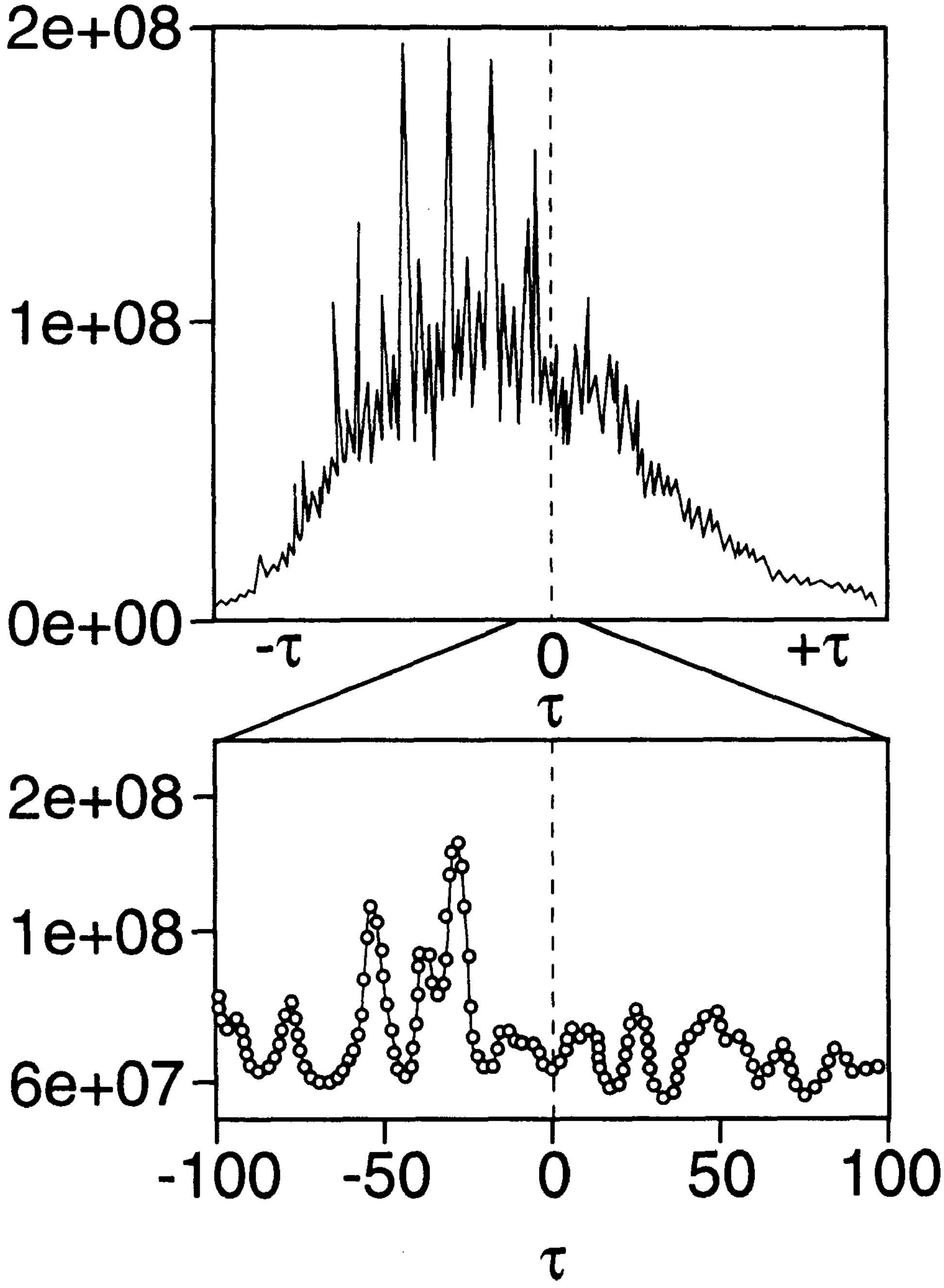
Figure 20:
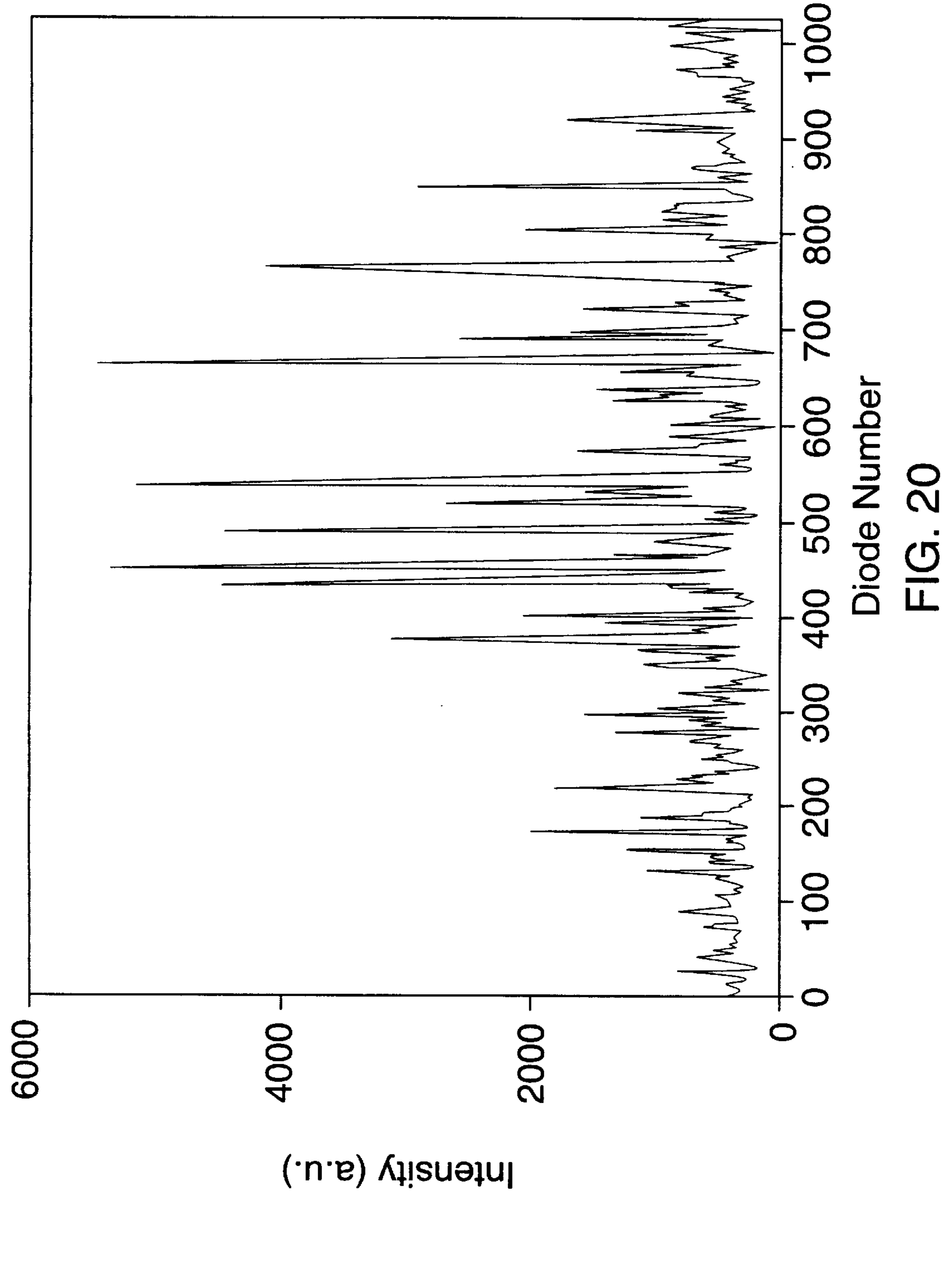
Figure 21A:
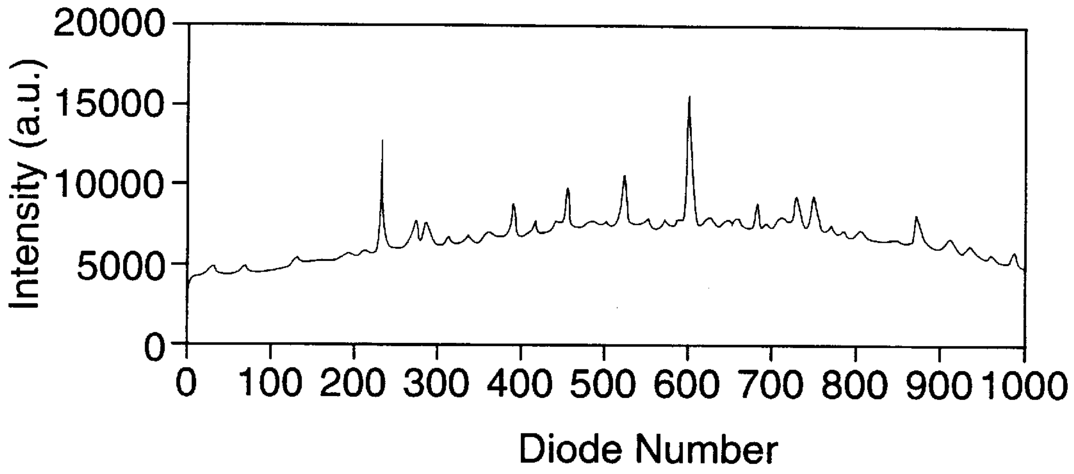
Figure 21B:
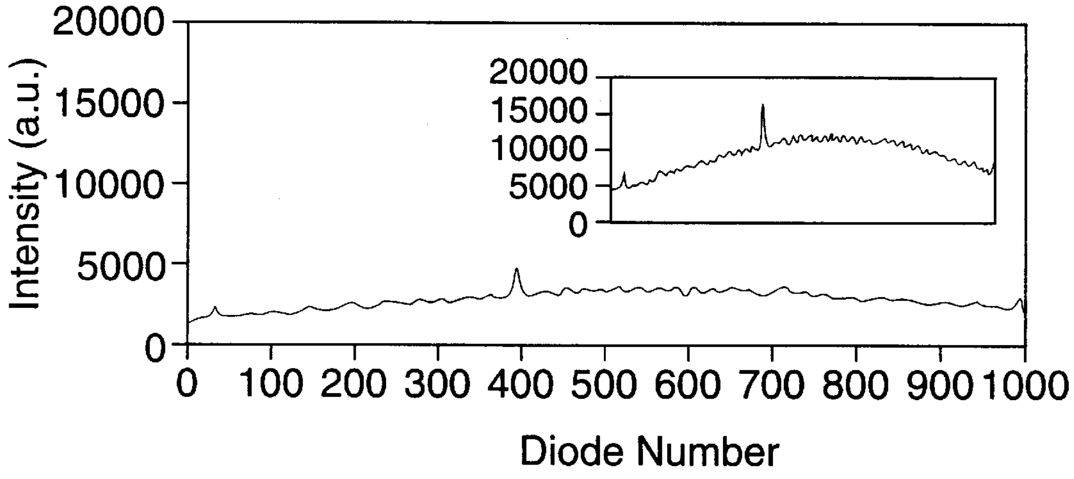
Figure 21C:
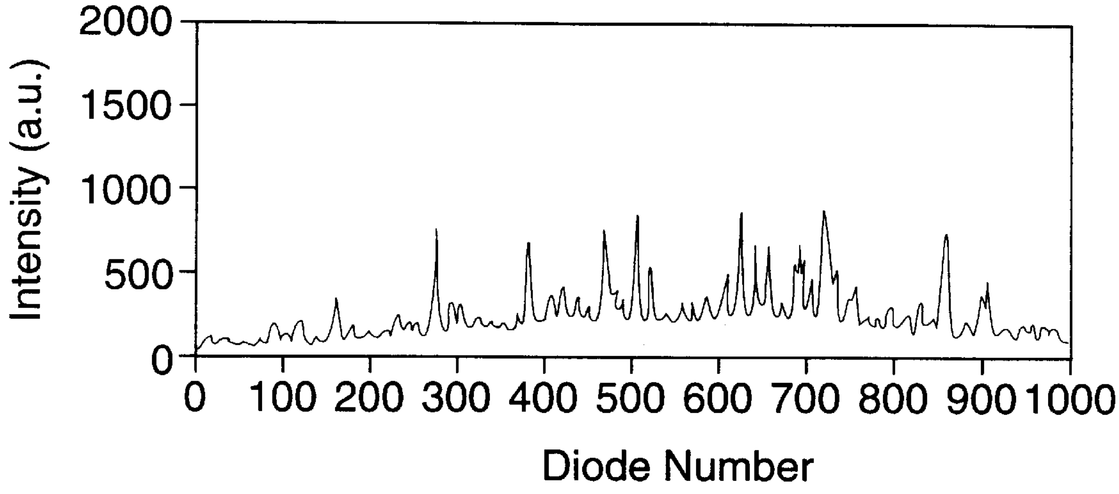
Figure 21D:
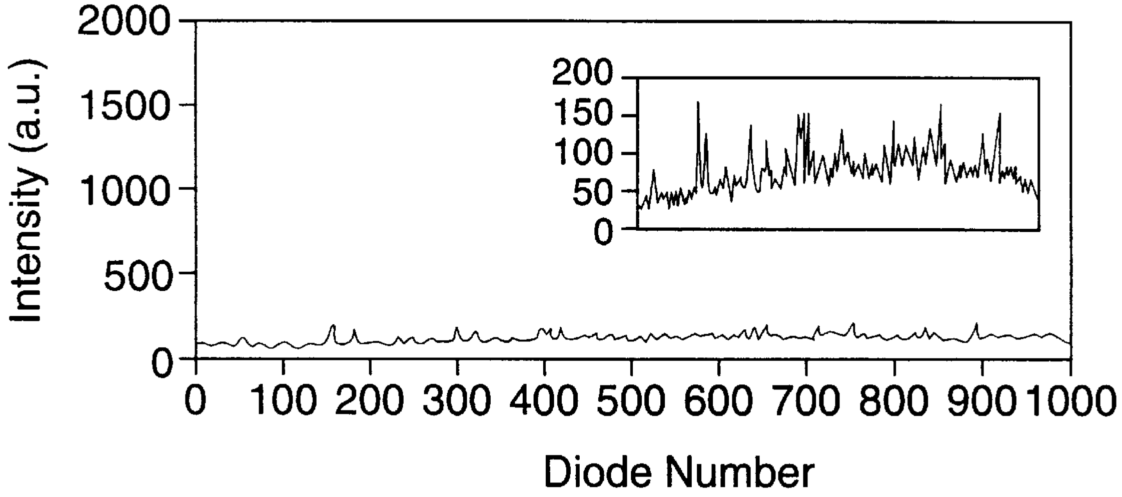
Figure 26A:
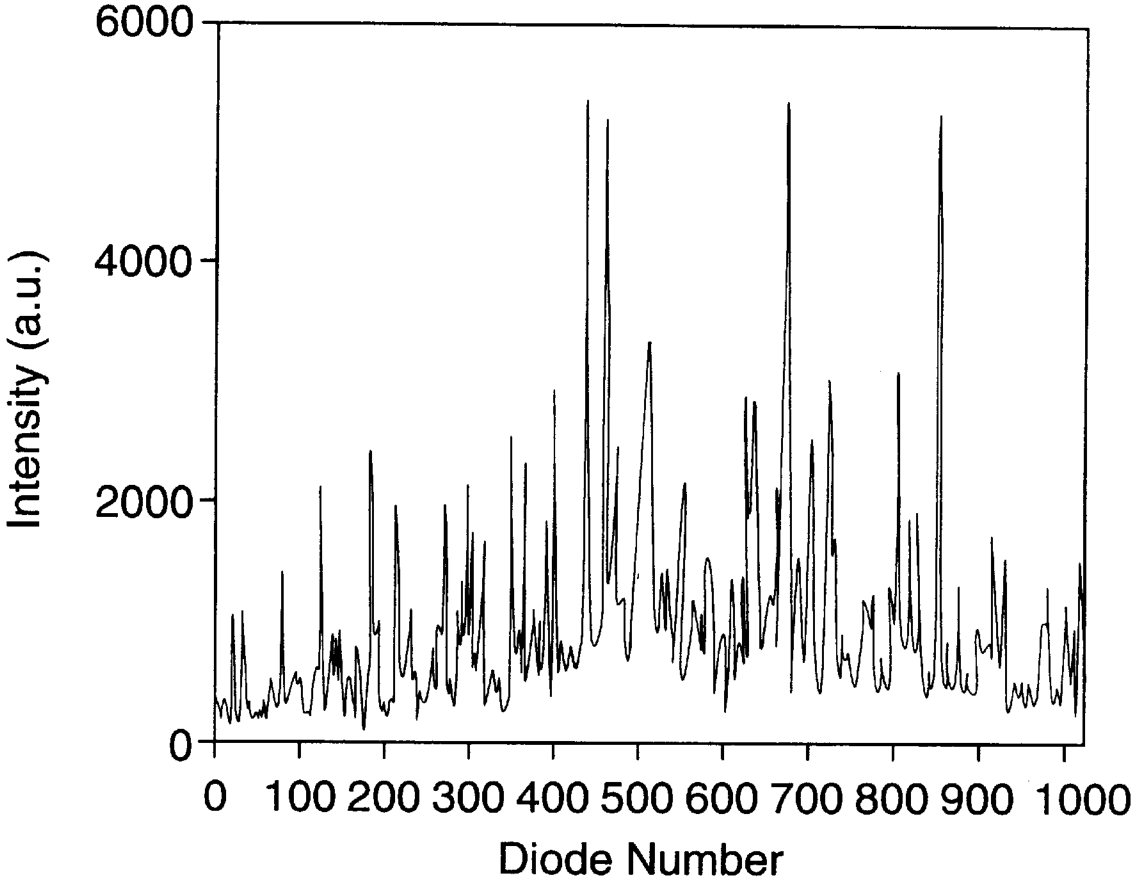
Figure 26B:
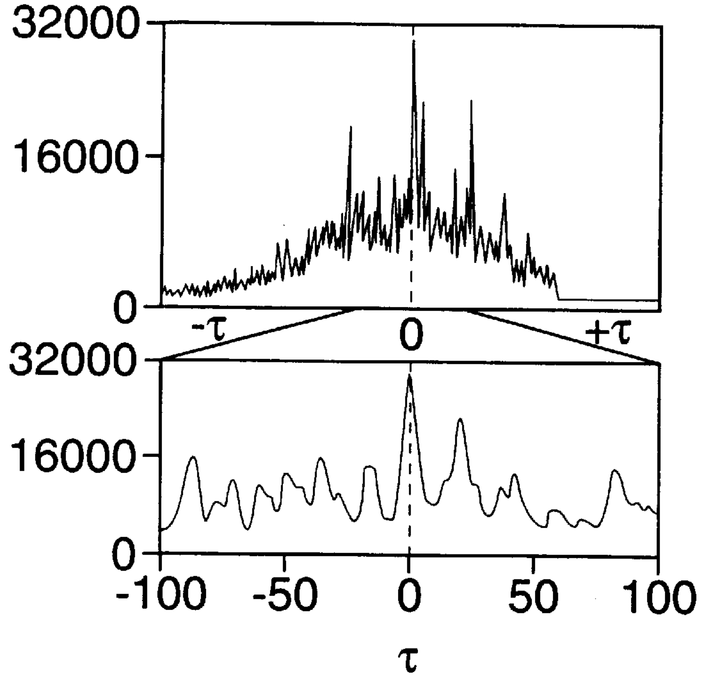
Figure 26C:
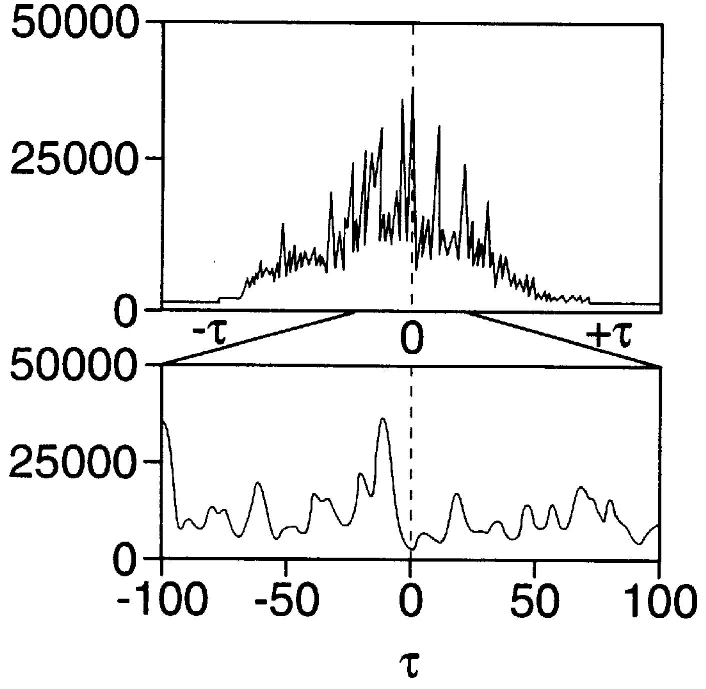
Figure 27:
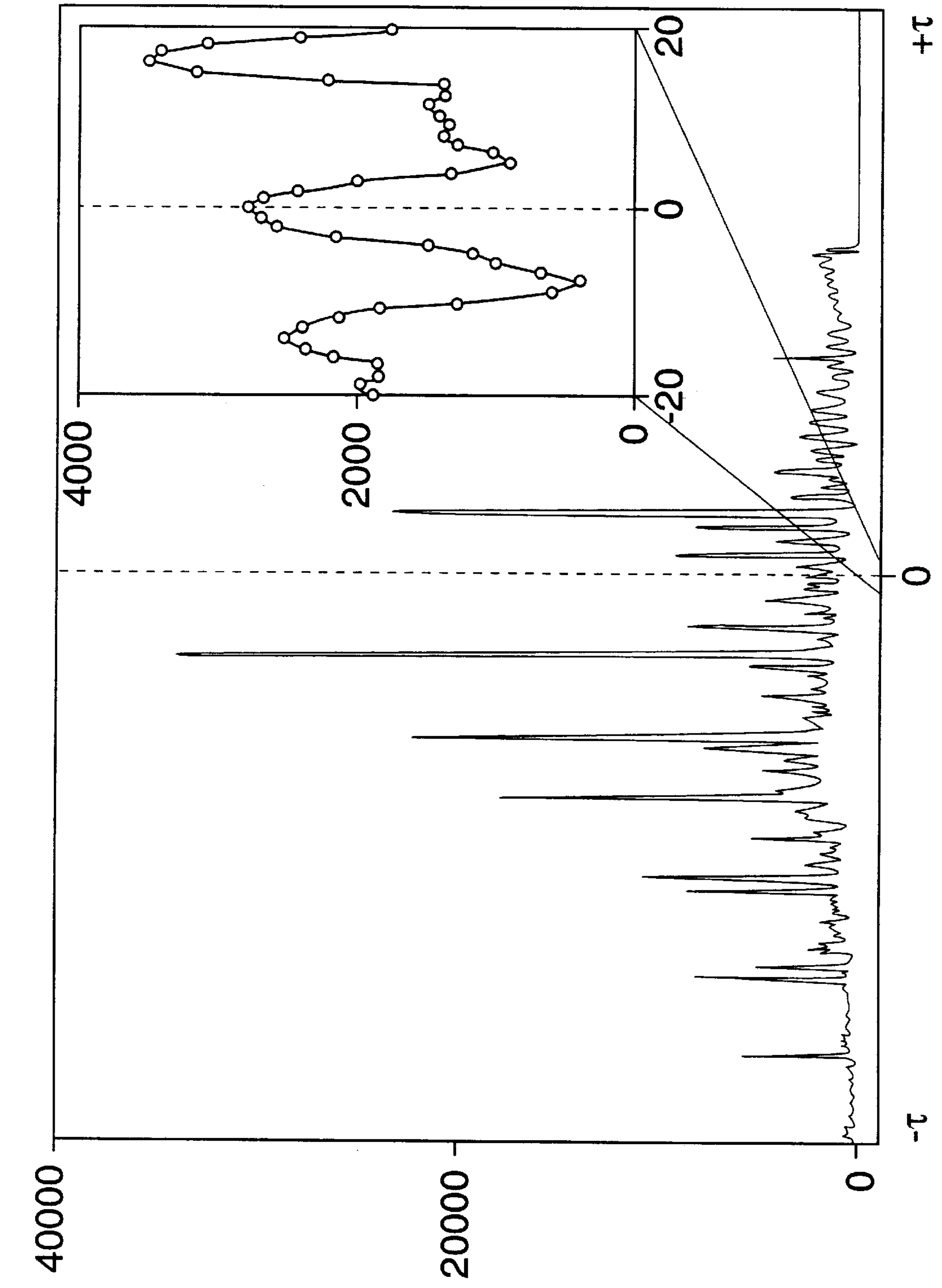
Figure 28A:
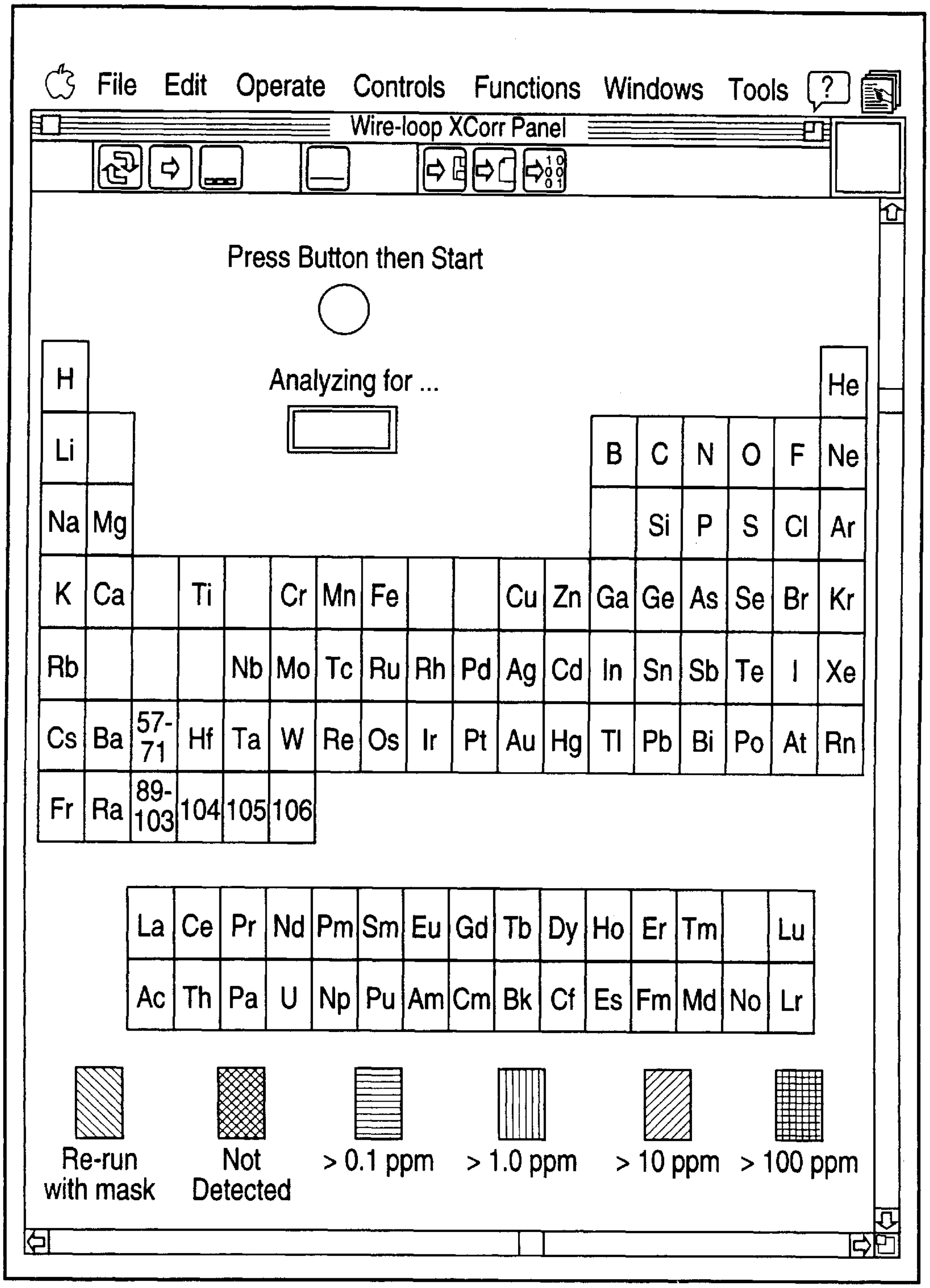
Figure 28B:
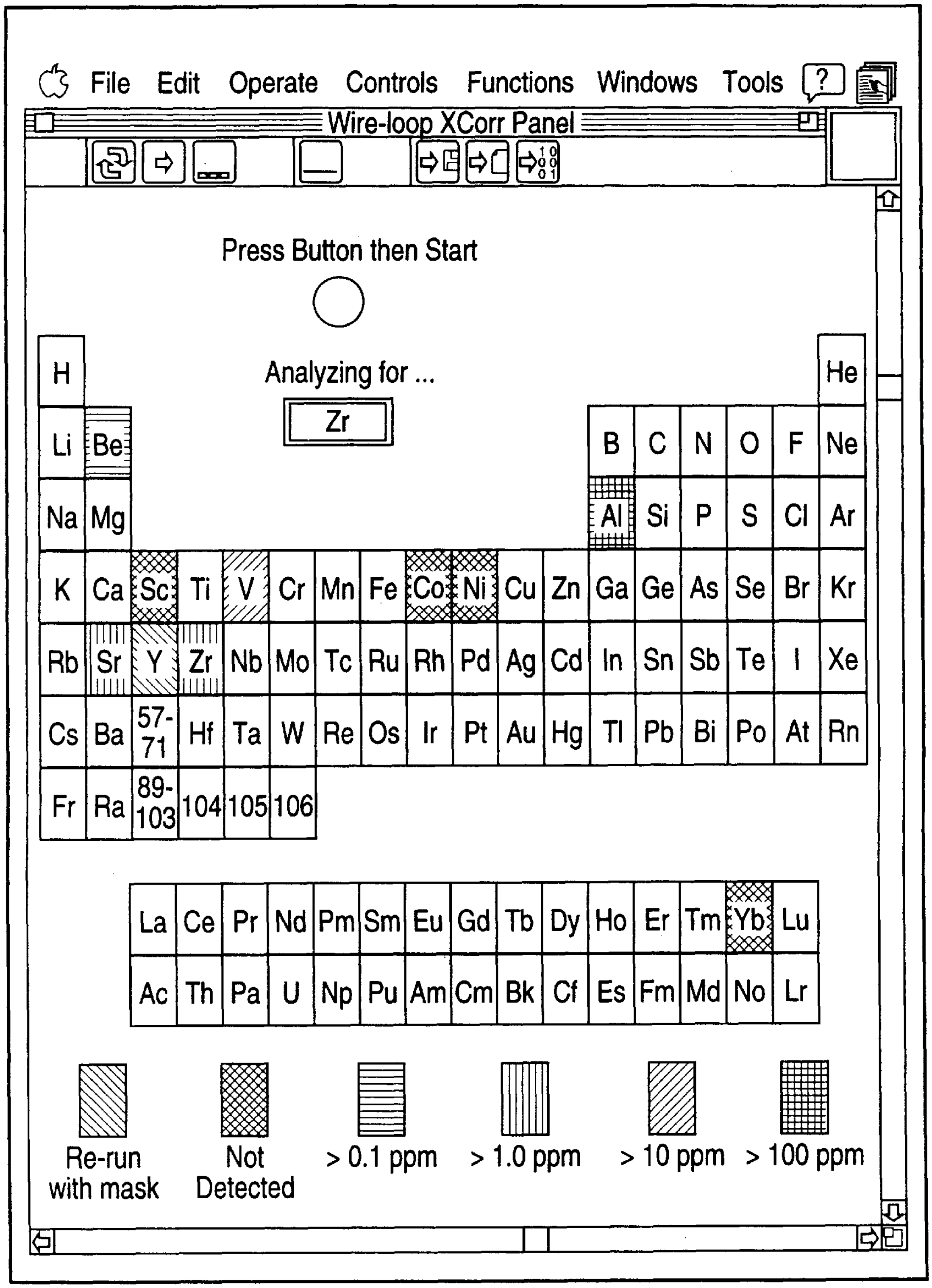

(*e*) illustrates results with a run of externally dried 10 μL of water, W mask with one slot (that lets through the 245.148 nm line) open; and (*f*) illustrates the results of a run with 10 μL of a 100 ppb Cu solution, externally dried, Cu mask with two slots (that let through the 324.754 nm and the 327.396 nm lines) open. In all cases, the detector saturates at about 16,000 counts;

FIG. 5 comprises parts (*a*), (*b*), (*c*) and (*d*), and shows the background subtracted raw spectra of externally dried solution residues for (*a*) 10 ng of Zn, three slots open on the Zn mask; (*b*) 10 ng of Mn, one slot open on the Mn mask; (*c*) 2 ng of V, one slot open on the V mask and (*d*) 1 ng of Sc, one slot open on the Sc mask;

FIG. 6 comprises parts (*a*), (*b*) and (*c*), and shows the background subtracted raw spectra of externally dried solution residues for (*a*) 200 pg of Y, one slot open on the Y mask; (b) 10 pg of Be, one slot open on the Be mask and (*c*) 5 pg of Sr, one slot open on the Sr mask;

FIGS. 7(A,B,C) illustrate examples of reproducibility using externally dried 1 ng of Sr (one slot open on the Sr mask);

FIG. 8 shows the calibration curves for Sr, Be and Y (slope: 0.9976, 0.9997 and 0.9967, respectively);

FIG. 9 comprises parts (*a*), (*b*) and (*c*), and shows the sensitivity of the wire-loop sample introduction system of the present invention to airborne Ca (the two slots open on the Ca mask let through the 393.366 nm and the 396.897 nm lines), wherein (*a*) represents a blank wire-loop run; (*b*) shows the signal for Ca after exposure to draft-free laboratory air for 6 min; and (*c*) shows the background subtracted signal for Ca;

FIGS. 10(A,B) is a scanning electron microphotograph showing (*a*) airborne particles on the wire-loop after exposure to laboratory air and (*b*) close-up of cluster of particles at 10 times magnification of (*a*);

FIG. 11 contains a schematic representation of an automated ITV sample introduction system according to an alternative embodiment of the invention;

FIG. 12 comprises parts (*a*), (*b*), (*c*), (*d*), (*e*) and (*f*), and illustrates analyte emission temporal behavior for: (*a*) Pb, 220.353 nm line, water blank; (*b*) Cd, 228.353 nm line, water blank; (*c*) Zn, 213.856 nm line, water blank; (*d*) Pb, 220.353 nm line, 50 ppb (500 pg) of Pb; (*e*) Cd, 228.353 nm line, 30 ppb (300 pg) of Cd; and (*f*) Zn, 213.856 nm line, 20 ppb (200 pg) of Zn;

FIG. 13 comprises parts (*a*) and (*b*), and illustrates analyte emission temporal behavior for (*a*) Sr, 407.771 nm line, 50 ppt (500 fg) and (*b*) Sr calibration curve (slope 0.96);

FIG. 14 comprises parts (*a*), (*b*), (*c*), and (*d*), and illustrates analyte temporal behavior recorded using ITV-ICP-MS for: (*a*) 1 ppb (10 pg) Zn; (*b*) 1 ppb (10 pg) Cd; (*c*) 1 ppb (10 pg) Pb; and (*d*) 1 ppm (10 pg) Sr;

FIG. 15 comprises parts (*a*) and (*b*) and illustrates a sample holder, DSI-mechanism according to a further alternative embodiment of the present invention with (*a*) plasma heating and (*b*) laser heating for laser ablation;

FIG. 16 illustrates the ITV sample introduction system according to the present invention using atomic absorption or atomic fluorescence;

FIG. 17 shows a "clickable" (e.g. interrogatable) periodic table for results presentation, according to a further aspect of the present invention, wherein color has been replaced by patterns;

FIG. 18 shows a screen print-out in black-and-white, of a color, clickable periodic table according to the embodiment illustrate in FIG. 18;

FIG. 19 comprises parts (*a*), (*b*), (*c*), (*d*) and (*e*), and illustrates spectral patterns for: (*a*) a multielement mixture containing Al (5 ng), Be (100 pg), Sr (100 pg) and Y (3 ng); (*b*) for Sr (10 ng); (*c*) for Ni (1 jig), and cross-correlograms for: (*d*) the spectral pattern of the multielement mixture and the spectral pattern for Sr; (*e*) the spectral pattern of the multielement mixture and the spectral pattern for Ni;

FIG. 20 shows the spectral pattern from a multielement mixture of Be (10 ng), Sr (20 ng), Y (10 ng) and Zr (40 ng);

FIG. 21 comprises parts (*a*), (*b*), (*c*) and (*d*), and illustrates: (*a*) plasma background with the hardware mask removed from the mask holder and a 3 second integration time; (*b*) plasma background with the upper part of the mask holder blocked and with a 3 second and a 10 second integration time (insert); (*c*) plasma background subtracted wire-loop water-blank run using a high power level and the mask removed; (*d*) plasma background subtracted wire-loop water-blank run using a high power level and partially blocked mask (insert: 10 times scale expansion);

FIG. 22 comprises parts (*a*) and (*b*) and shows spectral patterns for: (*a*) 10 ng Al; and (*b*) 300 ng Co;

FIG. 23 comprises parts (*a*), (*b*), (*c*) and (*d*), and shows (*a*) the spectral pattern for 10 ng of Be; (*b*) the corresponding binary spectral pattern for Be; (*c*) the spectral pattern for 10 ng of Y; (*d*) the corresponding binary spectral pattern for Y;

FIG. 24 comprises parts (*a*), (*b*), (*c*) and (*d*), and illustrates: (*a*) binary spectral pattern for V; (*b*) binary spectral pattern for Y; (*c*) binary software mask for V; (*d*) binary software mask for Y;

FIG. 25 comprises parts (*a*) through (*g*), and illustrates binary software masks for: (*a*) Al; (*b*) Co; (*c*) Ni; (*d*) Sc; (*e*) Sr; (*f*) Yb; (*g*) Zr;

FIG. 26 comprises parts (*a*), (*b*) and (*c*), and illustrates: (*a*) the spectral pattern from a multielement mixture containing Co (1 jig), V (100 ng) and Zr (10 ng); (*b*) the cross-correlogram of multielement mixture with the binary software mask for Co (FIG. 26*b*); (*c*) cross-correlogram of multielement mixture with binary software mask for Ni (FIG. 26*c*);

FIG. 27 illustrates a cross-correlation pattern showing a small peak at T=O; and FIG. 28 comprises parts (*a*) and (*b*), wherein (*a*) shows a periodic table user interface at the beginning of a run; and (*b*) periodic table user interface at the end of a run.

GENERAL DESCRIPTION OF INVENTION

Figure 1B:
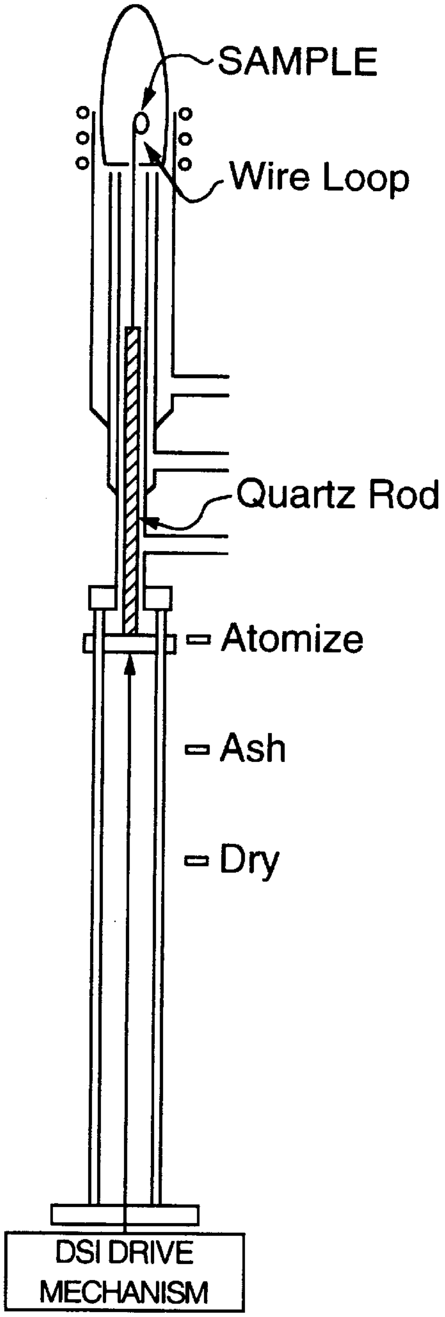
FIG. 1B (PRIOR ART)
Figure 1C:
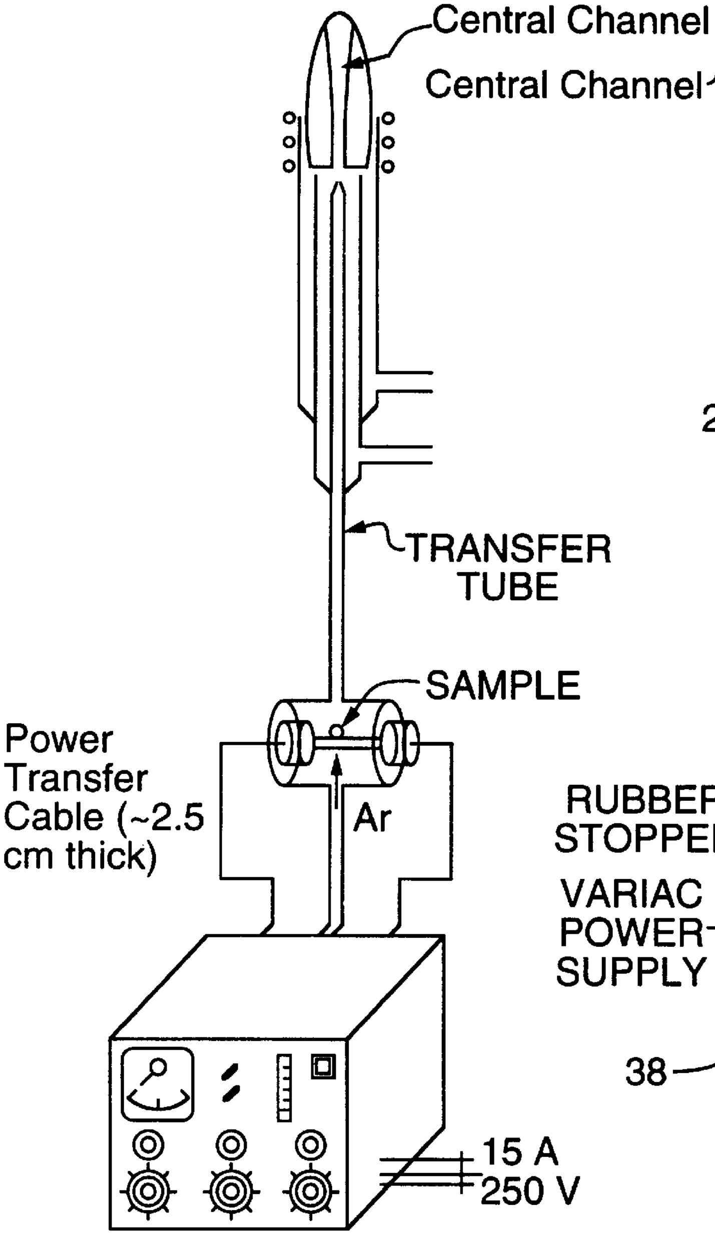
FIG. 1C (PRIOR ART)
Figure 1D:
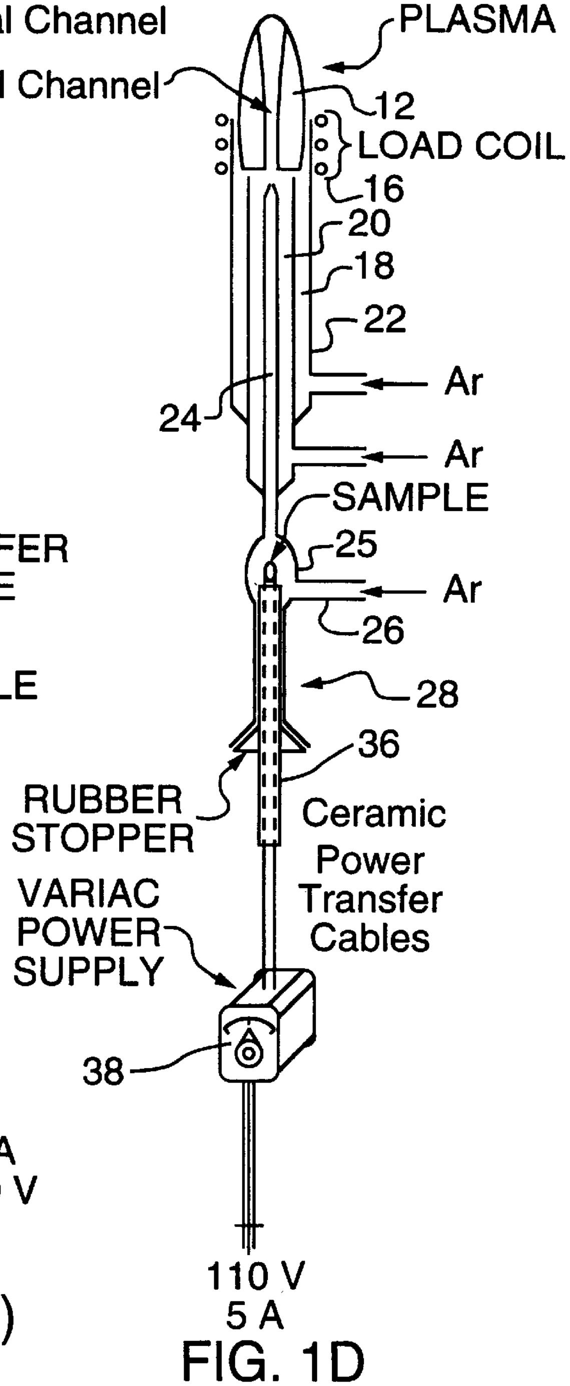

The electrically-heated wire loop, in the torch vaporization sample introduction system of the present invention has some resemblances to the direct sample insertion (DSI) and electrothermal vaporization (ETV) systems of the prior art. Similar to ETV (FIG. 1*c*), an external power supply is used to vaporize the sample and, as with a typical DSI-ICP, the sample carrying probe (e.g. a graphite cup, FIG. 1*a*, or wire loop, FIG. 1*b*) is inserted through the central tube of a modified torch into the plasma and the ICP is used for sample vaporization, atomization, excitation and ionization. In addition, similar to a typical DSI-ICP, the sample carrying probe, namely the filament/wire-loop, of the ITV system is inserted into the central tube of a modified torch.

However, unlike the typical DSI-ICP and the typical ETV-ICP, the top of the sample carrying probe is positioned about 10 cm below the plasma, a separate power supply is used for sample vaporization and to help form a well-defined central channel, the diameter of the central tube near the top is reduced and the bottom of the torch is sealed.

DESCRIPTION OF PREFERRED EMBODIMENT

Referring to the drawings, the ITV sample introduction system of the present invention for the introduction of materials to be analyzed by an ICP is shown schematically in FIGS. 1*d*, 2*a*, 2*b*and 2*c*. As seen therein, an inductively-coupled plasma device 10 (Fassel-type torch) of conventional construction includes a plasma 12 with a central channel 14 and load coil 16, fed by Ar through outer and intermediate feed channels 18, 20 in an enlarged gas tube 22. An inner axial tube 24 serves, in the present invention, to feed the sample to the plasma for vaporization, atomization and excitation and subsequent analysis.

The central tube 24 has an enlarged diameter chamber 25 communicating with an inert gas inlet 26 for transport of materials volatized in the chamber 25 to the plasma 12.

The sample introduction device 28 comprises a coiled tungsten wire or filament 30 (FIG. 2) onto which small quantities of a sample (e.g. 10 μL) may be placed for testing. According to a successful prototype, the wire 30 weighs about 0.02 g, is of 35 mm length and 0.25 mm in diameter, and is formed into three 2.5 mm diameter loops.

The ends of the coil wire 30, which are approximately 12 mm in length, are press-fit against single strand Tin in Copper bus-bar transmission cables 32, 33 placed in elongate apertures 34 in a cylindrical thermocouple insulator ceramic element 36. The preferred diameter of the cables 32, 33 is 1.1 mm. The ceramic element 36 provides good thermal and electrical insulation and provides physical support for the wire loop 30. The ceramic element 36 may be provided with a rubber stopper 40 or other sealing element, to mount the sample introduction device 28 to the ICP device 10 at the lower end of the central tube 24.

For analysis of a material positioned on the wire loop 30, the sample holder, comprising the ceramic element 36 and the wire loop 30 is inserted, usually manually, into the central tube 24 of the ICP device 10 so that the wire loop is located in the enlarged chamber 25 with the stopper 40 sealing off the lower end of the central tube 24. The sample holder may subsequently be retracted from the central tube 24 so that a new sample can be deposited onto the loop. Between runs, the ICP device 10 may be operated uninterrupted, open at the lower end of the glass tube 22. When inserted into the ICP device 10, the wire loop 30 is typically positioned about 10 cm below the plasma 12.

The wire loop 30 may be provided with current through the cables 32, 33 by any convenient power source, for example, a variac dc or ac power source 38 for generating up to 30 Watts, from which the applied power may be adjusted manually, if desired. When the ITV device 28 is positioned in the ICP device 10, power is passed through the wire loop 30 to vaporize the sample in the chamber 25 sufficiently for the evaporated material to be transported by the inert gas introduced via inlet 26 to the plasma 12.

Test Results

The ITV device 28 of the present invention has been tested using two ICP optical emission spectrometers: one with a photodiode array (PDA) detector (Example 1) and one with a photomultiplier tube (PMT) detector (Example 2). Spectral interference effects and preliminary analytical performance characteristics using the wire-loop design of the present invention are presented in the Examples below. As well, in Example 2, the impressive sensitivity of the device for ICP-MS is illustrated.

EXAMPLE 1

Diode Array Spectrometer

Figure 2A:
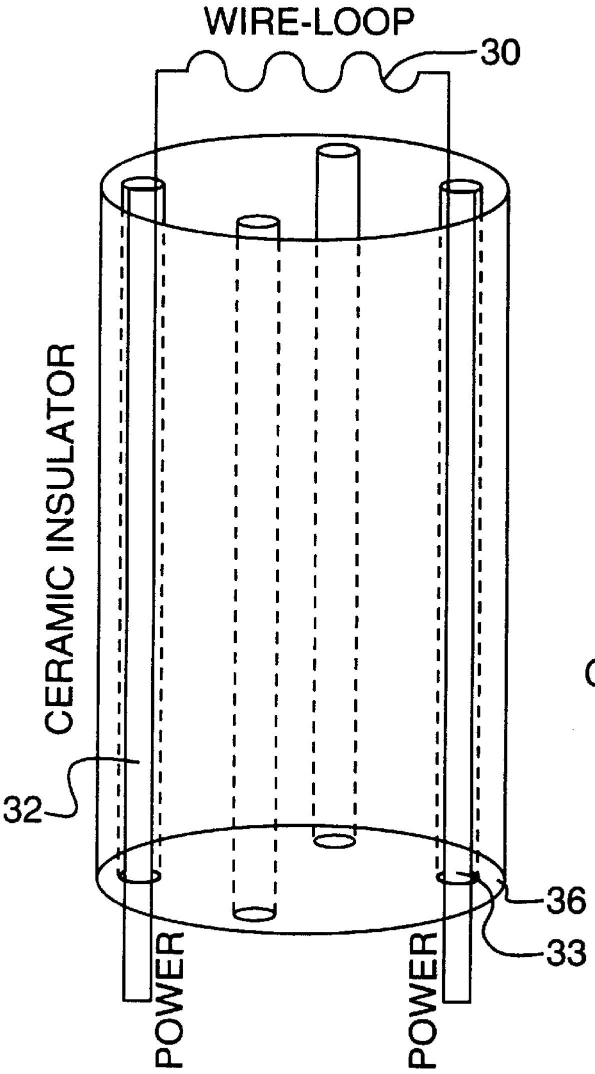
FIG. 2 comprises parts (*a*), (*b*) and (*c*) and shows an ITV sample introduction system provided in accordance with one embodiment of the invention, wherein (*a*) shows a ceramic insulator and W wire-loop; (*b*) is a top view of the ceramic insulator of (*a*); and (*c*) shows a ICP torch and ceramic inserted into a modified Fassel-type torch.
Figure 2B:
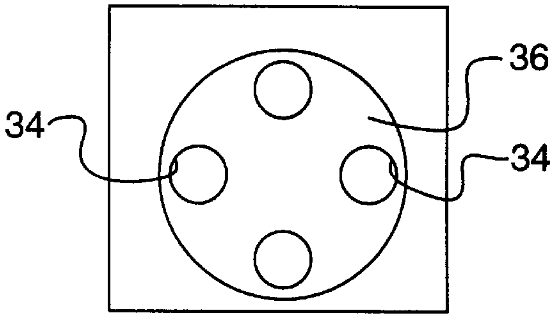
Figure 2C:
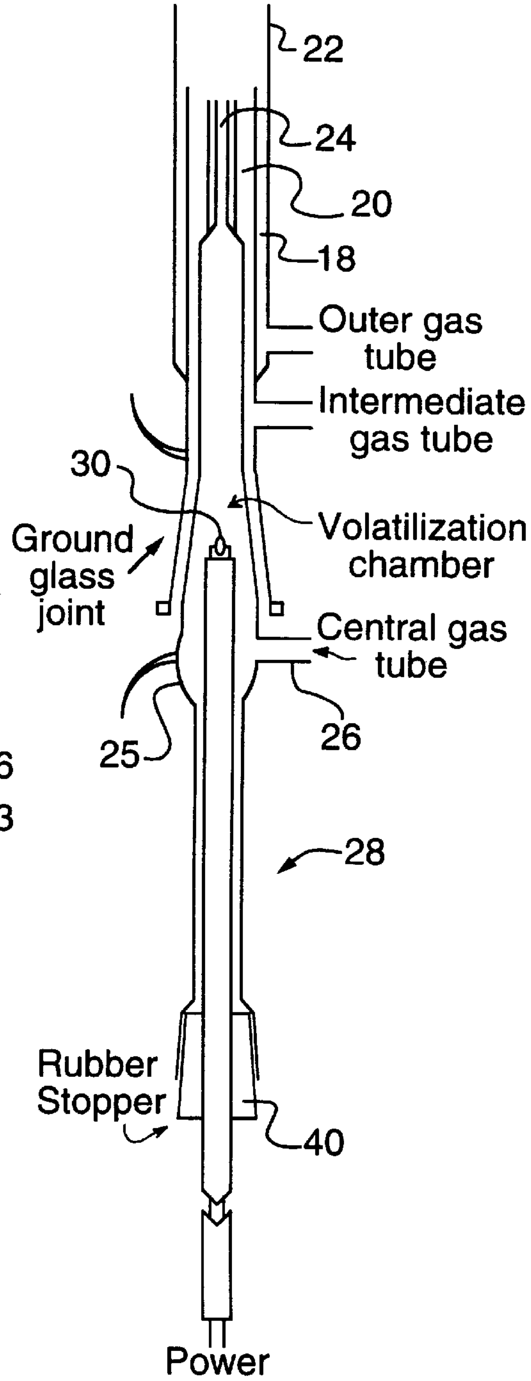
Figure 3A:
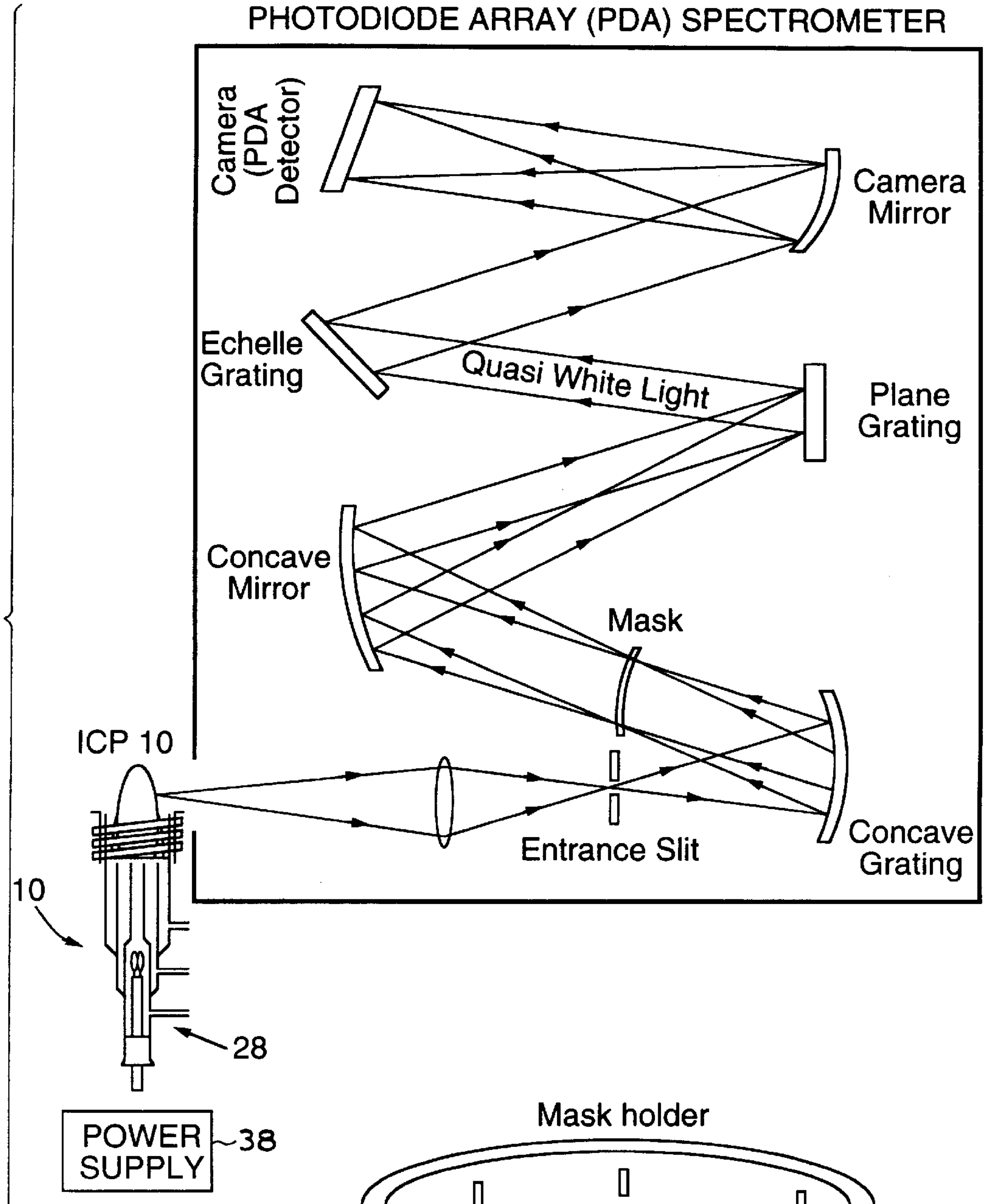
FIG. 3 comprises parts (*a*) and (*b*), where (*a*) is a schematic illustration of a photodiode array (PDA) spectrometer and (*b*) is a schematic representation of an optical mask, for testing the ITV sample introduction system of the present invention.

The test set-up for this Example is shown in block diagram form in FIG. 3, and a list of instrumentation and materials suppliers for the indicated components is provided in Table 1, appended to this disclosure as Appendix "A". The system comprises a manually operated and electrically heated wire loop 30 which is inserted into the modified ICP torch, as discussed above in greater detail with reference to FIGS. 1*d* and 2; power supply 38 (also as discussed above); and an ICP optical emission spectrometer 41 equipped with a 1024-element linear photodiode array (PDA) detector (FIG. 3*a*).

Figure 3B:
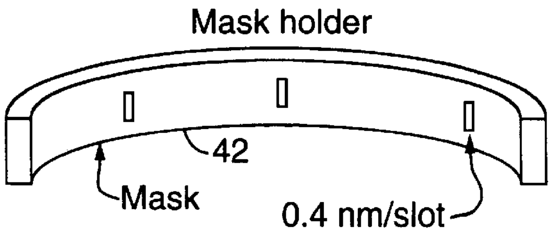

In this example, a small amount of sample is placed onto the wire-loop 30, so that the spectral signals observed during a run are transient. The transient nature of analyte emission dictates the use of a polychromator (or direct reader) for simultaneous, multi-element determinations. Briefly, analyte emission from the ICP 10 is first pre-dispersed in the spectrometer 41 using a low resolution concave grating polychromator (FIG. 3*a*). Desired narrow-wavelength regions are selected using a slotted mask 42 (FIG. 3*b*). The optical mask, which is placed at the focal plane of the pre-disperser polychromator, is a thin steel plate secured onto a metal frame with slots cut (machined) at appropriate positions to allow selected narrow wavelength regions to pass through. Even when only one mask-slot is open, due to the relatively large bandpass of the slots (typically about 0.4 nm/slot), more than one spectral line of the same element may appear on the PDA detector. Alternatively, lines arising from other elements present in a sample, from the matrix or from vaporized W from the wire-loop 30 may leak through the same slot and appear on the final spectrum, thus giving rise to potential spectral interference.

Spectral line selection is accomplished by simply changing the mask 42. Spectral regions selected by the mask are recombined to form a quasi-white parallel light beam which is directed to an echelle grating (FIG. 3*a*). The high resolution output spectrum of the echelle is focused on the linear 1024-element PDA detector. This optical configuration allows wavelength coverage from about 190 to 420 nm at high resolution. The absence of a cross-dispersing element, typically used with echelle spectrometers, means that many orders are incident on the detector simultaneously. Thus, a wavelength axis cannot be defined easily. As a consequence, the ordinate of all spectra shown in FIGS. 4–7, 9 and 10, discussed below, are labelled simply by diode number.

The transient emission signals generated by the wire-loop sample introduction system 28 of the present invention also dictate the use of readout electronics capable of digitizing emission intensities in real-time (ref. 1). Due to the inherently integrating nature of the PDA detector, optical emission spectral intensity was integrated directly on the detector. With the measurement electronics sub-system used in the illustrated test set-up, information about analyte emission temporal behaviour is lost. This integrated signal (i.e. peak intensity and peak area) is proportional to spectral intensity at the spectral line(s) of interest and, as a consequence, to concentration.

As indicated above, a list of instrumentation and equipment suppliers is provided in Table 1. The W wire 30 was supplied by a local electronics shop. Standard solutions of 1000 μg/mL were purchased from Leco (Be, Ca, Cu, Hg, Mn, Mg, Sc, V, Y and Zn) and from PlasmaChem Associates (Cu, W). Single element and multielement standard solutions were prepared by serial dilution with distilled/deionized water (18 MΩ Millipore system) of 1000 μg/mL standard stock solution. A 10 μL volume of a standard solution was placed onto the wire-loop 30 using an Eppendorff micropipette. For pneumatic nebulization sample introduction, a peristaltic pump/a glass concentric nebulizer and a spray chamber were used. A mass flow controller was installed on the nebulizer gas line. Typical operating conditions for pneumatic nebulization sample introduction and for the wire-loop system are given in Table 2, appended to this disclosure as Appendix “B”.

As mentioned earlier, a key component of the PDA-spectrometer 41 shown in FIG. 3*a* is the optical mask 42 (FIG. 3*b*). Single element and multielement masks were available for the test set-up described herein. Single element masks had slots cut for several emission lines for the same element. Multielement masks had one or two slots cut per element. Unless otherwise stated, only one slot was left open on the masks, the other slots were covered with thin stripes of black electrical tape. Table 3 (appended to this disclosure as Appendix “C”) lists the elements, wavelengths and spectral orders for the masks used in the test set-up disclosed herein.

Initially, solutions were dried by applying very low power (e.g. about 0.5 v root-mean-square (rms) at about 2.5 A) to the wire loop 30 for several seconds (eg. 30 seconds). As discussed below, significant spectral interference effects were observed when using this drying method. As a consequence, drying of solution samples was subsequently tried using a hair-dryer before vaporization.

For sample-residue vaporization, the power-control dial of the variac 38 was adjusted manually to about 2.5 V rms (at about 5 Amps), conveniently termed “regular power”. At this power setting, the wire-loop 30 glowed white hot. Data acquisition was initiated by pressing the “return” key of a controlling microcomputer (not shown) immediately before adjusting the power-control dial of the variac 38. Unless otherwise stated, the integration time was 8 seconds.

The integrated spectral intensities, initially stored on the controlling microcomputer using the manufacturer’s file format, were processed off-line. Spectra were transferred to an IBM PC compatible system where they were converted to tab-delimited ASCII using a Microsoft Excel® (Micrsoft, Redmond, Wash.) macro and were plotted on an Apple® Macintosh microcomputer using SigmaPlot® (Jandel Scientific, San Rafael, Calif.).

The sample insertion position proved to be a critical parameter for continuous and reliable operation of the system shown in FIG. 3*a*. For example, if the loop 30 was inserted a few mm above the position shown in FIG. 2*c*, a filament discharge (a radio frequency arc) would form. If not controlled or eliminated, this discharge could be pulled to the bottom of the torch upon sample holder retraction. When formed, this unstable (“wandering”) filament discharge would degrade reproducibility, mainly by over-heating the wire-loop 30 and/or by blowing e fuse of the variac 38, thus terminating a run unpredictably. Sometimes, it would even extinguish the plasma 12. It is worth noting that such arc discharge filament formation has been used to advantage for solid sampling ICP-AES (see P. B. Farnsworth and G. M. Hieftje, Spectrochim. Acta 46B, 85 (1991)).

The optimum position shown in FIG. 2*c*was established after lengthy experimentation. This position provides stable and reliable operation and no filament discharge formation. As well, at this position it was discovered that the wire-loop 30 could be used for more than 50 runs without any visible degradation of the surface of the wire-loop or of the analytical performance characteristics of the device. However, after prolonged use, it was discovered that the loop 30 became brittle and easy to break.

Figure 4A:
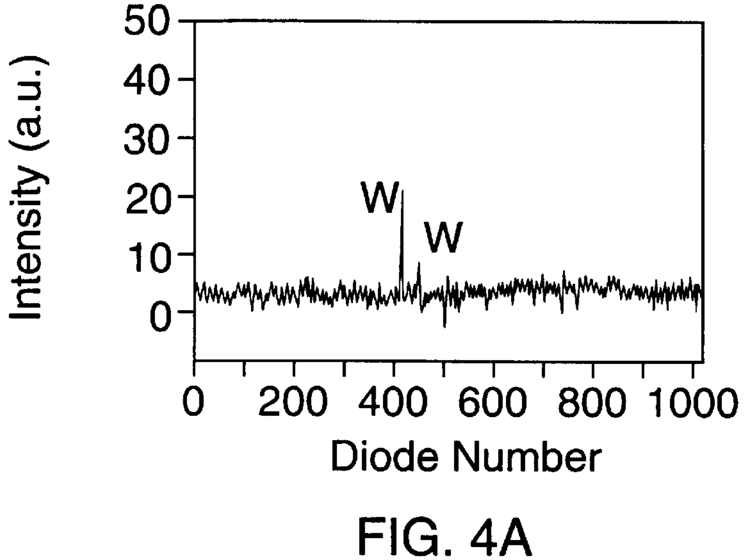
FIG. 4 comprises parts (*a*), (*b*), (*c*), (*d*), (*e*) and (*f*), and shows spectral interference from W using a Cu mask and a W mask, wherein (*a*) illustrates the results of a blank (bare) wire-loop run, W mask with one slot (that lets through the 245.148 nm line) open; (*b*) illustrates the results of a run with 10 $\mu$L of water blank, W mask with ten slots open (intensity axis scale expanded); (*c*) illustrates the results of a run with 10 $\mu$L of 1000 ppm Cu standard, Cu mask with five slots open; (*d*) illustrates the results of a run with 1000 ppm standard solution of W, pneumatic nebulization sample introduction and with the optical mask (FIG. 3*b*) removed.

As discussed briefly above, initially, samples were dried manually by applying low power for about 30 sec. Considerable spectral interferences were encountered using this method. For example, a blank wire run (i.e. nothing on the wire-loop 30) established that very little W was coming off the wire (FIG. 4*a*). It is interesting to note that the intensity of W emission observed between different wire-loops varied widely (emission intensities as high a few thousand counts were observed) even when W-wire from the same wire-spool was used. As well, W emission intensity was found to be dependent on power applied to the loop (W emission intensities increased at higher power levels), on central tube gas flow rate and on the age of the wire. New wire-loops gave intensities which were gradually reduced over time with continuous application of power. When wire-loops were pre-conditioned by applying about 20 Watts for 5 min with the wire-loop inserted in the torch, W emission dropped to low intensity levels, for example, as shown in FIG. 4*a*. As a consequence, all wire-loops were pre-conditioned before use.

Figure 4B:
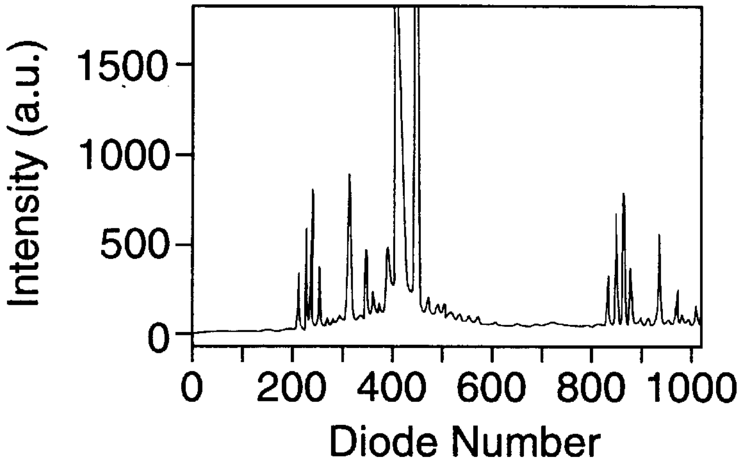
Figure 4C:
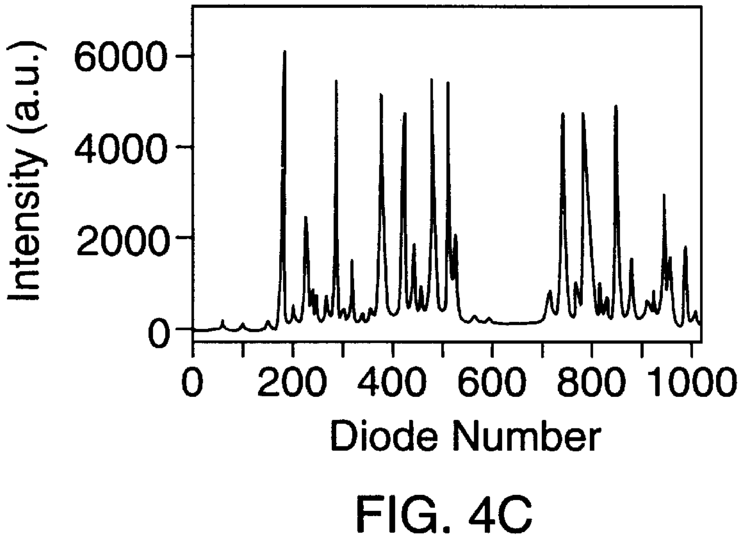
Figure 4D:
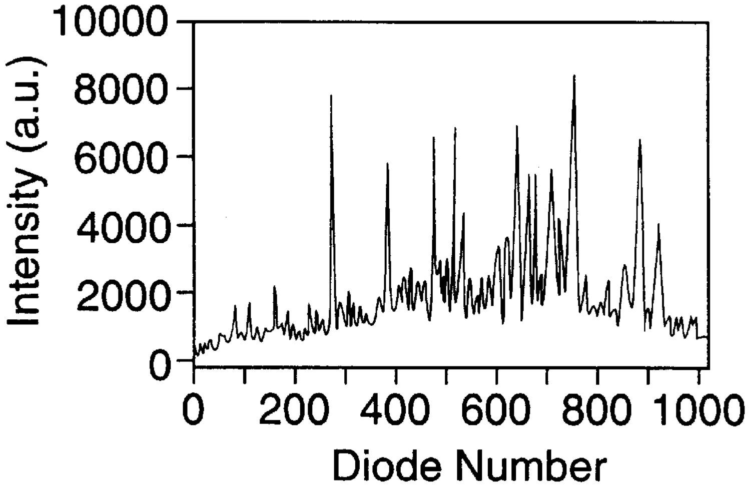

Even with pre-conditioned wire-loops 30, a water blank (i.e. 10 $\mu$L of 18 M$\Omega$ water placed onto the wire-loop and dried by applying low power), produced spectra with considerable complexity, for example FIG. 4*b*. This spectral complexity gave rise to significant interference effects during analytical runs. For instance, although Cu has a spectrum of three-peaks when a Cu mask with two slots open and a pneumatic sample introduction system are used (see V. Karanassios and G. Horlick, Appl. Spectrc. 40, 813 (1986)), considerable spectral overlaps exist when the wire-loop sample introduction system of the present invention is utilized (FIG. 4*c*).

Figure 4E:
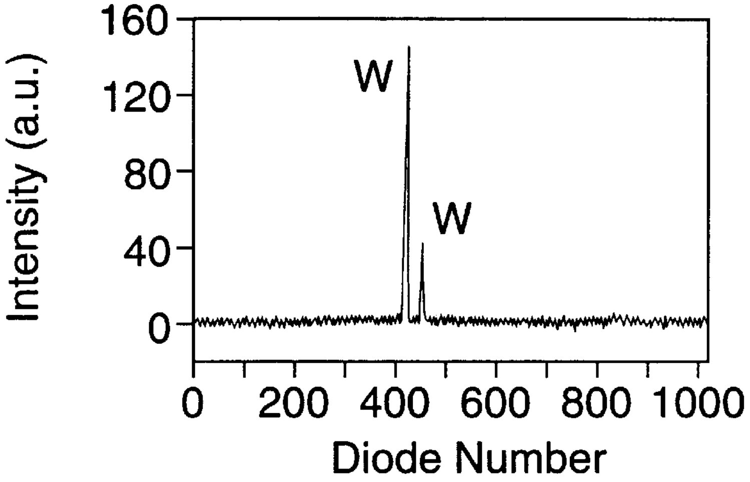
Figure 4F:
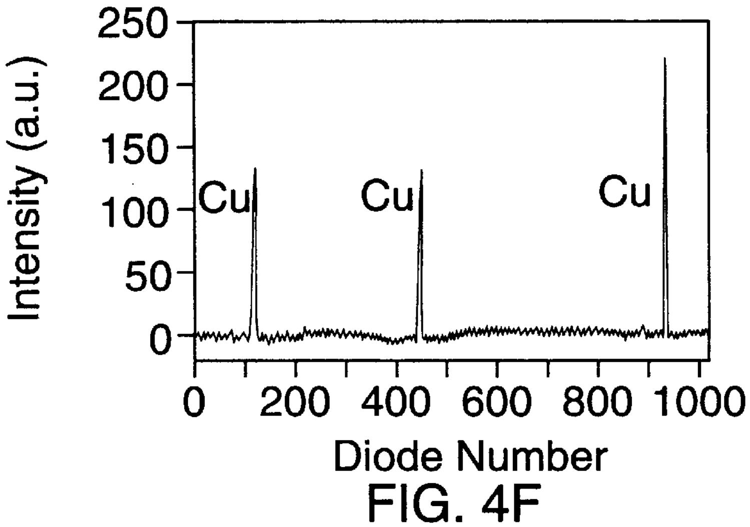

Visual observations provided some clues regarding the origin of these peaks. For instance, the blue-coloured residue that remained on the loop 30 at the end of the drying cycle began to vaporize at the onset of the vaporization cycle, akin to an atomization cycle in graphite furnace spectrometry, and was completely vaporized in as little as 6 seconds. Since there was only water on the loop, the formation of W oxide(s) was suspected. Although W does not react with water, it is oxidized by steam. The relatively low vaporization temperature of some W oxides, their complete vaporization from the wire-loop 30 and the high complexity of the W spectrum (FIG. 4*d*) corroborate the results presented for Cu. Since formation of W oxide(s) requires temperatures higher than those sufficient for drying samples and due to manual operation of the variac 38, such temperatures must have been attained. As discussed briefly above, this was tested by drying samples “externally” using a hair dryer before inserting the wire-loop 30 into the torch. The drying time was about 5 min. This drying method eliminated oxide formation (confirmed by visual inspection) and, as shown in FIG. 4*e*, two low intensity W lines were observed and spectral interference on Cu was no longer a problem (FIG. 4*f*). A dried-water run minus bare wire background established the absence of spectral lines at the analytical wavelengths of interest (i.e. diode numbers about 100, 450 and 930 in FIG. 4*f*). As a consequence, this drying method was used for all subsequent experiments.

Tungsten emission intensities and their potential for spectral interference on the analytical lines of interest was evaluated for other elements as well. Typical emission signals obtained by externally drying 10 $\mu$L of single element standard solutions are shown in FIGS. 5 and 6. For the elements tested with a single mask-slot open (Be, Mn, Sc, Sr, Y and V, FIGS. 5 and 6) only the spectra for V (FIG. 5*c*) and Be (FIG. 6*b*) showed the presence of weak W lines. The spectral position of the W lines was established by running dried water blanks (10 $\mu$L). Although there was only one slot open, the V spectrum (FIG. 5*c*) showed three V lines because the mask slot used (centred at 309.771 nm) was cut unusually wide (0.016" versus the typical 0.005"). Spectral interference from W lines when using masks with more than one slot-per-element open was studied only for Zn by opening three slots on the Zn mask 42 (202.548 nm, 206.200 nm and 213.856 nm). The Zn spectrum (FIG. 5*a*) shows three Zn lines and four weak W lines.

As mentioned above, the intensity of the W lines depended on power applied to the wire-loop 30, on gas flow rate in the central tube 24, and on the age of the loop 30. Regardless of age, gas flow rate and applied power, W lines did not interfere with the analytical lines of interest for the elements tested. From the data shown in FIGS. 5 and 6 it can be inferred that the pressure pulse and spectral interference effects when using externally dried multielement solutions are not significant with the system of the present invention.

The wire-loop sample introduction system of the present invention produces a plug of analyte vapor (e.g., atoms, molecules, aggregates and/or particulates) which, when introduced into the plasma 12 generates a transient atomic population and gives rise to transient spectral signals. As mentioned above, optical emission spectral intensity is integrated directly on the detector.

Typical integrated emission signals for single element solutions are shown in FIGS. 5 and 6. These results also provide an indication of the potential detection capability of the electrically heated wire-loop system of the present invention. The elements for which analyte emission signals are shown in FIGS. 5 and 6 were selected so that their most intense spectral lines were between about 210 nm and 410 nm (Table 3). This range approximates the spectral range of the spectrometer 41. Although similar sensitivities were observed for Mn (FIG. 5*b*), V (FIG. 5*c*) and Sc (FIG. 5*d*), the sensitivity for Zn (FIG. 5*a*) is about one order of magnitude poorer due to the poor sensitivity of the diode array below about 250 nm. Between about 190 nm and 250 nm PDA-ICP detection limits are about one order of magnitude inferior to those obtained using a PMT-based system (discussed below under Example 2), which provides a corresponding improvement in detection limits, and which is therefore an important consideration for environmentally important elements, such as Pb, Cd and Zn that have their most analytically useful ICP lines below 230 nm.

Figure 5A:
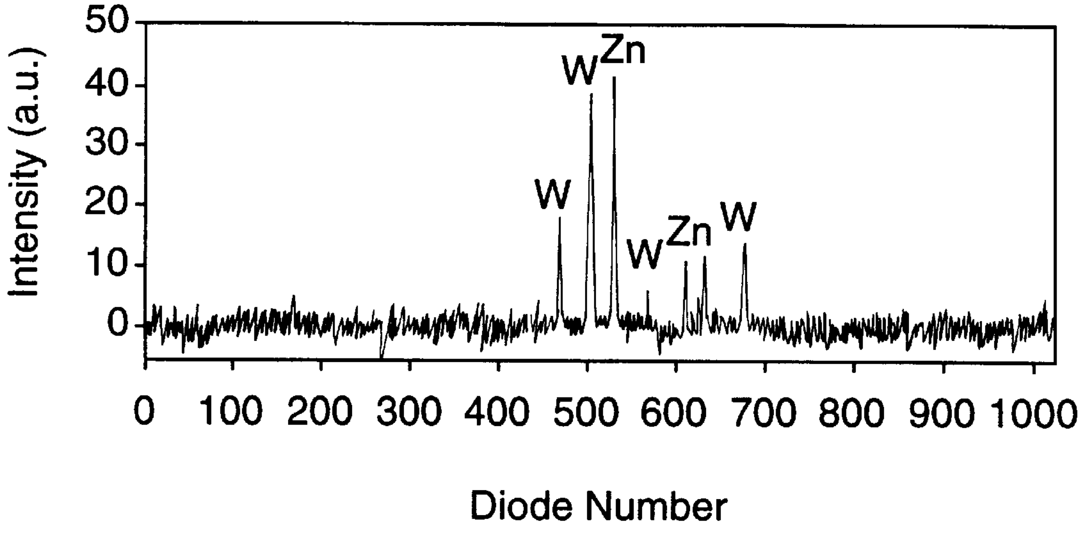
Figure 5B:
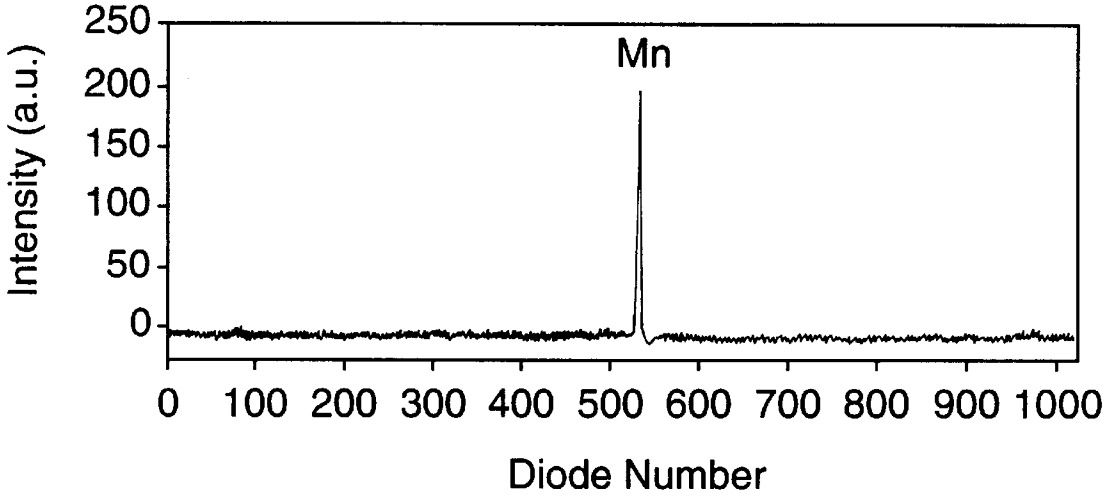
Figure 5C:
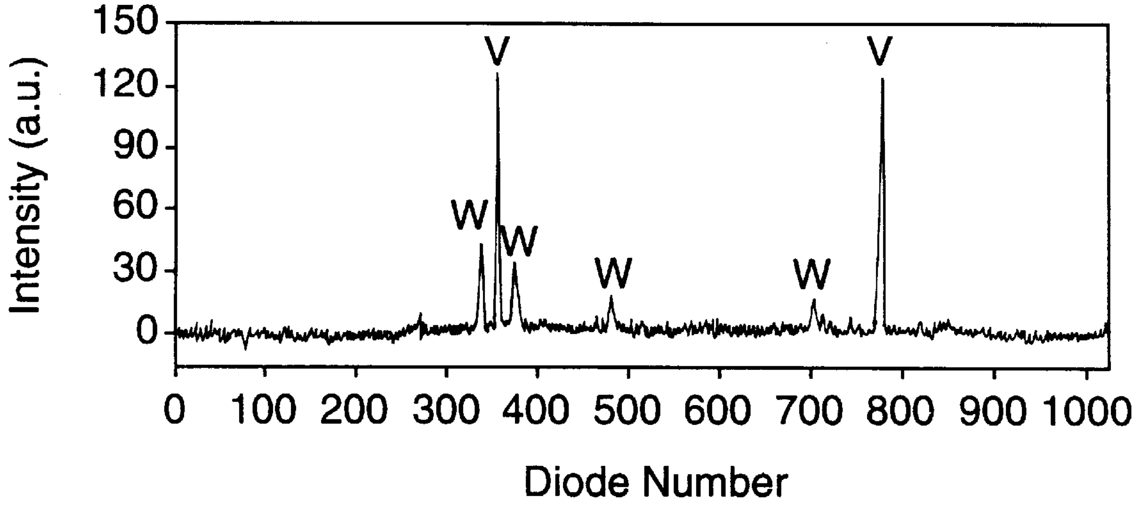
Figure 5D:
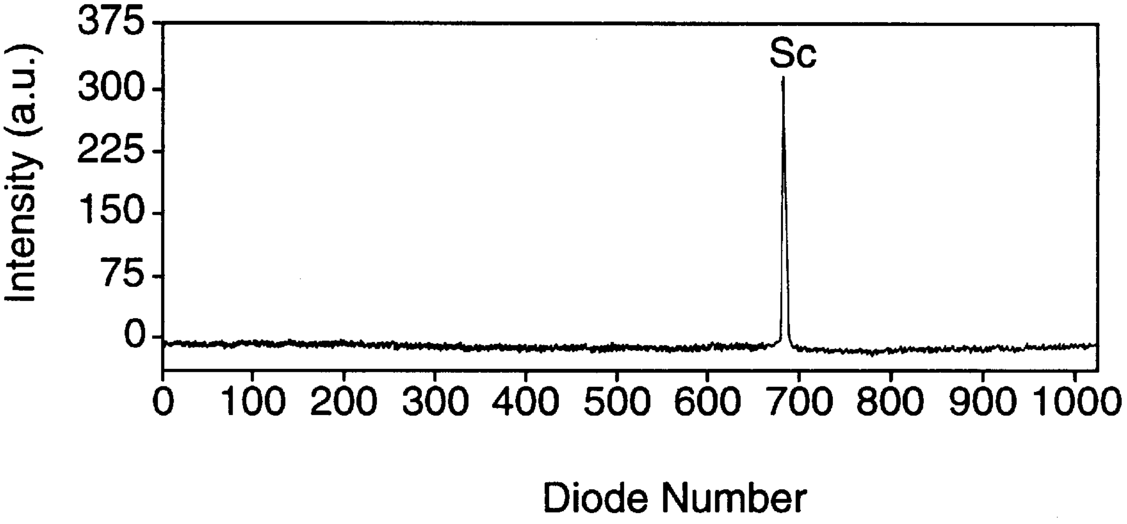

The sensitivity for Y (FIG. 6*a*), Be (FIG. 6*b*) and Sr (FIG. 6*c*) is one to two-and-a-half orders of magnitude superior to that shown for Mn, V and Sc (FIGS. 5*b*, 5*c* and 5*d*) and about three-and-a-half orders of magnitude better than that shown for Zn (FIG. 5*a*). It should be noted that Be and Sr are two of the most sensitive elements detected using the spectrometer 41 when using a pneumatic sample introduction system.

Although the results shown in FIGS. 5 and 6 illustrate the potential detection capability of the wire-loop sample introduction system of the present invention, it should be borne in mind that the wire-loop sample introduction system utilized in the test set-up for the examples discussed herein was largely unoptimized and that the exact nature of the signals depends on a number of system parameters. These include heating rate, final or equilibrium wire-loop temperature, wire-loop composition, insertion position, torch design, volatilization chamber volume and geometry (FIG. 2*c*), central-gas tube position and flow-rate, flow dynamics (e.g. tangential flow through the side arm and laminar flow through the unused holes of the ceramic insulator 36 (FIG. 2*a*)), gas composition (e.g. $H_2$/Ar mixtures have been used with metal ETV-devices to suppress metal oxide formation), gas flow rates and plasma power and viewing height. As a proof-of-concept approach was adopted for the purpose of the Examples in this disclosure, no attempt was made to study the effects of these parameters on analytical-figures-of-merit. However, precision was measured, detection limits were estimated and calibration curves were constructed as the means by which to obtain an indication of the potential analytical capability of the wire-loop sample introduction system of the present invention. Unless otherwise stated, the operating parameters listed in Table 2 and single element standards were used.

FIG. 7 shows signals obtained from three successive runs of 1 ng of Sr. In general, peak shapes and peak heights were reproducible. Similar results were obtained for Y and Be. Percent relative standard deviations were determined from six replicate measurements of 1 ng of single element solution residues and were 1.9% for Sr, 2.0% for Be and 4.5% for Y. These results compare favourably with prior art DSI and ETV systems (ref. 1; H. Matusiewicz, J. Anal. At. Spectrom. 1, 171 (1986); and J. M. Carey and J. A. Caruso, Crit. Rev. in Anal. Chem. 23, 397 (1992)).

Estimated detection limits (3σ) are listed in Table 4 (Appendix "D" to this disclosure) and are compared with those obtained using ETV-ICP-AES. Detection limits were estimated using the data shown in FIGS. 5 and 6 by setting one-fifth of the peak-to-peak value for the noise neighbouring the spectral line to 1σ. Comparative data have been included as an indication of relative performance only.

The analytical performance of the wire-loop system (ITV) of the present invention for quantitative analysis of μL volumes of liquids was tested using single element standards. Calibration curves for Sr, Y and Be (FIG. 8) were linear over three orders of magnitude. Although calibration curves for Ca, Mg and Cu were linear at high concentrations, a non-linearity was observed at concentration levels below about 100 ppb. In particular, the calibration curves levelled-off (with varying degrees of curvature) as concentration decreased.

The non-linearity of the calibration curve for Cu below about 100 ppb is most likely due to contamination arising from vaporization of Cu from the power transfer cables 32, 33 (FIG. 2*a*). When high power (for instance, about 200% of regular power) was applied to the loop, some Cu emission was observed during water blank runs. Since background subtracted signals were used for calibration curves, background Cu emission should have been subtracted. However, due to manual operation of the device, this may not have been the case. Alternatively, the non-linearity may be due to analyte loss on the walls of the inner-tube of the torch during transport. According to Kantor (T. Kantor, Spectrochim. Acta. 43B, 1299 (1988), the amount of analyte lost during transport depends on the total mass of analyte vaporized, with proportionately more loss occurring when smaller amounts of analyte are vaporized. Also, transport efficiency has been found to increase with sample mass (D. L. Millard, H. C. Shan and G. F. Kirkbright, Analyst 105, 502 (1980)). Such analytical curve nonlinearity has been reported by others when using a long tube (e.g. 50 cm or more) and a carrier-gas to transfer analyte vapor from an ETV-device to an ICP. Nonetheless, the short distance analyte travels in this system, the lack of memory effects and the lack of curvature in the analytical curves for Sr, Y and Be suggest that analyte loss may not be a problem with the system of the present invention.

Figure 9A:
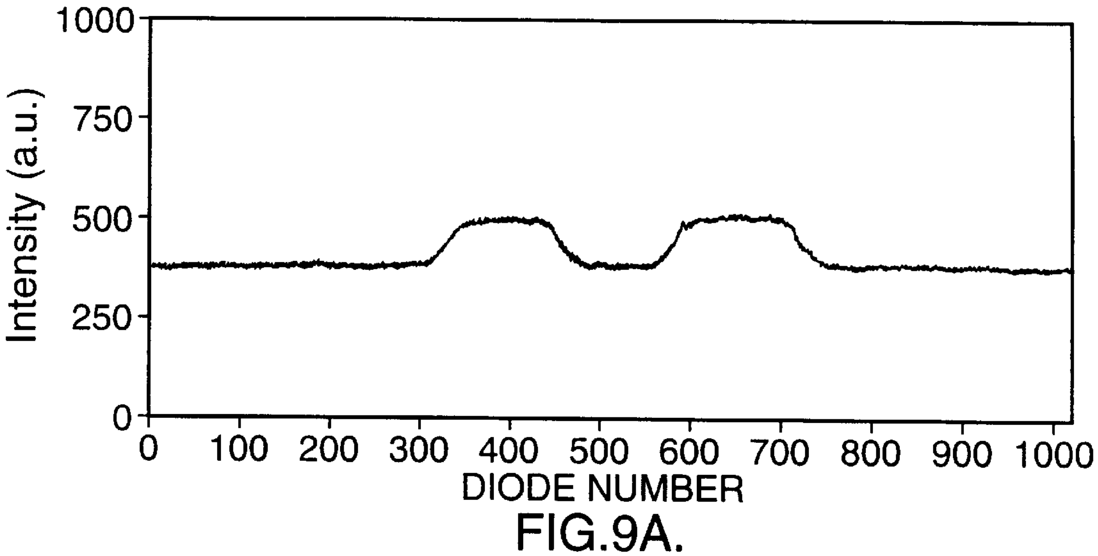
Figure 9B:
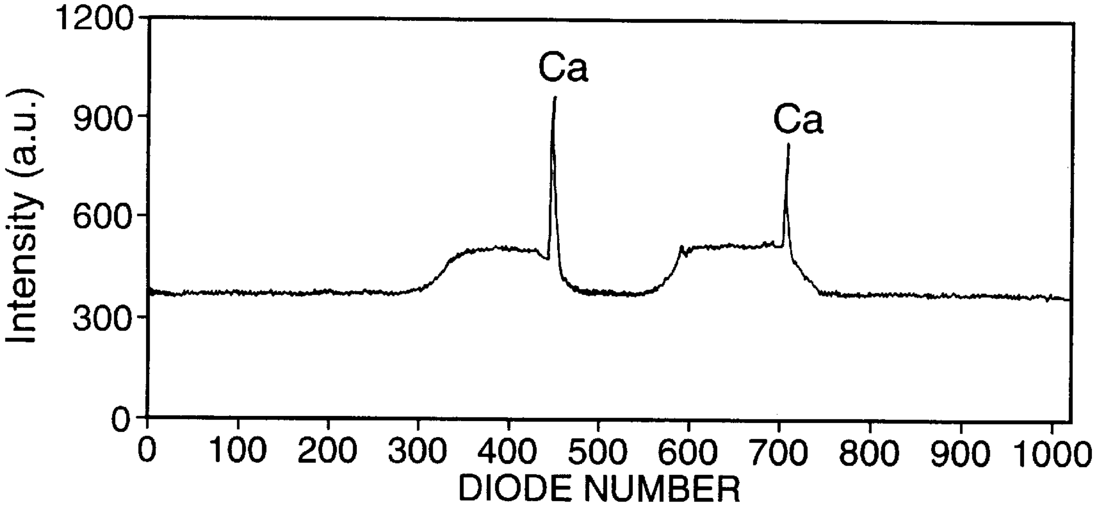
Figure 9C:
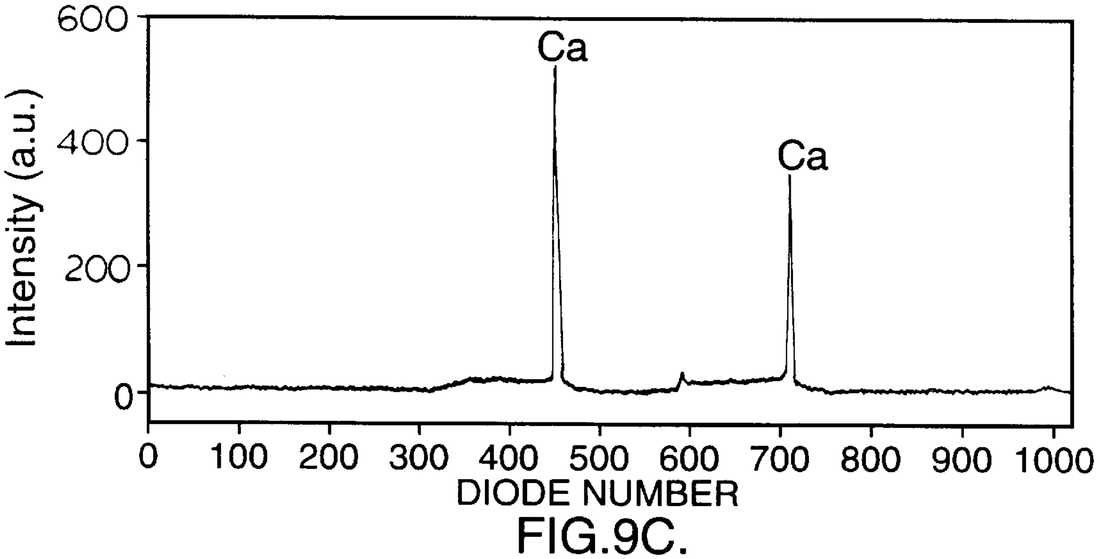

The calibration curve for Ca began to level-off at about 30 ppb. A blank run with nothing on the loop (FIG. 9*a*)

established that there was no contamination arising from either overheating the ceramic or from memory effects. When a wire-loop 30 with nothing on it was left in a draft-free atmosphere in the laboratory for about 6 min, an intense Ca signal was observed (FIGS. 9*b* and 9*c*). It is known that there was a significant concentration of Ca in the atmosphere of the laboratory where these experiments were conducted. Specifically, it appears that small ground sample particles may have been transported through the ventilation ducts to the laboratory where the ICP 10 of the present test set-up is installed, and deposited on the wire loop 30 during drying. A photograph of airborne material deposited on the wire-loop 30 obtained using scanning electron microscopy (SEM) is shown in FIG. 11. The presence of Al, Ca, Cl, K, Na, S and Si containing particles on the wire-loop 30 was confirmed using SEM-energy dispersive spectrometry (EDS) with X-ray detection.

Non-linear calibration curves were also observed for Mg. Although Ca and Mg often appear together in mineral and soil samples, the Mg emission which was observed was attributed to vaporization of Mg from the ceramic insulator 36. According to the manufacturer (Table 1), the typical composition of the ceramic is 99.8% $Al_2O_3$, 0.030% Ca, 0.025% $Fe_2O_3$, 0.009% $Ga_2O_3$, 0.001% MnO, 0.050% MgO, 0.005% $Na_2O$, and 0.070% $SiO_2$. This conclusion was drawn because some Mg emission was recorded during prolonged wire loop burns without removing the loop 30 from the torch 10 and, hence, with no exposure to laboratory air. As well, the presence of Mg on the loop could not be confirmed by SEM-EDS due to overlaps between the Mg (Ka) and the W (La) X-ray lines.

Although the sensitivity for Ca and Mg can be used as an indication of the potential sensitivity of the wire-loop sample introduction system of the present invention, it also means that drying must take place in a contamination-free atmosphere. Due to anticipated gains in sensitivity, it is contemplated that precautions should be taken to alleviate atmospheric contamination problems. It is believed that the problem of atmospheric contamination may be overcome by the use of a "drying chamber".

Due to its sensitivity, it is contemplated that the wire-loop sample introduction system of the present invention may be used as an ambient air monitor for other elements as well. To test this possibility, Hg was used as a test element. Mercury was chosen due to its environmental significance, its appreciable vapor pressure at room temperature and because $Hg^0$-vapor has low affinity for oxygen. For all practical purposes, $Hg^0$-vapor in air is considered wholly monoatomic. However, W has no affinity for Hg. This problem was solved by taking advantage of the affinity of Hg for noble metals.

The results of the preliminary study presented herein as Example 1, demonstrate that an electrically heated wire-loop 30, which is inserted into a modified torch 10 is a viable sample introduction system for quantitative analyses from $\mu$L volumes of liquids by ICP spectrometry. Its use for qualitative analyses is discussed in greater detail below.

Improvements in the analytical figures-of-merit of wire-loop ICP of the present invention can be obtained by using an automated ITV sample introduction system as shown in FIG. 12, comprising an optimally designed volatilization chamber 25, by automating sample delivery and sample holder insertion/retraction by using, for example, a DSI-device drive-mechanism 43 driven by a combined DSI driver and programable power supply 44, by using a drying chamber 46, by using a mixed-gas carrier gas to modify the chemical environment of the sample and/or the plasma, by replacing W with Re (see Example 2, below), and by coupling the wire loop sample introduction system to ICP-AES with photomultiplier tube detection and to ICP-MS (see Example 2, below). In the alternative embodiment of FIG. 12, samples carried by a rotatable autosampler 48 are placed onto the wire loop 30 by a swing arm 50, under control of a front-end processor 52. The autosampler 48 is rotated by an autosampler drive mechanism 54 under control of processor 52.

EXAMPLE 2

Photomultiplier Tube Detector

As discussed above in Example 1, when using inductively coupled plasma-atomic emission spectrometry (ICP-AES) and photodiode array (PDA) detection (ie. ITV-PDA-ICP-AES), detection limits for elements with their most sensitive lines between about 250 nm and 400 nm were estimated to be between 1 and 20 pg and for Sr (407.771 nm) 0.4 pg. Due to a PDA-detector sensitivity which is inferior to that of a photomultiplier tube (PMT) at wavelengths below about 250 nm, detection limits for elements, such as Pb, Cd and Zn, with their most sensitive lines in this wavelength range are an important consideration. Also, spectral interference on Pb, Cd and Zn arising from W vaporized from the wire 30 was indicated above as being of concern. In this second Example focusing on Pb, Cd, Zn and Sr, it will be shown that spectral interference is eliminated when W is replaced by Re and detection limits are reported for ITV-ICP-AES with photomultiplier tube (PMT) detection and for ITV-ICP-mass spectrometry (ICP-MS).

In this example, the ITV sample introduction system 28, the ICP torch 10, the drying method and ITV operating conditions were the same as those described previously in Example 1. Unlike the first Example, a Re wire was used. The RE-ITV sample introduction system was briefly tested using two optical emission spectrometers and a mass spectrometer. In all cases, data were acquired by pressing the return key of the controlling microcomputer and, at the same time, by manually setting the control dial of the variac 38 (FIG. 1*d*) to the desired level.

The Leco Plasmarray (discussed above with reference to Example 1) ICP-AES 41 equipped with a 1024-element PDA detector was used to test for potential spectral interference effects arising from W or Re vaporized from the wire 30. The potential for spectral interference effects was examined using single element masks 42 with one slot open and an 8 second integration time. Detection limits for Pb and Cd were estimated using Re wire-loops 30 according to the procedure described in detail above with reference to Example 1.

As discussed above with reference to Example 1 with the selected readout electronics of the PDA spectrometer 41, optical emission intensity is integrated directly on the detector and, as a result, analyte emission temporal behavior is lost. Furthermore, due to manual operation of the variac 38, a relatively long integration time (8 seconds) must be used to ensure that the entire emission signal is recorded. Furthermore, since the PDA detector is not as sensitive as a PMT at wavelengths below about 250 nm it is believed that the full potential of ITV sample introduction for Pb, Cd and zn might not be attained using the PDA spectrometer 41.

Analyte emission temporal behavior was measured and the potential to obtain improvements in the detection limits of ITV-PDA-ICP-AES described above in Example 1, was tested by coupling the ITV sample introduction system 28 to an ICP 10 equipped with an aging 32 PMT-channel direct reading spectrometer (JY-48, Instruments SA, Edison, N.J.). The maximum possible voltage with this system was applied to all PMT channels (typically between −900 and −1000 V, channel dependent) and ICP operating conditions are given in Table 5 (Appendix "E" to this disclosure). Unfortunately, the readout electronics for the spectrometer utilized in this test set-up cannot handle the fast transient signals generated by the ITV sample introduction system 28 (e.g., peak widths of less than about 1 second). For this reason, a measurement sub-system capable of digitizing fast transient signals was developed. This sub-system is discussed in greater detail below with reference to the embodiment illustrated in FIG. 17, and comprises a current-to-voltage converter and an analog-to-digital (ADC) converter plugged into the back-plane of a personal computer 50. Current from the PMT was converted to voltage using an operational amplifier 52 (e.g. LT1055) with a 10 mΩ resistor 54 in a feedback loop and a 0.001 μF capacitor 56 in parallel with the resistor 54. Voltage readings were taken at 250 points/second using a 12-bit ADC board (NB-MIO-16L-25, National Instruments, Austin, Tex.) and LabView 2.2 (National Instruments) running on an Apple Macintosh (Apple Computer Inc., Cupertino, Calif.) microcomputer 50. The measurement sub-system is not further described in detail herein, although the construction and operation thereof would be well known to a person skilled in the electronic arts.

Since considerable improvements in the detection limits of ITV-ICP-AES were expected by replacing detection of photons with mass spectrometric detection, the manually operated ITV sample introduction system 28 was briefly tested using an older ICP-MS (Perkiri-Elmer/Sciex Elan 250, Thornhill, ON, Canada). The mass spectrometer lens voltage/settings and the parameter set used for the acquisition of transient signals were the same as those reported previously for prior art DSI-ICP-MS and ICP operating conditions are given in Table 5.

Standard stock solutions of 1000 μg/mL were purchased from Leco (St. Joseph, Mich.). Single element solutions were prepared by serial dilution with distilled/de-ionized water (18 MΩ Millipore system) of the stock solution. A 10 μL volume of single element standard solution (or 10 μL of distilled/de-ionized water) was placed onto the wire-loop 30 with an Eppendorff micropipette. Samples were dried with a hair drier, according to an "external" drying procedure described in detail above with reference to Example 1, before inserting the wire-loop 30 into the torch 10.

As indicated above, spectral interference has been identified as being a key concern when using W wire and ITV-PDA-ICP-AES. For example, using water blanks and one slot open on single element masks 42 for Pb, Cd, Zn and Sr, W lines were observed for Pb, Cd and Zn due to leakage through the open slot of the corresponding mask 42. Significant spectral interference was also observed with the PMT polychromator, often to the point of precluding determination of Cd, Pb and Zn. It was concluded that spectral interference could be reduced or eliminated if the wire was made from material other than W.

Figure 13A:
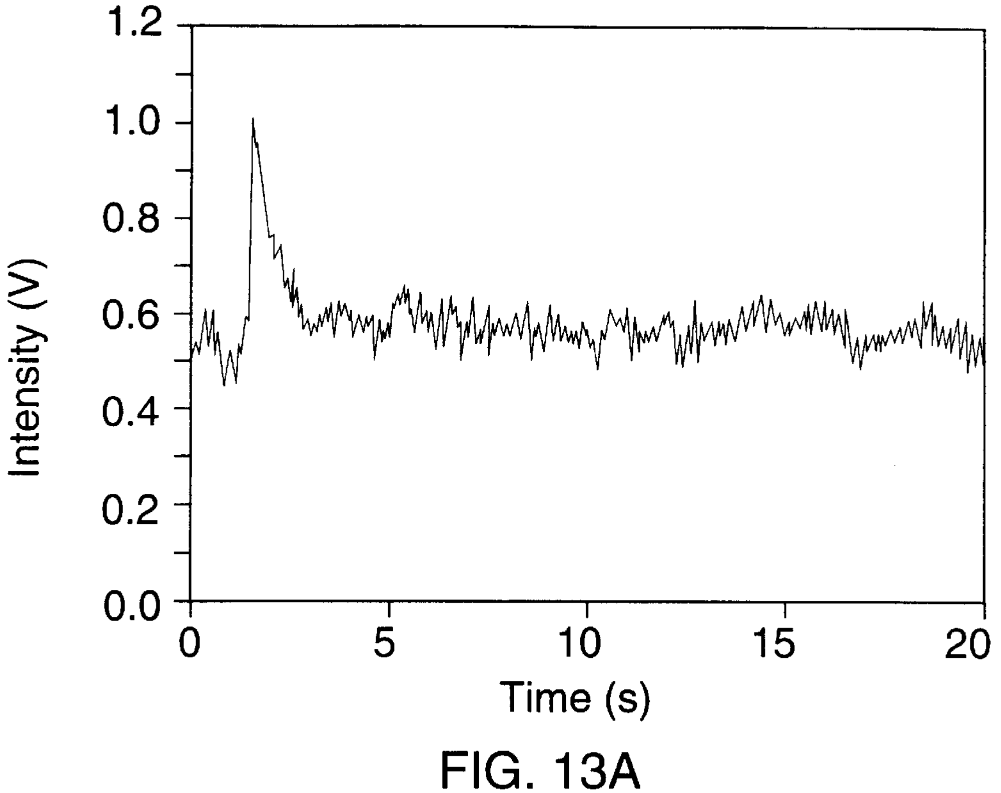
Figure 13B:
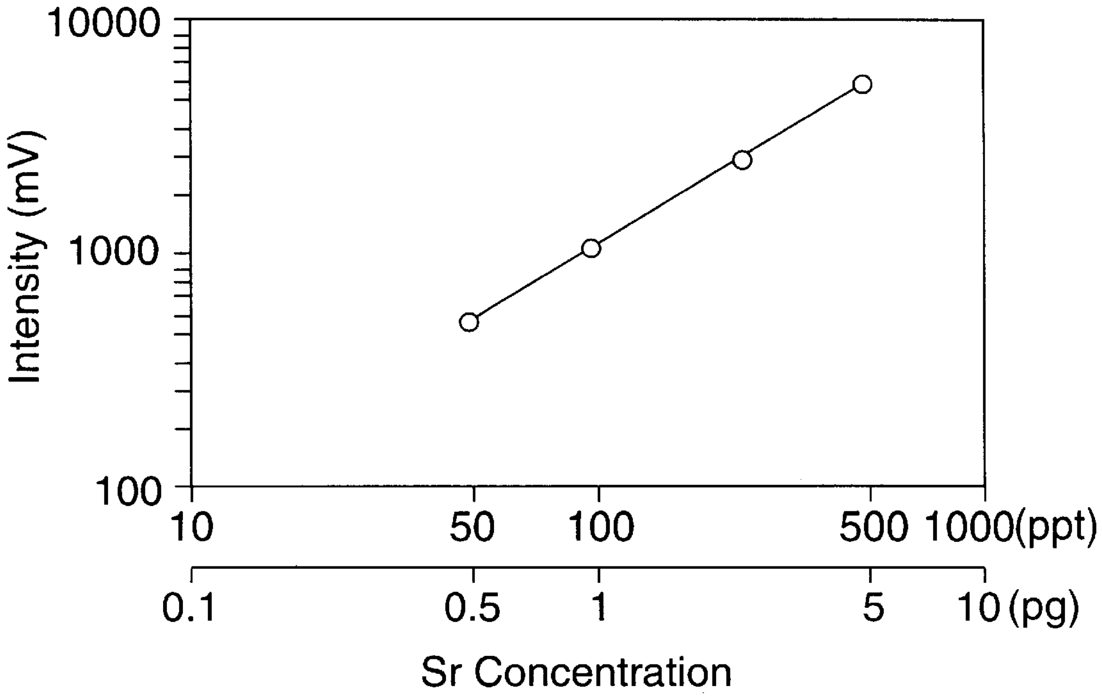

Spectral interference was eliminated when W was replaced by Re. For instance, with one slot open on single element masks for Pb, Cd, Zn and Sr, leakage of Re lines through the open slot of the corresponding single element mask 42 was not observed. This is in marked contrast to what was observed for the W wire-loop utilized in the test set-up of Example 1. The lack of spectral interference from Re vaporized from the wire 30 was confirmed by running wire-blanks and water-blanks using the PMT spectrometer and the measurement sub-system described above. Spectral interference was not observed for Pb, Cd, Zn and Sr and representative signals for water blanks are shown in FIGS. 13*a*, 13*b* and 13*c*.

Figure 14A:
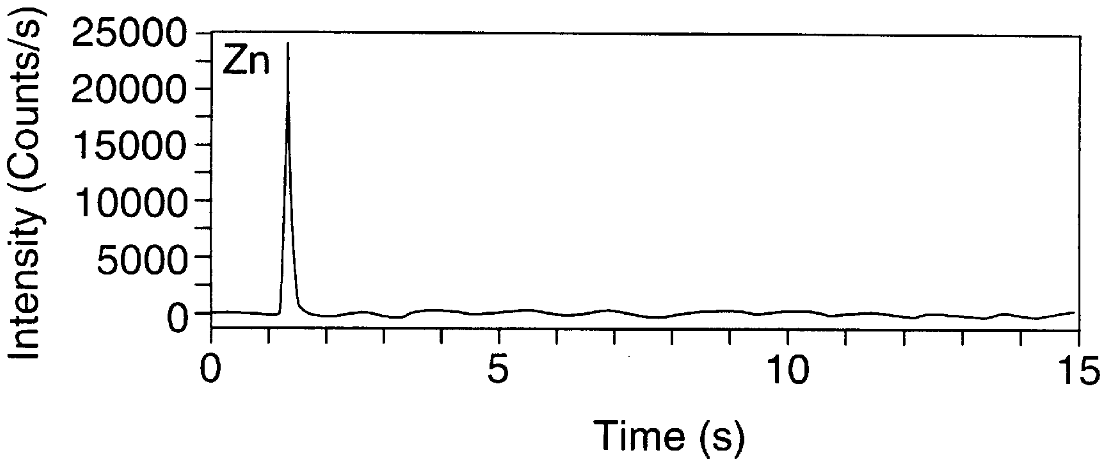
Figure 14B:
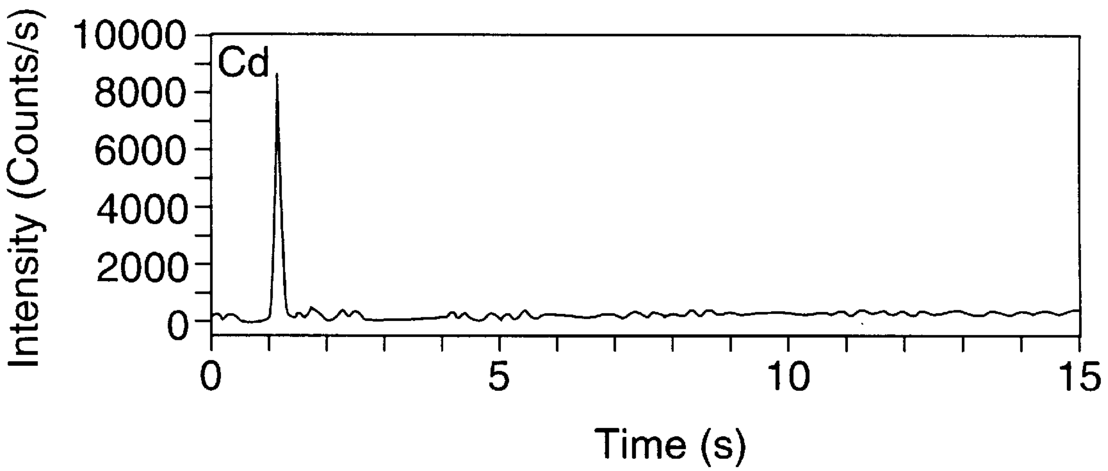
Figure 14C:
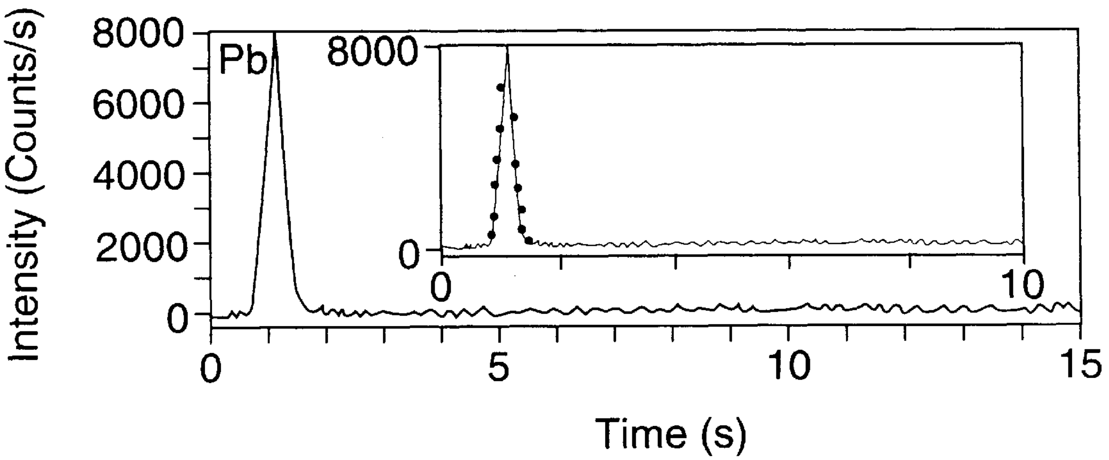
Figure 14D:
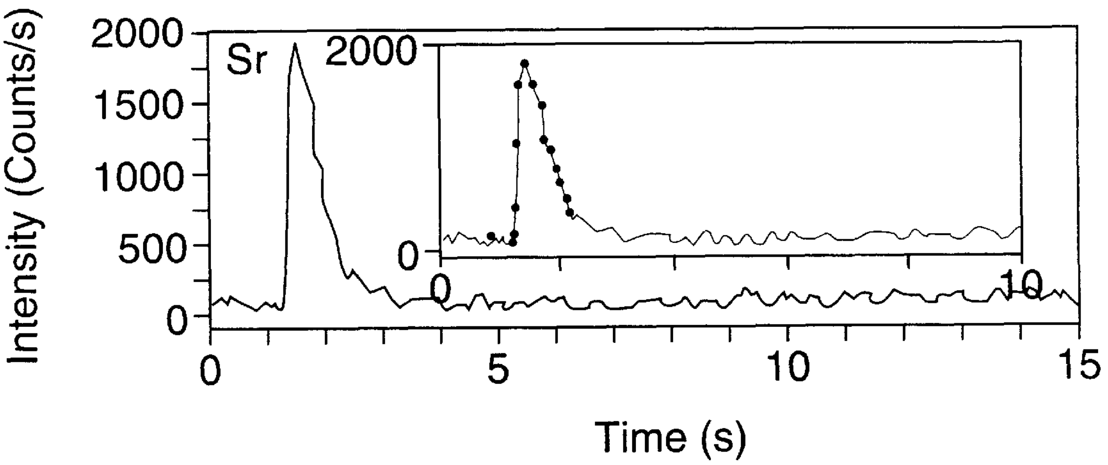

Analyte emission temporal behavior was measured for Cd, Pb, Zn and Sr and signals for Cd (500 pg), Pb (300 pg) and Zn (200 pg) as shown in FIGS. 13*d*, 13*e* and 13*f* and for Sr (500 fg) in FIG. 14*a*. As can be seen, analyte emission was of very short duration, peak widths (at half-height) were a few hundred ms and emission intensities returned to plasma background levels in about 2 seconds for the elements and operating conditions used in this test set-up. Clearly, the 8 second integration time used with ITV-PDA-ICP-AES as discussed in Example 1 was excessive and resulted in measurement of only plasma background for about 6 seconds, thus potentially degrading detection limits. The computer controlled power supply 44 discussed above with reference to FIG. 12 is expected to overcome this problem.

The Sr line at 407.771 nm was used in order to obtain an indication of the sensitivity of ITV-ICP-AES with PMT detection at longer wavelengths, and a signal for 50 ppt (500 fg) Sr is shown in FIG. 14*a*. This signal has been used in the calibration curve for Sr shown in FIG. 14*b*. The small, threefold improvement over the ITV-PDA-ICP-AES detection limit for Sr (Table 6—attached as Appendix "F") demonstrates the sensitivity of the PDA-detector 41 at longer wavelengths.

Detection limits (3σ) of ITV-ICP-AES with PMT detection are listed in Table 6. These were estimated using the peak height of the signals shown in FIGS. 14 and 15 and by setting one-fifth of the peak-to-peak value for the noise between 3 and 5 seconds equal to 1σ. A considerable improvement in the detection limits of Pb, Cd and Zn obtained by ITV-PDA-ICP-AES was observed with the PMT spectrometer (Table 6). Detection limits obtained with ITV sample introduction compare favourably with detection limits reported for ETV and DSI sample introduction (Table 6), with ITV offering significant improvements for a carbide forming element such as Sr. To provide a reference point for rough comparisons, detection limits reported for pneumatic nebulization sample introduction are also listed in Table 6.

The lack of a pressure pulse at lower wavelengths is noteworthy (FIG. 13). However, as wavelength increases, so does plasma background. And as plasma background increases, a pressure pulse becomes noticeable with the PMT spectrometer (FIG. 14*a*). The magnitude of the pressure pulse may be reduced by operating the wire-loop 30 and/or the plasma 12 at lower powers and/or the PMT at lower voltages (at the expense of sensitivity).

In the last few years, ICP-MS has become a widely accepted elemental analysis tool due, in part, to detection limits that are 100 to 1000 times superior to those obtained by ICP-AES. A similar improvement in the detection limits of ITV-ICP-AES with PMT detection (ITV-PMT-ICP-AES) was expected by coupling ITV sample introduction to ICP-MS. Analyte temporal behavior for Pb (10 pg), Cd (10 pg), Zn (10 pg) and Sr (10 pg) obtained with a ITV-ICP-MS system is shown in FIG. 15. Similar to ITV-PMT-ICP-AES, peak widths (at half-height) were several hundred ms and analyte signals lasted 2 seconds or less (FIG. 15). Due to the short duration of analyte signals, only one mass at a time was monitored. Simultaneous multielement analysis capabilities can be obtained using measurement electronics capable of fast data acquisition rates. Detection limits, estimated from peak heights of the data shown in FIG. 15 and three times the standard deviation of the background, as described above, are listed in Table 6. With the exception of the detection limit for Sr (most likely due to manual operation of the ITV sample introduction system), ITV-ICP-MS detection limits were superior to those obtained by both the PDA and the PMT spectrometer as expected, and compared favourably (Table 6) to ETV-ICP-MS.

Although beyond the scope of the present disclosure, it should be noted that due to the use of "dry" plasmas and a structure similar to DSI-ICP-MS, reductions in spectroscopic (i.e. spectral overlaps arising from polyatomic, oxide and hydroxide species) and non-spectroscopic (e.g., matrix induced signal changes) interference effects are expected when using ITV-ICP-MS.

In conclusion of this Example, spectral interference on Pb, Cd and Zn was eliminated when W was replaced by Re and detection limits were estimated to be in the low pg range when the ITV sample introduction system of the present invention was coupled to ICP-AES with PMT detection, thus providing considerable improvement over the ITV-PDA-ICP-AES detection limits for these elements discussed in Example 1, and in the sub-pg range with ITV-ICP-MS, thus further demonstrating the capability of the ITV sample introduction system of the present invention.

Rapid Screening System

In Example 1, above, the electrically heated wire-loop sample introduction system of the present invention, for inductively coupled plasma-atomic emission spectrometry (ICP-AES) with photodiode array (PDA) detection, has been described and its application to quantitative analysis using $\mu$L volumes has been demonstrated. The PDA-ICP spectrometer 41 described above utilizes a removable slotted mask 42 for spectral line selection. The mask 42 blocks most light emitted by the ICP 10 and allows only selected narrow wavelength regions (typically 0.4 nm/slot) to pass through. For quantitative determinations, 10 $\mu$L volumes and a mask with one slot open was used. In most instances, one spectral line per element was observed. By removing the mask 42, a much wider spectral region is covered, multiple spectral lines per element become available and a characteristic spectral pattern per element is recorded by the PDA detector. For multielement mixtures, spectral patterns can be complex, often to the point of being meaningless to a human interpreter. According to this further aspect of the present invention, the presence of characteristic spectral patterns acquired using 10 $\mu$L volumes of single element standards is detected automatically using cross-correlation, thereby eliminating the need for human interpretation.

Initially, reference spectral patterns are acquired using single element standard solutions, as discussed above. These spectra are stored in a well known manner on a computer disk either as they are (i.e., raw data) or after processing (e.g., conversion to binary software masks). Subsequently, raw spectral patterns from unknown samples (e.g., samples with unknown composition) are acquired. Cross-correlation is used to interrogate (using either raw spectra or binary software masks that have been stored on the disk) the unknowns for the presence or absence of reference spectral patterns. In other words, the unknown is interrogated for the presence or absence of the interrogating, sought-for element. In this way, rapid qualitative analysis results (i.e., what do I have in my sample?) are obtained. Semi-quantitative results may be obtained using single point calibration curves, as discussed in greater detail below.

A color coded periodic table is used as the means with which to present qualitative and semi-quantitative results to the user (i.e., as a user interface). An example of such a user interface is shown in black and white in FIGS. 18 and 19.

In the present implementation, the elements for which reference spectral patterns have been stored on the disk appear as blank boxes in the periodic table. However, this need not be the case. For example, an element may appear in italics, etc. As the interrogation of the multielement unknown proceeds (one element at a time), the blank box of the periodic table for the element whose presence in the unknown has just been tested, "lights-up" with color and the symbol of the element appears in the appropriate box of the periodic table in bold face text. Color, in this case, designates concentration information. As can be seen in FIG. 18, a color bar showing concentration ranges is placed on the side of the periodic table. The color bar is user programmable and may be placed anywhere on the screen. At the end of the interrogation process, the boxes of the periodic table that were initially empty are now filled with the symbol of the element and with color.

This periodic table user interface of the present invention is unique in that it can be interrogated using "point-and-click" syntax. For example, a user that wants to get information about a particular element clicks on the appropriate box on the periodic table. A "pop-up" menu appears (as shown for Hg in FIG. 17). By making a menu selection, the user may get information regarding operating conditions, a training video(s), video(s) showing the operation of the instrument, computer simulations of instrument components and spectral simulations. Of course, the user can access even the raw data, if desired. At any time, the user may return to the clickable periodic table screen. In the case shown in FIG. 17, only 3 menu items are shown but this need not be the case. Also, the menus may appear on the menu bar, on the window frame or elsewhere on the screen. Using the "point and click" syntax, a dialogue is established between the user and the computer.

This user interface according to this aspect of the invention may be used with other spectrometers and other sample introduction systems (e.g., pneumatic nebulization), and forms the basis for the development of a rapid screening system (i.e. one that provides rapid qualitative and semi-qualitative analytical results in real time or near real time), as described in greater detail below.

Cross-correlation is a computational method that can be used to extract information about the coherence, or similarity, within a signal or between two signals. Correlation analysis is not new. Its initial application to communication signals was extended to, among others, engineering and spectroscopy, and cross-correlators are commercially available. The ability of cross-correlation to quantify the similarities between two signals has lead to its use as a method of improvement of the signal-to-noise ratio in a number of analytical techniques, and to its use in automatic detection of spectral information acquired using ICP-AES with pneumatic nebulization sample introduction and a laboratory built 1024-element PDA spectrometer covering about 50 nm, is disclosed in R. C. L. Ng and G. Horlick, Spectrochim. Acta 39, 834 (1985), as well as int the use of a Fourier transform spectrometer (see R. C. L. Ng and G. Horlick, Spectrochim. Acta 36B, 543 (1981). However, automatic detection of ICP-AES spectral information using cross-correlation and $\mu$L volumes has not been reported previously.

The cross-correlation and interrogatable periodic table user interface aspect of the present invention was applied to the analysis of spectral information obtained using μL sample volumes and ICP-AES with photodiode array detection, using the test set-up described above in Example 1.

Cross-correlation is briefly explained by means of a further Example. The spectral pattern obtained using 10 μL of a multielement mixture and the partially blocked mask (e.g. blocking the mask 42 in FIG. 3*b* between a lower segment starting at approximately 280 nm to an upper segment ending at approximately 410 nm) is shown in FIG. 20. Characteristic spectral patterns obtained using 10 μL of single element standards are shown for Sr in FIG. 20*b* and for Ni in FIG. 20*c*. Cross-correlation was used to interrogate this spectral pattern (FIG. 20*a*) for the presence of Sr and Ni characteristic spectral patterns. In essence, the multielement mixture (FIG. 20*a*) was evaluated for the presence of Sr and Ni which are, in this case, the sought-for elements. The cross-correlation patterns, or cross-correlograms obtained when the spectral pattern shown in FIG. 20*a* is cross-correlated with reference spectral patterns for Sr (FIG. 20*b*) and Ni (FIG. 20*c*) are shown in FIGS. 20*d* and 20*e*.

What occurs when the cross-correlation is calculated can be thought of as slowly translating a characteristic spectral pattern, for example for Sr (FIG. 20*b*), one diode-element at a time across the multielement spectral pattern (FIG. 20*a*), multiplying the two patterns at that displacement and summing the product. In other words, the mutual area of the two spectral patterns is determined. The magnitude of the peak at τ=O when the diode-element numbers of the two patterns coincide exactly, corresponding to zero displacement or τ=O, indicates the degree of similarity between the two spectral patterns and, the higher the magnitude, the greater the number of common spectral features. The maximum value at τ=O occurs when a pattern is cross-correlated with itself, in essence, when the auto-correlation function is calculated.

Cross-correlation patterns can be evaluated by testing if there is a distinct maximum (i.e., peak) at τ=O and by taking the magnitude of this peak into consideration. In the example of FIG. 20, the existence and the magnitude of the peak at τ=O (FIG. 20*d*) show a high degree of similarity between the spectral patterns for Sr (FIG. 20*b*) and this multielement (FIG. 20*a*), thus indicating that Sr is present in the multielement mixture. The lack of a distinct peak at τ=O indicates that the spectral patterns for Ni (FIG. 20*c*) and the multielement (FIG. 20*a*) share very little common spectral information. Therefore, it can be inferred that there is no Ni in this multielement mixture.

The experimental set-up for investigating the cross-correlation aspect of the present invention is exactly as described above with reference to Example 1. The wire-loops 30 were preconditioned for about 5 min and an 8 second integration time and a regular power level were used throughout, as in the set-up of Example 1. The operating conditions were also the same as described above in Example 1. To avoid potential drift problems, the spectrometer 41 was warmed up for several hours and the spectral data reported herein were acquired over the course of a few hours.

Fast Fourier transforms provide an efficient method of calculating cross-correlograms. Following the Fourier domain route to cross-correlation, the Fourier transforms of the spectral patterns were multiplied and the product was inverse-Fourier transformed. Fourier domain cross-correlation routines were implemented using Labviews version 2.2 (National Instruments, Austin, Tex.) running on an Apple (Cupertino, Calif.) Macintosh computer with system 7.1. The PDA spectral data were acquired with an IBM PC compatible 386 system, were converted to tab-delimited ASCII values using a Microsoft Excel macro and were printed using an Apple macintosh personal computer, as discussed above.

Due to the optical layout of the spectrometer 41, a spectral axis cannot be defined easily in terms of wavelength. However, spectral lines can be defined effectively by their position on the PDA detector. As a consequence, the ordinate of all spectra is diode-element number or diode number for short. This is acceptable because the use of cross-correlation for spectral identification purposes does not require knowledge of the wavelength or even of the diode number.

Figure 22A:
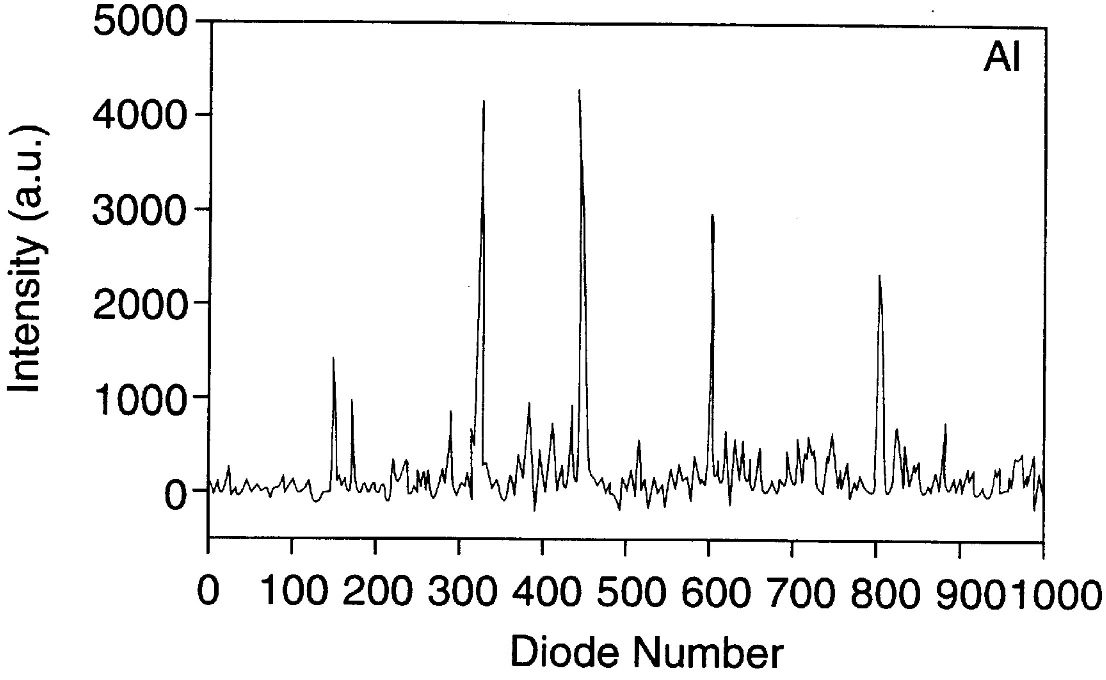
Figure 22B:
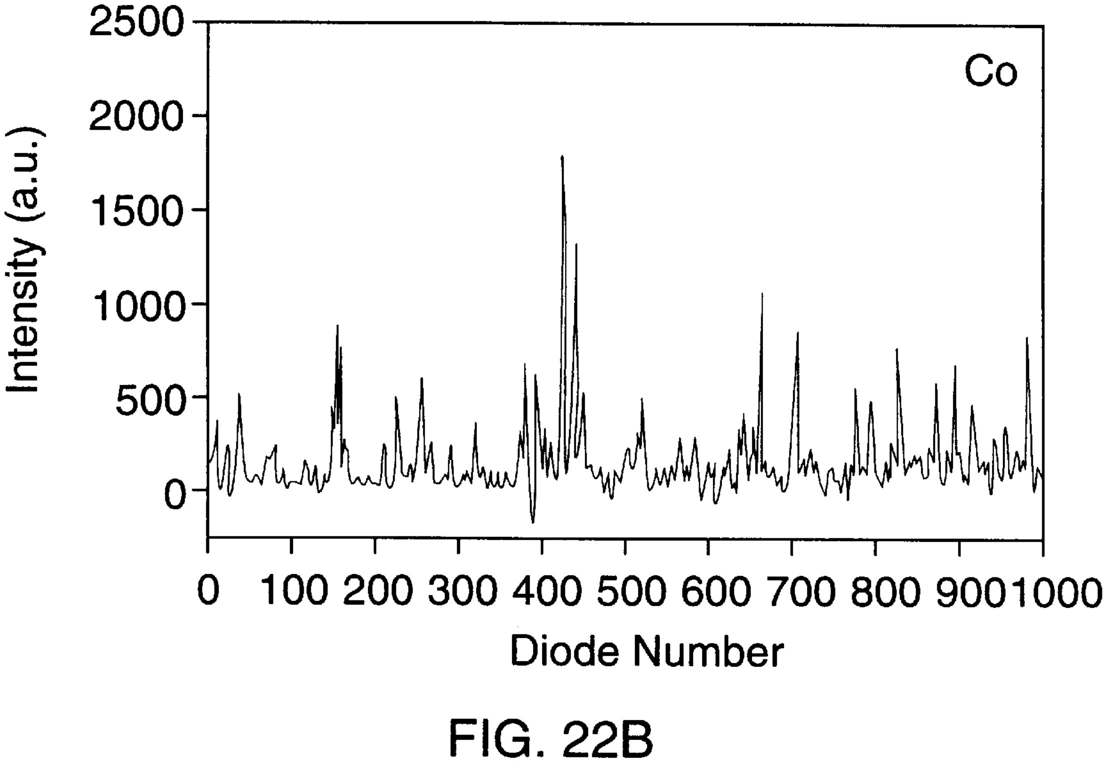
Figure 23A:
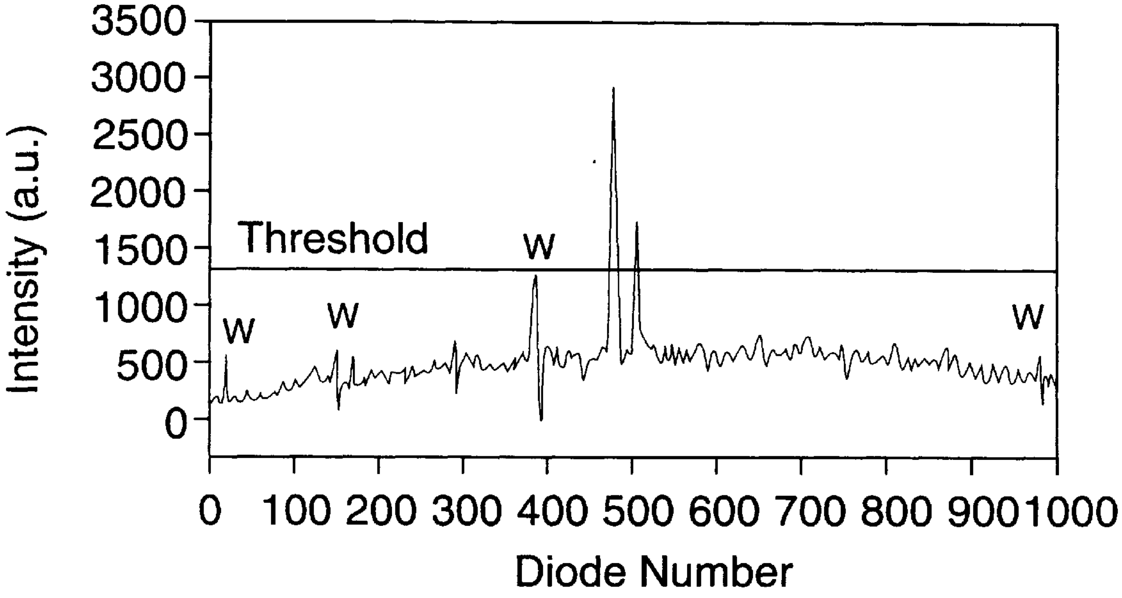
Figure 23B:
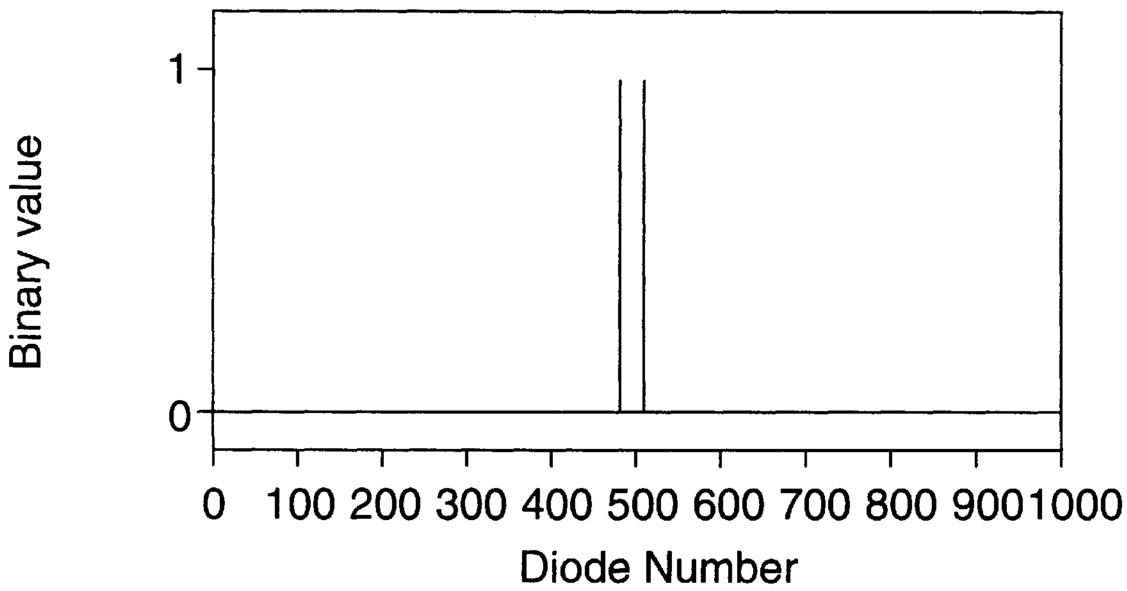
Figure 23C:
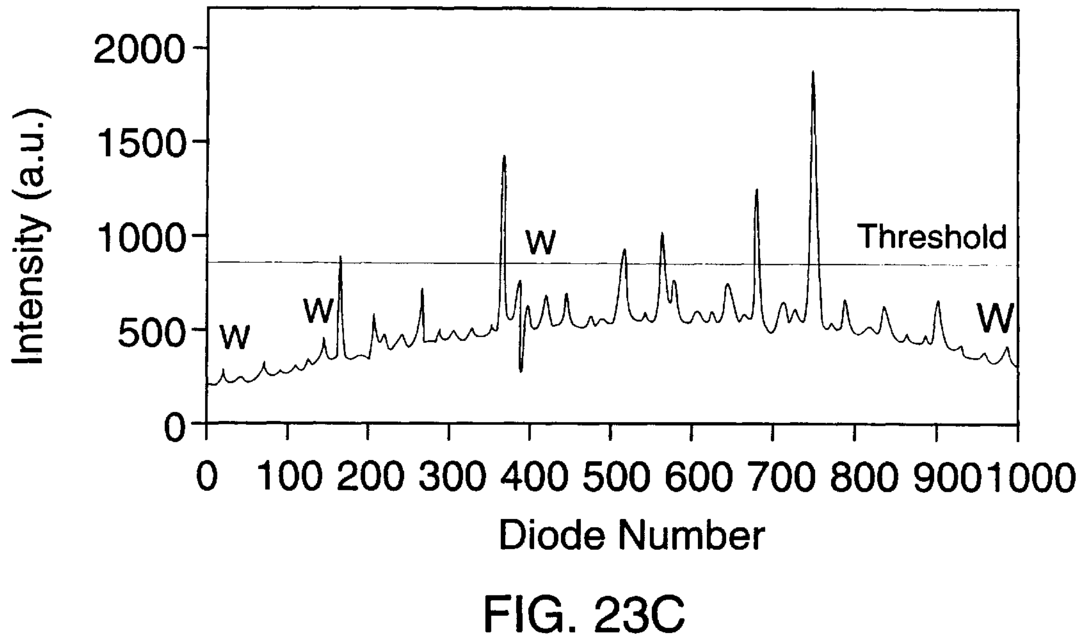
Figure 23D:
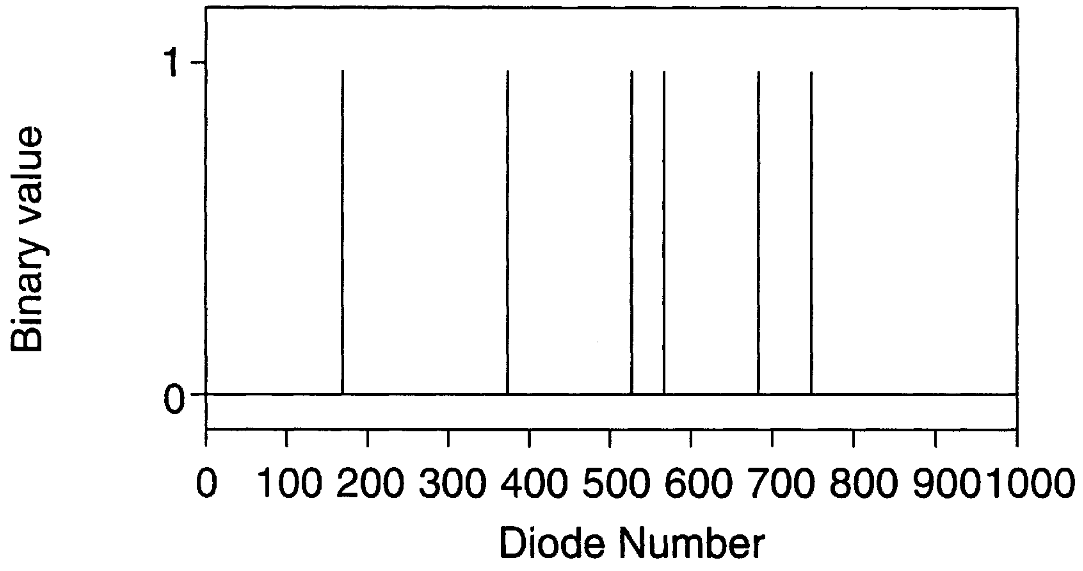

With the slotted mask 42 removed from the mask holder, the spectral region from about 190 nm to about 420 nm is covered. As background emission from the ICP 10 no longer gets blocked by the mask, the diode array saturates in about 3 seconds (FIG. 22*a*). Due to manual operation of the variac 38, an 8 second integration time (established after lengthy experimentation) was required to ensure that the entire analyte emission signal was recorded by the PDA detector. To avoid potential loss of analyte emission and to utilize more fully the dynamic range of the detector, the integration time had to be extended. This was done by simply recognizing that the most intense peaks shown in FIG. 22*a* are due to emission from Ar lines above 415 nm. For example, six of the most sensitive Ar lines are known to be between 415 and 420 nm. By removing the mask from the mask holder and by blocking with electrical tape the segment of the mask holder that allows wavelengths above about 410 nm to pass through (referred to above as the "upper segment"), plasma background is simplified (FIG. 22*b*) and integration time is increased to about 10 seconds. The range of wavelengths blocked by the mask 42 was confirmed running Sr. With the upper segment of the mask holder taped, the Sr spectrum shows only the 407.771 nm line, whereas with the mask fully removed, both the 407.771 nm and the 412.552 nm lines are shown. As most Ar emission above 415 nm has been eliminated, the spectral region above about 410 nm is assumed blocked.

Even with the upper segment of the mask holder taped, a problem can arise due to emission from W lines.

When externally dried water blanks were run using preconditioned wire-loops, significant W emission was observed, particularly when high power levels were applied to the wire-loop 30. An example is shown in FIG. 22*c*. Partially due to manual operation of the variac 38, reproducible W emission intensities could not be obtained between successive water-blank (10 μL) wire-loop runs. Thus, reproducible subtraction of W emission was found not to be possible. The negative peaks appearing on some spectra, most notably around diode numbers 400 and 1015, may be attributed to poor water-blank background subtraction. This problem may be overcome by using the automated power supply for the wire-loop sample introduction system (FIG. 12) and by experimenting with Re wire-loops (see Example 2, above). These findings and conclusions are consistent with previously published reports in which W emission intensity was found to be dependent on drying method, the age of the wire-loop 30, central-tube gas flow rate and electrical power applied to the loop.

Since a key objective of this experimental test set-up was to test the feasibility of using cross-correlation for automatic detection of spectral information using μL volumes of multielement mixtures, the problem of poor reproducibility of W emission intensities was solved by simply blocking most W emission. This was accomplished by taping the segment of the mask holder that lets the wavelength region from about 190 nm to about 280 nm pass through (identified above as the "lower segment"). This spectral region was chosen because most of the 580 W-lines are below 276 nm. As well, 276.427 nm is the maximum wavelength known for W. The mask holder was taped to block the Mg 279 nm line and to allow the Mg 280 nm line to pass through. With the upper and lower segments of the mask holder blocked (hence a partially blocked mask), the spectral region between about 280 nm and 410 nm was allowed to pass through. Although much cleaner spectral patterns were observed (FIG. 22*d*) using the partially blocked mask, the capability to determine environmentally important elements, such as Cd, Hg, Pb and Zn was lost because these elements have their most sensitive ICP lines below 250 nm. This problem was addressed by testing wire-loops of different composition (e.g., Re) and, to help further reduce the potential for oxide formation, by mixing hydrogen with the carrier gas.

Figure 24A:
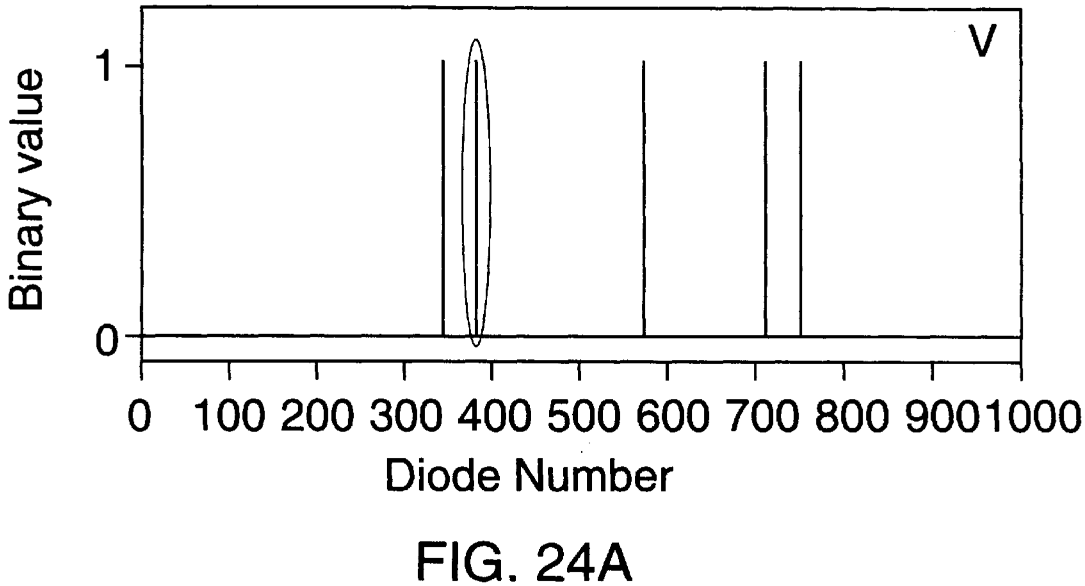
Figure 24B:
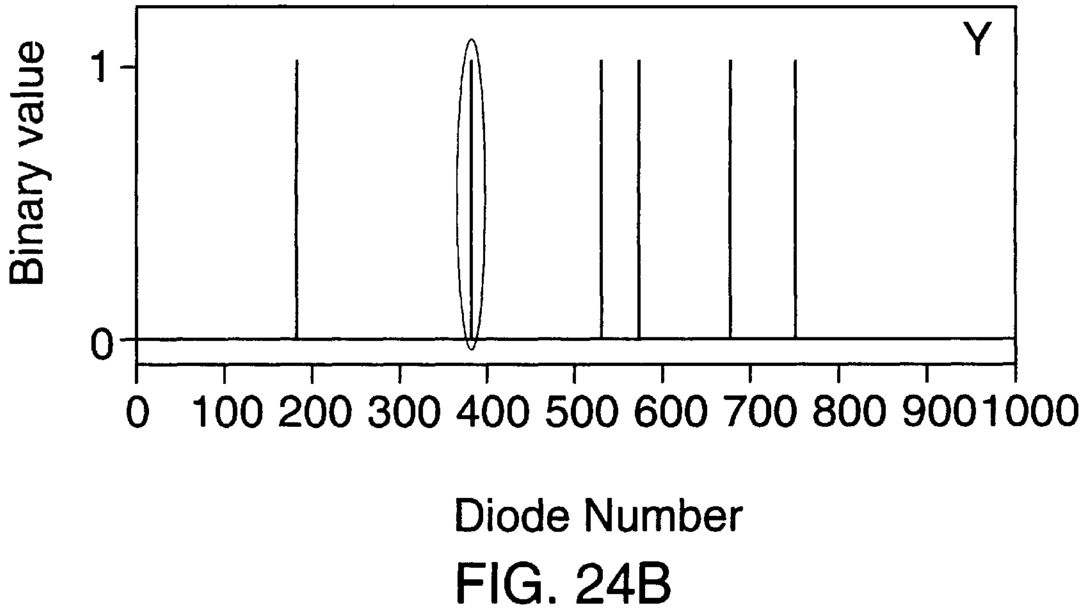
Figure 24C:
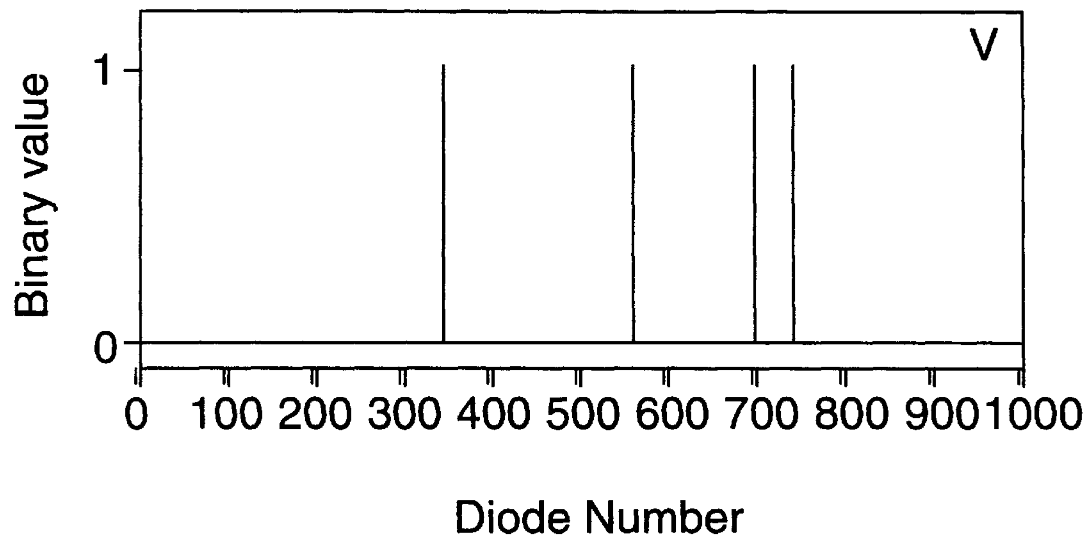

Characteristic spectral patterns were acquired using 10 $\mu$L volumes of single element standards, the wire-loop sample introduction system and the partially blocked mask for Al, Be, Co, Ni, Sc, Sr, V, Y, Yb and Zr. These were treated as "reference" spectral patterns and were used for the remainder of the experimental set-up discussed herein. Representative examples are shown for Sr (FIG. 20*b*), Ni (FIG. 20*c*), Al (FIG. 23*a*), Co (FIG. 23*b*), Be (FIG. 24*a*) and Y (FIG. 24*c*). Despite the use of a partially blocked mask and water blank subtraction, some W lines also appear on the final spectrum and examples are shown in FIG. 24.

Due to the presence of W in the spectral patterns of standards and multielement mixtures, in most instances, cross-correlations showed a small peak at $\tau$=O even when the sought-for element was not present in the multielement mixture, thus leading to potentially incorrect conclusions. Since it is not possible, due to poor background subtraction, to ensure that there will not be any W lines in the spectral patterns of multielement mixtures, a way to remove W emission from the reference spectral patterns was devised by converting element lines in the reference spectral intensity patterns to noise-free, binary intensity bars, as described below.

Figure 24D:
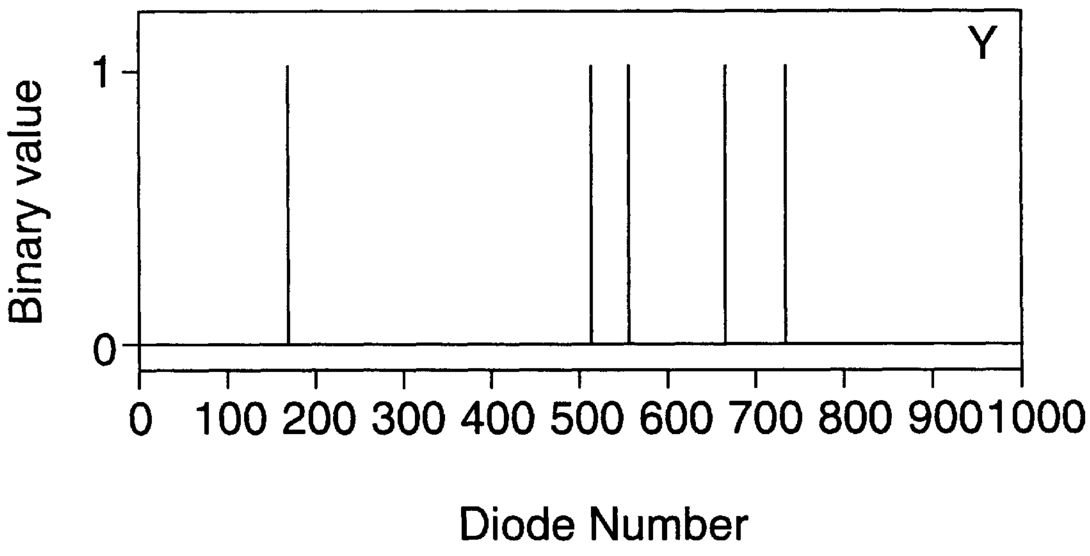

The reference spectral intensity patterns for the 10 elements tested in this Example were converted to binary intensity bars by setting emission intensities greater than or equal to a threshold equal to binary 1 and every value below the threshold equal to binary 0. In essence, the spectral intensity reference patterns were converted to binary spectral patterns. Two examples are shown in FIG. 24. The threshold level varied from element to element and was set so that background and W emission intensities fell below it and, as a consequence, were converted to binary 0 and thereby eliminated. As shown in FIGS. 24*b* and 24*d*, W and background emission were removed. However, some spectral lines were also removed and, as a result, a reduction in the magnitude of the peak at $\tau$=O was observed. It is interesting to note that because peak widths above the threshold varied, the width of the corresponding binary intensity bars also varied.

Despite the use of binary spectral patterns, the presence of Y in multielement mixtures containing V but not Y could be inferred incorrectly. This can result from a direct overlap in the binary spectral patterns of V and Y and the overlapping lines are shown encircled in FIGS. 25*a* and 25*b*. Since V and Y have a common spectral feature, spectral patterns from multielement mixtures containing V but not Y, will also share a common spectral feature with Y. As a consequence, a peak will appear at $\tau$=O and incorrect conclusions about the presence of Y can be drawn. Similarly, incorrect conclusions about the presence of V in multielement mixtures containing Y but no V can also be drawn. Inter-element interferences can be eliminated using binary spectral patterns devoid of overlaps.

Figure 25A:
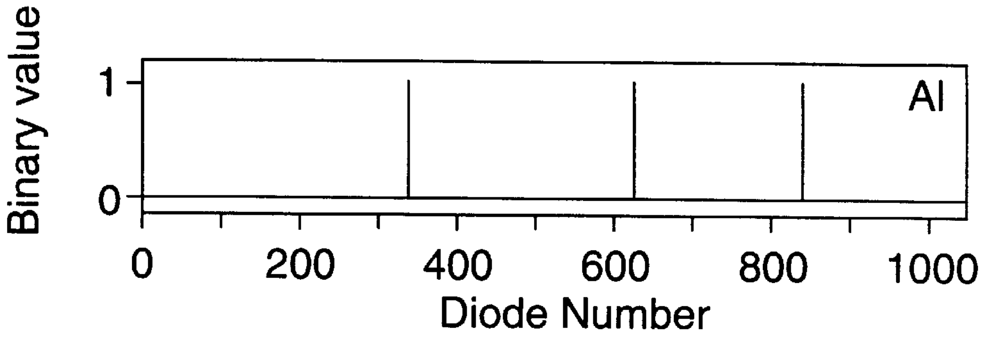
Figure 25B:
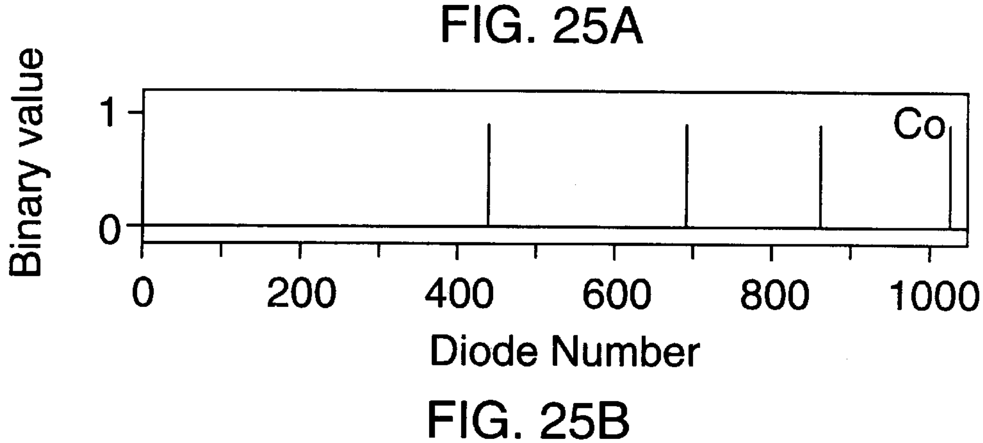
Figure 25C:
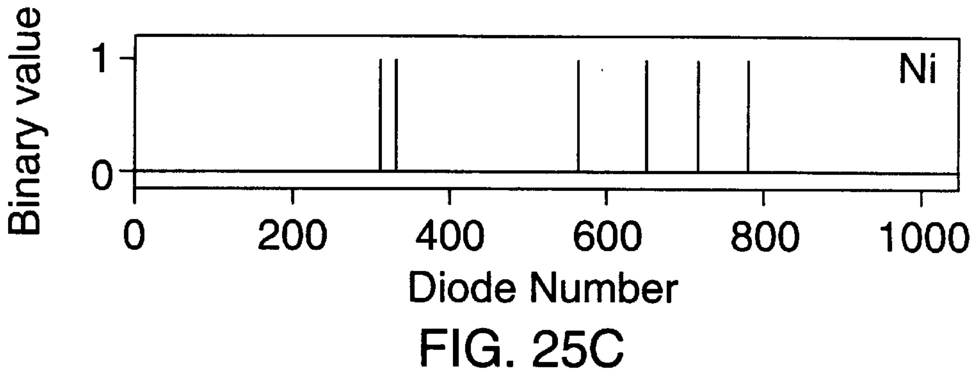
Figure 25D:
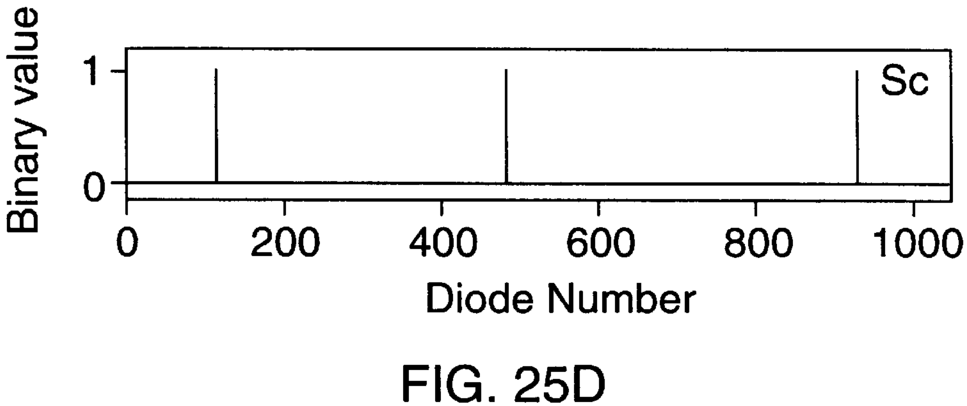
Figure 25E:
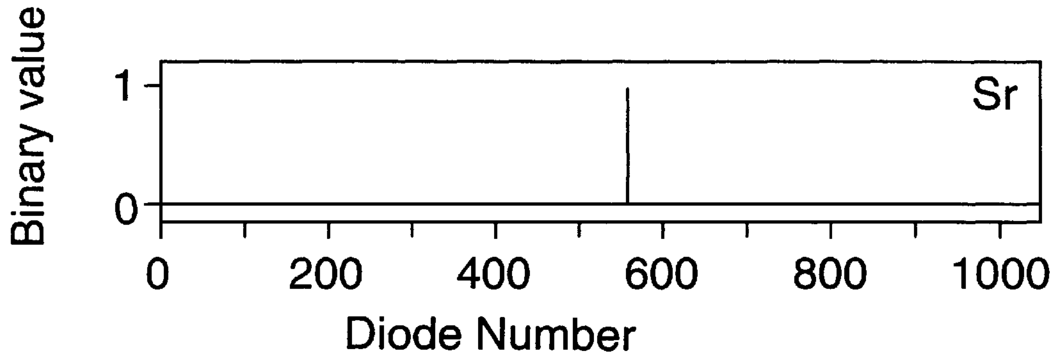
Figure 25F:
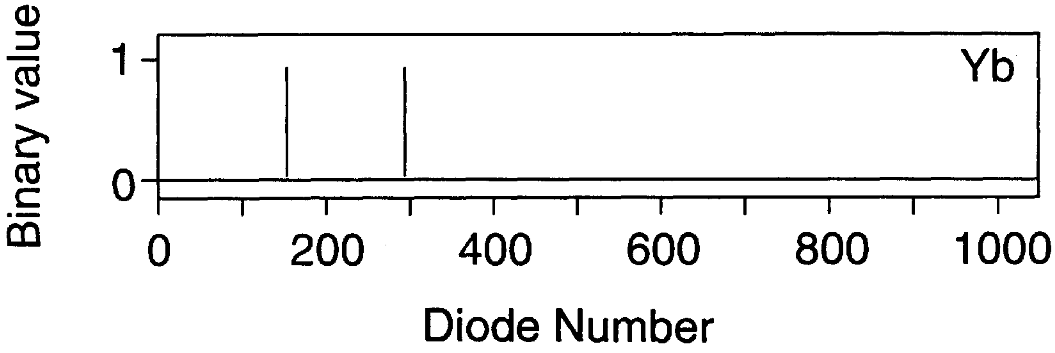
Figure 25G:
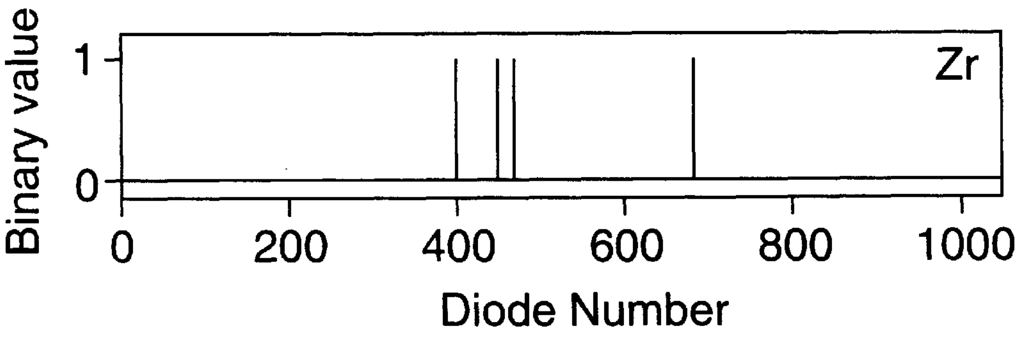

Inter-element overlaps in the binary spectral patterns were identified using a logical AND operation and overlapping lines were removed manually by converting a 1 to a 0 at the overlapping position(s). Examples are shown in FIGS. 25*c* and 25*d*. This resulted in mutually-exclusive, interference free binary spectral patterns, or "binary software masks" for short. Conceptually, removal of such overlaps is equivalent to acquiring a single element spectrum using a hardware mask that blocks only the interfering spectral line(s). In this case, however, interferences are removed using software rather than hardware and, potentially, the process can be automated. The V line interfering with Y was also removed (FIG. 25*c*) to avoid incorrectly inferring the presence of V in multielement mixtures containing Y. Using binary software masks, incorrect detection of Y and V, as described above, was no longer a problem. However, due to the reduction in the overlap between the binary software masks for Y and V and the spectral patterns from multielement mixtures, the magnitude of the peak at $\tau$=O was reduced by about 15% for V and about 20% for Y when using these masks as compared to the magnitude calculated when using binary spectral patterns.

Due to the success of this approach, binary software masks were constructed from the corresponding reference spectral intensity patterns for all elements tested in this Example. The lack of inter-element spectral overlaps was confirmed by cross-correlating the binary software mask of an element with the binary software masks of all other elements. In all cases, a peak at $\tau$=O was not observed. Binary software masks for Al, Co, Ni, Sc, Sr, Yb and Zr are shown in FIG. 26, for V and Y in FIGS. 25*c* and 25*d* and for Be in FIG. 24*b*. In essence, a data base of 10 binary software masks was developed from the corresponding reference spectral intensity patterns of the 10 elements used in this Example. These binary software masks were subsequently tested with spectral patterns obtained running multielement mixtures.

Laboratory prepared multielement mixtures were cross-correlated with the 10 binary software masks in the date base. In most instances, the presence or absence of a sought-for element in multielement mixtures was identified correctly. For example, cross-correlograms for the spectral pattern of a mixture of Co, V and Zn (FIG. 27*a*) with the binary software masks of Co (FIG. 26*b*) and Ni (FIG. 26*c*) are shown in FIGS. 27*b* and 27*c*. Despite the complexity of the spectral pattern shown in FIG. 27*a*, from the presence of a peak at $\tau$=O, the presence of Co can be inferred correctly and from the absence of a peak at $\tau$=O it can be inferred correctly that Ni is not detected.

Even with the use of binary software masks, there were some instances that a small peak appeared at $\tau$=O, even though the sought-for element was not in the multielement mixture. One such instance will be discussed in conjunction with the binary software mask for Co and the spectral pattern for a mixture containing Al, Be, Sr and Y. Since there is no Co in this multielement mixture, the small peak at $\tau$=O (FIG. 28) must be due to overlaps between the Co binary software mask and the baseline of the spectral pattern. Accordingly, an effort was made to determine a way to test, without a priori compositional knowledge, if the peak at $\tau$=O was due to the presence of an element or to baseline overlaps.

This development was addressed by taking spectral line intensities into consideration. For this Example, there are four spectral features in the binary software mask for Co (FIG. 27*b*). The maximum intensity in the corresponding spectral intensity pattern for Co (FIG. 23*b*) is at diode number 436. If the intensity in the spectral pattern for the multielement solution (FIG. 1*a*) is equal to or less than 5 times the intensity of a water blank at the same diode number, any amount of Co present in the multielement solution is considered below the quantification level for this system and Co is considered as not detected. Based on this arbitrary criterion, the presence or absence of a sought-for element was correctly identified in all multielement mixtures tested in this set-up.

If the intensity of the multielement solution at the position of interest (diode number 436 in the example discussed above) is more than five rimes the intensity of a water blank at the same position, semi-quantitative results can be obtained from a single-point calibration curve. To account for potential overlaps arising from elements other than those used in this test set-up or from the matrix, the procedure described above can be expanded to take into consideration the intensity ratios of multiple spectral lines and calibration curves constructed using the magnitude of the peak at $\tau$=O, as was done with pneumatic nebulization sample introduction and this spectrometer in Example 2 discussed in detail above. However, these approaches were not tested because proof-of-concept was the objective.

By providing software that does cross-correlations, recognizes the presence of a peak at $\tau$=O (e.g., by simply using 7 points in total and going from left-to-right a positive slope followed by a negative slope) and performs concentration calculations, automatic interpretation of complex spectral patterns becomes possible. As for results presentation, the color-coded periodic table discussed briefly above, was developed as a user interface and as the means by which to present the likely composition of a mixture on the computer screen.

A user interface is the part of a computer program that bridges the gap between the computer and the operator. One such interface for automation and display of cross-correlation and semi-quantitative results is a color-coded periodic table. According to the present invention, a periodic table was used as a key component of the user interface. Unlike prior art periodic table user interfaces, color is used in the present invention to increase the visual information bandwidth, to provide semi-quantitative results and to allow large amounts of qualitative and semi-quantitative data to be displayed in a manner which is easy to comprehend. The main window of the interface developed in accordance with the present invention is shown in FIG. 29*a*. For publication purposes, color has been substituted by patterns. As shown in FIG. 29*a*, the user interface consists of a periodic table and a concentration index. The different text faces provide additional information to the user. For example, bold face text indicates elements typically analyzed with this version of the PDA-ICP spectrometer 41 and blank cells indicate that a binary software mask for this element is in the data base.

At the beginning of a session, the operator selects a spectral pattern of a mixture from the hard disk. As the computation of the cross-correlograms proceeds, the sought-for element is shown on top of the periodic table and the blank boxes on the periodic table "light up" with color (patterns are shown in FIG. 29*b*).

As mentioned before, this user interface was implemented using LabView. LabView, although it provides ease of implementation and a convenient programming environment with which to test concepts and algorithms, has limited graphics handling capability. To address this limitation, programming environments that have better graphics support may be utilized.

From the results presented herein, it can be concluded that the combination of a wire-loop sample introduction according to the present invention, ICP-AES with PDA detection and cross-correlation offers unique capabilities for automatic detection of spectral information from $\mu$L volumes. The color coded periodic table of the user interface aspect of the present invention was found to be particularly effective in presenting the likely composition of multielement mixtures on a computer screen.

Potentially more powerful implementations can be conceived by considering wire-loop sample introduction and cross-correlation of spectral patterns acquired using a solid state area-sensor and segmented-array spectrometers.

Exemplary Alternative Embodiments and Applications

Although the specific embodiment of the invention is described above with respect to the use of filament of tungsten as the sample carrier, other materials and metals may be used, such as Re, Ta, Mo, Pt, Ag, Au and graphite. In addition, in place of the use of a coiled filament as the sample holder, the sample holder may take the form of cups, strips, boats, buttons and foils of any of the material noted above.

Further, electrical heating of the sample carrier may be replaced by any other convenient method of heating the sample to the required temperature, for example, by the use of another plasma. Although inductive heating may be used to provide a second plasma 12', as seen in FIG. 16*a*, a microwave induced plasma (MIP), a capacitively coupled plasma (CCP) or a direct current plasma (DCO) may be used as the second plasma. Further, while the ITV sample introduction system of the present invention has been described with respect to introduction of the sample to an ICP, MIPs, DCPs and CCPs may be used as the plasma source for atomic spectroscopy.

Laser ablation, as illustrated in FIG. 16*b*, also may be employed to heat the sample. Laser ablation is particularly useful for solid samples, such as metals, rocks, soils and semiconductor materials. In this case, a few $\mu$g or a few $\mu$L of material, depending on the physical form of the sample, is placed inside a sample holder 30, for example, a cup, and the material ablated by the laser beam is transferred to the plasma by a carrier gas, for example, argon.

The ITV sample introduction sample provided herein also may be employed for atomic absorption and atomic fluorescence, as shown schematically in FIG. 17. The device shown in FIG. 17 may be provided in microminiaturized form using semiconductor technology and etching techniques using Si or quartz wafers. One such wafer may contain a miniature quartz cell 58 and/or miniature ITV system, with the spectrometer replaced by a simple optical filter and detector 60 illuminated by a suitable lamp 61 and the readout electronics (i.e. operational amplifier 52, feedback resistor 52 and capacitor 56) being integrated on another wafer. The two wafers may then be bonded together. Such portable systems may be used for the determination of, for example, Pb in blood, hydride forming elements and volatile elements/compounds, with hard copy analytical results being generated by a chart recorder 62.

Other embodiments and variations of the invention are possible without departing from the sphere and scope defined by the claims appended hereto.

I claim:

1. An atomic absorption and atomic fluorescence sample analysis system, comprising:

(a) sample holder means for carrying said sample to be analyzed, said sample holder means being in the form of a miniaturized wafer, wherein said wafer contains a miniature in-torch wafer vaporization sample introduction system comprising; (i) sample holder means for carrying said sample to be analyzed, (ii) a modified Fassel-type torch having a plasma fed by inert gas through outer and intermediate feed channels in an enlarged gas tube, an inner axial tube having one end open adjacent said plasma and an opposite end open for receiving said sample holder means for feeding the sample to the plasma, said inner axial tube tapering to a reduced diameter adjacent said one end to form a well defined channel for feeding said sample holder means in said inner axial tube a predetermined distance below said plasma, and means for sealing said opposite end of said inner axial tube; and (iii) means for vaporizing said sample;

(b) lamp means on one side of said wafer for exposing said wafer and the sample carried therein to radiation;

(c) a monochromator on an opposite side of said wafer for receiving and filtering said radiation after transmission through said wafer;

(d) a photomultiplier connected to said monochromator for generating a current proportional to light intensity of said radiation filtered by said monochromator;

(e) means for converting said current into voltage; and (f) means for converting said voltage to a digital signal representative of said atomic absorption or atomic fluorescence of said sample, and displaying said signal.

2. The system of claim 1, wherein said wafer contains a miniature quartz cell.

3. The system of claim 1 wherein said means for converting said current into voltage further comprises an operational amplifier for connected to said photomultiplier, a resistor connected in a feedback loop between an output and an input of said operation amplifier, and a capacitor connected in parallel with said resistor.

4. An atomic fluorescence sample analysis system, comprising:

a) sample holder means for carrying said sample to be analyzed, said sample holder means being in the form of a miniaturized wafer;

b) lamp means on one side of said wafer for exposing said wafer and the sample carried therein to radiation;

c) a monochromator on an opposite side of said wafer for receiving and filtering said radiation after transmission through said wafer;

d) a photomultiplier connected to said monochromator for generating a current proportional to light intensity of said radiation filtered by said monochromator;

e) means for converting said current into voltage comprising an operational amplifier for connecting to said photomultiplier, a resistor connected in a feedback loop between an output and an input of said operation amplifier, and a capacitor connected in parallel with said resistor, wherein said operational amplifier, feedback resistor and capacitor are integrated on a further miniaturized wafer; and f) means for converting said voltage to a digital signal representative of said atomic fluorescence of said sample, and displaying said signal.

5. The system of claim 4, wherein said miniaturized wafer and said further miniaturized wafer are bonded together.

6. A screening system for detecting the presence or absence of predetermined elements from a sample, comprising:

a) spectrometer means for analyzing a plurality of known single elements and said sample, and in response generating a plurality of reference spectral patterns and a raw spectral pattern, respectively;

b) correlation means for performing automatic cross-correlation between respective ones of said plurality of reference spectral patterns and said raw spectral pattern and in the event of a correlation therebetween providing an indication of presence of a predetermined one of said known single elements in said sample; and c) display means responsive to said indication of presence of said predetermined one of said known single elements in said sample for generating a graphical display thereof.

7. The screening system of claim 6, further comprising means for introducing said sample into said spectrometer means.

8. A screening system for detecting the presence or absence of predetermined elements from a sample, comprising:

a) spectrometer means for analysing a plurality of known single elements and said sample, and in response generating a plurality of reference spectral patterns and a raw spectral pattern, respectively;

b) correlation means for performing a cross-correlation between respective ones of said plurality of reference spectral patterns and said raw spectral patterns and in the event of a correlation therebetween providing an indication of presence of a predetermined one of said known single elements in said sample; and c) display means responsive to said indication of presence of said predetermined one of said known single elements in said sample for generating a graphical display thereof, wherein said display means comprises a computer generated color coded periodic table for indicating the presence of said predetermined one of said known single elements by highlighting said predetermined one of said known single elements in said periodic table.

9. The screening system of claim 8, wherein said display means highlights said predetermined one of said known single elements by displaying said predetermined one of said known single elements in one of a plurality of colours.

10. The screening system of claim 9, wherein said plurality of colours represent concentration of said predetermined one of said known single elements in said sample.

11. The screening system of claim 8, wherein said display means further includes a plurality of user-activated menus for controlling operation of said screening system.

12. A screening system for detecting the presence or absence of predetermined elements from a sample, comprising:

a) spectrometer means for analyzing a plurality of known single elements and said sample, and in response generating a plurality of reference spectral patterns and a raw spectral pattern, respectively;

b) correlation means for performing a cross-correlation between respective ones of said plurality of reference spectral patterns and said raw spectral pattern and in the event of a correlation therebetween providing an indication of presence of a predetermined one of said known single elements in said sample; and c) display means responsive to said indication of presence of said predetermined one of said known single elements in said sample for generating a graphical display thereof, further comprising means for introducing said sample into said spectrometer means, wherein said means for introducing said sample into said spectrometer means comprises an in-torch vaporization sample introduction system.

* * * * *